(12) United States Patent
Sato

(10) Patent No.: US 9,571,838 B2
(45) Date of Patent: Feb. 14, 2017

(54) IMAGE PROCESSING APPARATUS AND IMAGE PROCESSING METHOD

(71) Applicant: SONY CORPORATION, Tokyo (JP)

(72) Inventor: Kazushi Sato, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 14/763,282

(22) PCT Filed: Nov. 7, 2014

(86) PCT No.: PCT/JP2014/079622
§ 371 (c)(1),
(2) Date: Jul. 24, 2015

(87) PCT Pub. No.: WO2015/098315
PCT Pub. Date: Jul. 2, 2015

(65) Prior Publication Data
US 2015/0358617 A1    Dec. 10, 2015

(30) Foreign Application Priority Data

Dec. 27, 2013  (JP) ................................. 2013-271483
Mar. 13, 2014  (JP) ................................. 2014-050517

(51) Int. Cl.
*G06K 9/00*     (2006.01)
*H04N 19/105*   (2014.01)
(Continued)

(52) U.S. Cl.
CPC ............ *H04N 19/105* (2014.11); *H04N 19/17* (2014.11); *H04N 19/186* (2014.11); *H04N 19/30* (2014.11);
(Continued)

(58) Field of Classification Search
CPC .... H04N 19/105; H04N 19/107; H04N 19/11; H04N 19/117; H04N 19/119; H04N 19/137; H04N 19/157; H04N 19/17; H04N 19/176; H04N 19/18; H04N 19/184; H04N 19/186; H04N 19/187; H04N 19/198; H04N 19/30; H04N 19/44; H04N 19/463; H04N 19/48; H04N 19/503; H04N 19/587; H04N 19/59; H04N 19/593; H04N 19/136; H04N 19/33; H04N 19/70; G06T 7/2013; G06T 2207/10016

See application file for complete search history.

(56) References Cited

U.S. PATENT DOCUMENTS

| 8,175,158 B2 * | 5/2012 | Segall .................. G06T 7/2013 375/240.14 |
| 2015/0103901 A1 * | 4/2015 | Sato ...................... H04N 19/70 375/240.12 |

(Continued)

FOREIGN PATENT DOCUMENTS

| EP | 2843951 A1 | 3/2015 |
| JP | 2011-509536 | 3/2011 |

OTHER PUBLICATIONS

Sep. 23, 2016, EP communication issued for related EP application No. 14875507.7.

(Continued)

*Primary Examiner* — Jose Couso
(74) *Attorney, Agent, or Firm* — Paratus Law Group, PLLC

(57) ABSTRACT

Provided is an image processing apparatus including: a decoding section configured to decode a prediction parameter including a gain and an offset by which each color component of a first layer is multiplied, the prediction parameter being used when an image of a second layer having a larger luminance dynamic range than the first layer is predicted from an image of the first layer, and a prediction section configured to predict the image of the second layer (Continued)

from the image of the first layer using the prediction parameter decoded by the decoding section.

16 Claims, 41 Drawing Sheets

(51) Int. Cl.
| | | |
|---|---|---|
| *H04N 19/44* | (2014.01) | |
| *H04N 19/186* | (2014.01) | |
| *H04N 19/17* | (2014.01) | |
| *H04N 19/70* | (2014.01) | |
| *H04N 19/30* | (2014.01) | |
| *H04N 19/503* | (2014.01) | |
| *H04N 19/33* | (2014.01) | |
| *H04N 19/136* | (2014.01) | |

(52) U.S. Cl.
CPC ............ *H04N 19/44* (2014.11); *H04N 19/503* (2014.11); *H04N 19/70* (2014.11); *H04N 19/136* (2014.11); *H04N 19/33* (2014.11)

(56) References Cited

U.S. PATENT DOCUMENTS

| | | | |
|---|---|---|---|
| 2015/0195566 A1* | 7/2015 | Hinz | H04N 19/70 375/240.12 |
| 2015/0195573 A1* | 7/2015 | Aflaki Beni | H04N 19/513 375/240.16 |

OTHER PUBLICATIONS

Louis Kerofsky, et al., Color Gamut Scalable Video Coding, Joint Collaborative Team on Video Coding (JCT-VC) of ITU-T SG16 WP3 and ISO/IEC JTC1/SC29/WG11, Oct. 10-19, 2012, pp. 1-11, 11$^{th}$ Meeting: Shanghai, CN.

Louis Kerofsky, et al., Color Gamut Scalable Video Coding: New Results, Joint Collaborative Team on Video Coding (JCT-VC) of ITU-T SG 16 WP 3 and ISO/IEC JTC 1/SC 29/WG 11, Jan. 14-23, 2013, pp. 1-18, 12$^{th}$ Meeting: Geneva, CH.

Sep. 27, 2016, JP communication issued for related JP application No. 2015-554656.

Cheung Auyueng, SCE4: Results of test 5.4 model1 on piecewise linear color space predictor, Joint Collaborative Team on Video Coding (JCT-VC) of ITU-T SG 16 WP 3 and ISO/IEC JTC 1/SC 29/WG 11, Oct. 23-Nov. 1, 2013, pp. 1-5, 15th Meeting, Geneva, CH.

Yuwen He, et al., Non-SCE4/AHG14: Combined bit-depth and color gamut conversion with 3D LUT for SHVC color gamut scalability, Joint Collaborative Team on Video Coding (JCT-VC) of ITU-T SG 16 WP 3 and ISO/IEC JTC 1/SC 29/WG 11, Oct. 23-Nov. 1, 2013, 15$^{th}$ Meeting, Geneva, CH.

Do-Kyoung Kwon, Inter-layer slice header syntax elements prediction in SHVC and MV-HEVC, Joint Collaborative Team on Video Coding (JCT-VC) of ITU-T SG 16 WP 3 and ISO/IEC JTC 1/SC 29/WG 11, Apr. 18-26. 2013, pp. 1-6, 13$^{th}$ Meeting: Incheon, KR.

Xiang Li, et al., Non-SCE4: Weighted Prediction Based Color Gamut Scalability, Joint Collaborative Team on Video Coding (JCT-VC) of ITU-T SG 16 WP 3 and ISO/IEC JTC 1/SC 29/WG 11, Oct. 23-Nov. 1, 2013, pp. 1-5, 15$^{th}$ Meeting: Geneva, CH.

Cheung Auyueng, Non-SCE4: Picture and region adaptive gain-offset prediction for color space scalability, Joint Collaborative Team on Video Coding (JCT-VC) of ITU-T SG 16 WP 3 and ISO/IEC JTC 1/SC 29/WG 11, Oct. 23-Nov. 1, 2013, pp. 1-7, 15$^{th}$ Meeting, Geneva, CH.

* cited by examiner

FIG.6A

| PREDICTION MODE (dr_prediction_model) | REMARKS |
|---|---|
| 0 | BIT SHIFT |
| 1 | FIXED GAIN AND OFFSET |
| 2 | ADAPTIVE GAIN AND OFFSET |

FIG.6B

```
01 | pps_extension_flag
02 | if( pps_extension_flag ) {
03 |     use_dr_prediction
04 |     if(use_dr_prediction) {
05 |         dr_pred_data ( )
06 |     }
07 | }
08 | rbsp_trailing_bits( )
```
← ---- FUNCTION OF SYNTAX FOR DR SCALABILITY

FIG.6C

```
01 | dr_prediction_model
02 | if(dr_prediction_model==2) {
03 |     numFractionBits
04 |     for( I = 0; I < 3; I++ ){
05 |         dr_predictor_gain [I]
06 |         dr_predictor_offset [I]
07 |     }
08 | }
```
← ---- PREDICTION MODE

← ---- GAIN (DENOMINATOR)

← ---- GAIN (NUMERATOR)
← ---- OFFSET

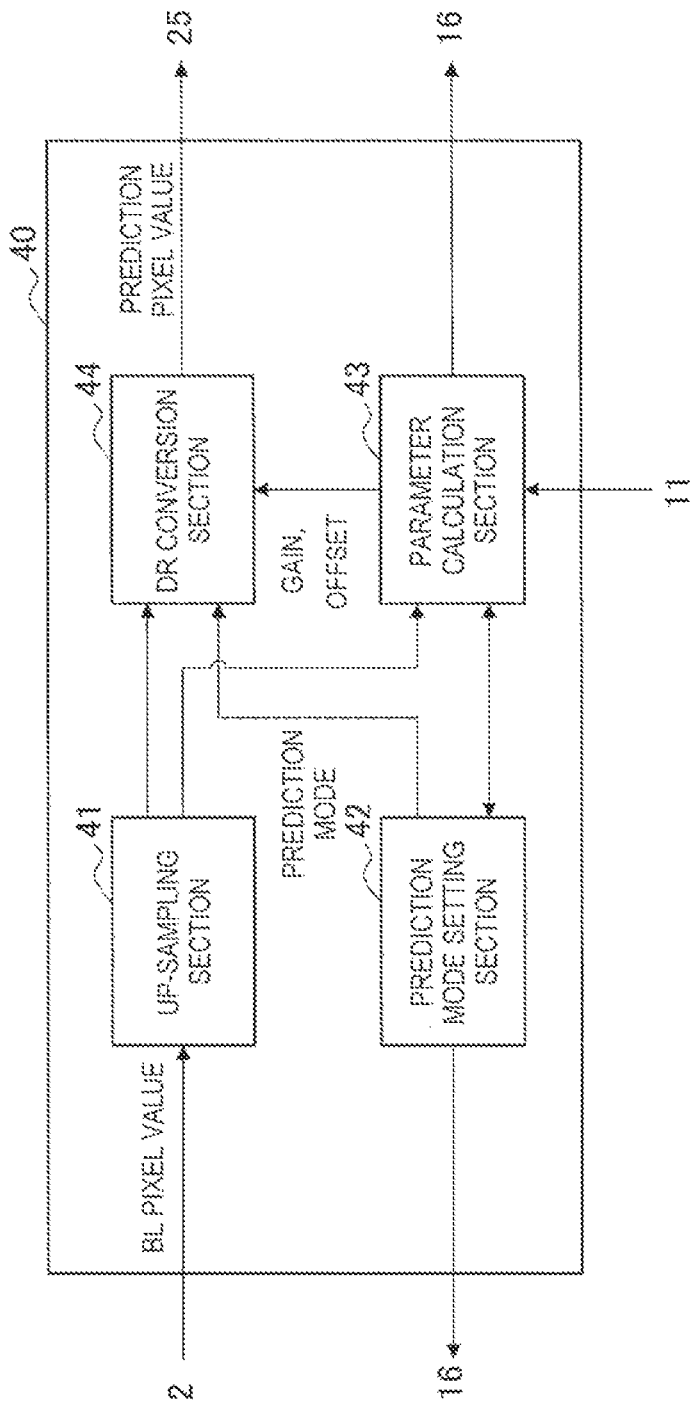

FIG.8

```
01 |  dr_prediction_flag                         <----- EXTENSION FLAG
02 |  if( dr_prediction_flag ) {
03 |     dr_prediction_model                     <----- PREDICTION MODE
04 |     if( dr_prediction_model == 2 ) {
05 |        luma_gain_dr_flag
06 |        if( chroma_format_idc != 0 ) {
07 |           chroma_gain_dr_flag
08 |        }
09 |        if( luma_gain_dr_flag ) {
10 |           delta_luma_log2_gain_denom         <----- GAIN DENOMINATOR DIFFERENCE (Luma)
11 |           delta_luma_gain_dr                 <----- GAIN NUMERATOR DIFFERENCE (Luma)
12 |           delta_luma_offset_dr               <----- OFFSET DIFFERENCE (Luma)
13 |        }
14 |        if( chroma_gain_dr_flag ) {
15 |           delta_chroma_log2_gain_denom       <----- GAIN DENOMINATOR DIFFERENCE (Chroma)
16 |           for( j = 0; j < 2; j++ ) {
17 |              delta_chroma_gain_dr[j]         <----- GAIN NUMERATOR DIFFERENCE (Chroma)
18 |              delta_chroma_offset_dr[j]       <----- OFFSET DIFFERENCE (Chroma)
19 |           }
20 |        }
21 |     }
22 |  }
```

PPS or Slice Header

FIG.9

| PREVIOUS PREDICTION MODE | BASIS OF DIFFERENCE | | |
|---|---|---|---|
| | BIT SHIFT | FIXED PARAMETER | ADAPTIVE PARAMETER |
| GAIN | $2^{n\_shift}$ | $g_{i\_fixed}$ | $g_{i\_prev}$ |
| OFFSET | ZERO | $o_{i\_fixed}$ | $o_{i\_prev}$ |

FIG.11

```
01 | pred_weight_table( ) {
02 |   luma_log2_weight_denom
03 |   if( chroma_format_idc != 0 )
04 |     delta_chroma_log2_weight_denom
05 |   for( i = 0; i <= num_ref_idx_l0_active_minus1; i++ )
06 |     luma_weight_l0_flag[ i ]
07 |   if( chroma_format_idc != 0 )
08 |     for( i = 0; i <= num_ref_idx_l0_active_minus1; i++ )
09 |       chroma_weight_l0_flag[ i ]
10 |   for( i = 0; i <= num_ref_idx_l0_active_minus1; i++ ) {
11 |     if( luma_weight_l0_flag[ i ] ) {
12 |       delta_luma_weight_l0[ i ]
13 |       luma_offset_l0[ i ]
14 |     }
15 |     if( chroma_weight_l0_flag[ i ] )
16 |       for( j = 0; j < 2; j++ ) {
17 |         delta_chroma_weight_l0[ i ][ j ]
18 |         delta_chroma_offset_l0[ i ][ j ]
19 |       }
20 |   }
21 |   if( slice_type == B ) {
22 |     for( i = 0; i <= num_ref_idx_l1_active_minus1; i++ )
23 |       luma_weight_l1_flag[ i ]
24 |     if( chroma_format_idc != 0 )
25 |       for( i = 0; i <= num_ref_idx_l1_active_minus1; i++ )
26 |         chroma_weight_l1_flag[ i ]
27 |     for( i = 0; i <= num_ref_idx_l1_active_minus1; i++ ) {
28 |       if( luma_weight_l1_flag[ i ] ) {
29 |         delta_luma_weight_l1[ i ]
30 |         luma_offset_l1[ i ]
31 |       }
32 |       if( chroma_weight_l1_flag[ i ] )
33 |         for( j = 0; j < 2; j++ ) {
34 |           delta_chroma_weight_l1[ i ][ j ]
35 |           delta_chroma_offset_l1[ i ][ j ]
36 |         }
37 |     }
38 |   }
39 | }
```

Lines 02–04: PARAMETER COMMON TO L0 AND L1

Lines 05–20: PARAMETER OF L0 REFERENCE FRAME

Lines 21–38: PARAMETER OF L1 REFERENCE FRAME

Slice Header

FIG.14

```
01 |  pred_weight_table( ) {
02 |      luma_log2_weight_denom
-- |      inter_layer_pred_flag              <------ ADDITIONAL FLAG
03 |      if( chroma_format_idc != 0 )
04 |          delta_chroma_log2_weight_denom
05 |      for( i = 0; i <= num_ref_idx_l0_active_minus1; i++ )
06 |          luma_weight_l0_flag[ i ]
07 |      if( chroma_format_idc != 0 )
08 |          for( i = 0; i <= num_ref_idx_l0_active_minus1; i++ )
09 |              chroma_weight_l0_flag[ i ]
10 |      for( i = 0; i <= num_ref_idx_l0_active_minus1; i++ ) {
11 |          if( luma_weight_l0_flag[ i ] ) {
12 |              delta_luma_weight_l0[ i ]
13 |              luma_offset_l0[ i ]
-- |              if(inter_layer_pred_flag)                BOUNDARY INFORMATION
-- |                  delta_pix_value_luma[ i ]    <----- (ADJUSTMENT VALUE)
14 |          }                                            FOR LUMA
15 |          if( chroma_weight_l0_flag[ i ] )
16 |              for( j = 0; j < 2; j++ ) {
17 |                  delta_chroma_weight_l0[ i ][ j ]
18 |                  delta_chroma_offset_l0[ i ][ j ]
-- |                  if(inter_layer_pred_flag)            BOUNDARY INFORMATION
-- |                      delta_pix_value_chroma[ i ][ j ] <---- (ADJUSTMENT VALUE) FOR
19 |              }                                         CHROMA
20 |      }
   ~~~~~~~~~~~~~~~~~~~~~~~~~~~~~~~~~~~~~~~
38 |      }
39 |  }
```

Slice Header

FIG.16

```
01 |  pred_weight_table( ) {
02 |      luma_log2_weight_denom
-- |      inter_layer_pred_flag                    <----- ADDITIONAL FLAG
-- |      if(inter_layer_pred_flag)
-- |          delta_num_ctb                        <----- BOUNDARY INFORMATION
03 |      if( chroma_format_idc != 0 )                    (NUMBER OF LCUS)
04 |          delta_chroma_log2_weight_denom
05 |      for( i = 0; i <= num_ref_idx_l0_active_minus1; i++ )
06 |          luma_weight_l0_flag[ i ]
07 |      if( chroma_format_idc != 0 )
08 |          for( i = 0; i <= num_ref_idx_l0_active_minus1; i++ )
09 |              chroma_weight_l0_flag[ i ]
10 |      for( i = 0; i <= num_ref_idx_l0_active_minus1; i++ ) {
11 |          if( luma_weight_l0_flag[ i ] ) {
12 |              delta_luma_weight_l0[ i ]
13 |              luma_offset_l0[ i ]
14 |          }
15 |          if( chroma_weight_l0_flag[ i ] )
16 |              for( j = 0; j < 2; j++ ) {
17 |                  delta_chroma_weight_l0[ i ][ j ]
18 |                  delta_chroma_offset_l0[ i ][ j ]
19 |              }
20 |      }

38 |  }
39 |  }
```

Slice Header

FIG.19

```
01 |   pred_weight_table( ) {
-- |       if( nuh_layer_id != 0 ) {
-- |           weighted_prediction_and_bit_shift_luma_flag      <----- CONTROL FLAG (Luma)
-- |           weighted_prediction_and_bit_shift_chroma_flag    <----- CONTROL FLAG (Chroma)
-- |       }
02 |       luma_log2_weight_denom
03 |       if( chroma_format_idc != 0 )
04 |           delta_chroma_log2_weight_denom
05 |       for( i = 0; i <= num_ref_idx_l0_active_minus1; i++ )
06 |           luma_weight_l0_flag[ i ]
07 |       if( chroma_format_idc != 0 )
08 |           for( i = 0; i <= num_ref_idx_l0_active_minus1; i++ )
09 |               chroma_weight_l0_flag[ i ]
10 |       for( i = 0; i <= num_ref_idx_l0_active_minus1; i++ ) {
11 |           if( luma_weight_l0_flag[ i ] ) {
12 |               delta_luma_weight_l0[ i ]
13 |               luma_offset_l0[ i ]
14 |           }
15 |           if( chroma_weight_l0_flag[ i ] )
16 |               for( j = 0; j < 2; j++ ) {
17 |                   delta_chroma_weight_l0[ i ][ j ]
18 |                   delta_chroma_offset_l0[ i ][ j ]
19 |               }

38 |       }
39 |   }
```

Slice Header

IMAGE PROCESSING APPARATUS AND IMAGE PROCESSING METHOD

CROSS REFERENCE TO PRIOR APPLICATION

This application is a National Stage Patent Application of PCT International Patent Application No. PCT/JP2014/079622 (filed on Nov. 7, 2014) under 35 U.S.C. §371, which claims priority to Japanese Patent Application Nos. 2014-050517 (filed on Mar. 13, 2014) and 2013-271483 (filed on Dec. 27, 2013), which are all hereby incorporated by reference in their entirety.

TECHNICAL FIELD

The present disclosure relates to an image processing apparatus and an image processing method.

BACKGROUND ART

The standadization of an image coding scheme called HEVC (High Efficiency Video Coding) by JCTVC (Joint Collaboration Team-Video Coding), which is a joint standardization organization of ITU-T and ISO/IEC, is currently under way for the purpose of improving coding efficiency more than H. 264/AVC (see, for example, "High Efficiency Video Coding (HEVC) text specification draft 10 (for FDIS & Consent)" by Benjamin Bross, Woo-Jin Han, Gary J. Sullivan, Jens-Rainer Ohm, Gary J. Sullivan, Ye-Kui Wang, and Thomas Wiegand, (JCTVC-L1003 v4. Jan. 14 to 23, 2013).

HEVC provides not only coding of a single layer but also scalable video coding, as in known image coding schemes such as MPEG2 and AVC (Advanced Video Coding). An HEVC scalable video coding technology is also called SHVC (Scalable HEVC) (for example, see "Description of scalable video coding technology proposal by Qualcomm (configuration 2)" by Jianle Chen, el. al, (JCTVC-K0036, Oct. 10 to 19, 2012).

Incidentally, scalable video coding is generally a technology that hierarchically encodes a layer transmitting a rough image signal and a layer transmitting a fine image signal. Typical attributes hierarchized in the scalable video coding mainly include the following three:

Space scalability: Spatial resolutions or image sizes are hierarchized.

Time scalability: Frame rates are hierarchized.

SNR (Signal to Noise Ratio) scalability: SN ratios are hierarchized.

Though not yet adopted in the standard, the color gamut scalability, the bit depth scalability and chroma format scalability are also discussed.

Further, a pixel dynamic range is an important attribute which has an influence on an image quality. For example, the maximum luminance of a Standard Dynamic Range (SDR) image supported by many known displays is 100 nits. On the other hand, the maximum luminance of a High Dynamic Range (HDR) image supported by high-end displays available in the latest markets reaches, for example. 500 nits or 1000 nits. An SDR image is called a Low Dynamic Range (LDR) image in contrast to an HDR image. Non-Patet Literature 3 proposes a technique of hierarchically encoding a layer transmitting an LDR image and a layer transmitting a residual for restoring an HDR image.

CITATION LIST

Non-Patent Literature

Non-Patent Literature 1: Benjamin Bross, Woo-Jin Han. Gary J. Sullivan, Jens-Rainer Ohm, Gary J. Sullivan. Ye-Kui Wang. Thomas Wiegand, "High Efficiency Video Coding (HEVC) text specification draft 10 (for FDIS & Consent)" (JCTVC-L1003_v4, Jan. 14 to 23, 2013)

Non-Patent Literature 2: Jianle Chen, el. al. "Description of scalable video coding technology proposal by Qualcomm (configuration 2)" (JCTVC-K0036, Oct. 10 to 19, 2012)

Non-Patent Literature 3: David Touze, el. al, "High Dynamic Range Video Distribution Using Existing Video Codecs" (30th Picture Coding Symposium, Dec. 8 to 11, 2013)

SUMMARY OF INVENTION

Technical Problem

However, in the technique proposed in Non-Patent Literature 3. a complicated algorithm such as filtering of a filter tap configured with pixel values over a plurality of frames and gamma correction in an RGB region is necessary in order to restore an HDR image from an LDR image. It is difficult to say that such a complicated algorithm is suitable for use in an encoder and a decoder in which versatility and scalability are regarded as important and implementation should be as easy as possible.

Thus, it is desirable to provide a mechanism capable of restoring an image quality appropriate for an HDR image from an SDR image without requiring complicated implementation.

Solution to Problem

According to the present disclosure, there is provided an image processing apparatus including: a decoding section configured to decode a prediction parameter including a gain and an offset by which each color component of a first layer is multiplied, the prediction parameter being used when an image of a second layer having a larger luminance dynamic range than the first layer is predicted from an image of the first layer; and a prediction section configured to predict the image of the second layer from the image of the first layer using the prediction parameter decoded by the decoding section.

The image processing apparatus can be typically implemented as an image decoding device that decodes an image.

According to the present disclosure, there is provided an image processing method including: decoding a prediction parameter including a gain and an offset by which each color component of a first layer is multiplied, the prediction parameter being used when an image of a second layer having a larger luminance dynamic range than the first layer is predicted from an image of the first layer; and predicting the image of the second layer from the image of the first layer using the decoded 6 prediction parameter.

According to the present disclosure, there is provided an image processing apparatus including: a prediction section configured to predict an image of a second layer from an image of a first layer when the image of the second layer having a larger luminance dynamic range than the first layer is encoded; and an encoding section configured to encode a prediction parameter including a gain and an offset by which each color component of the first layer is multiplied, the prediction parameter being used by the prediction section.

The image processing apparatus can be typically implemented as an image encoding device that encodes an image.

According to the present disclosure, there is provided an image processing method including: predicting an image of a second layer from an image of a first layer when the image of the second layer having a larger luminance dynamic range than the first layer is encoded; and encoding a prediction parameter including a gain and an offset by which each color component of the first layer is multiplied, the prediction parameter being used in the predicting.

Advantageous Effects of Invention

According to the technique of the present disclosure, it is possible to restore image quality appropriate for an HDR image from an SDR image without requiring complicated implementation.

BRIEF DESCRIPTION OF DRAWINGS

FIG. 6A illustrates a prediction mode candidate.

FIG. 6B is a first explanatory view for describing an example of a syntax of a prediction parameter.

FIG. 6C is a second explanatory view for describing an example of a syntax of a prediction parameter.

FIG. 7 is a block diagram illustrating an example of a configuration of a DR prediction section illustrated in FIG. 5.

FIG. 8 is an explanatory view for describing an example of an encoding parameter for DR prediction.

FIG. 9 is an explanatory view for describing a parameter value serving as a basis of differences of a gain and an offset.

FIG. 11 is an explanatory view for describing an existing syntax of a weighted prediction-related parameter.

FIG. 14 is an explanatory view for describing an example of a syntax associated with a technique described with reference to FIG. 12.

FIG. 16 is an explanatory view for describing an example of a syntax associated with a technique described with reference to FIG. 15.

FIG. 19 is an explanatory view for describing an example of a syntax associated with the technique described with reference to FIGS. 18A to 18C.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

A description will proceed in the following order.
1. Overview
1-1. Scalable Video Coding
1-2. Dynamic Range Scalability
1-3. Basic Configuration Example of Encoder
14. Basic Configuration Example of Decoder
2. Configuration Example of Prediction Mode According to Embodiment
2-1. Overall Configuration
2-2. Detailed Configuration of DR Prediction Section
2-3. Example of Syntax
3. Encoding Process Flow According to Embodiment
3-1. Schematic Flow
3-2. DR Prediction Process
4. Configuration Example of EL Decoding Section According to Embodiment
4-1. Overall Configuration
4-2. Detailed Configuration of DR Prediction Section
5. Decoding Process Flow According to Embodiment
5-1. Schematic Flow
5-2. DR Prediction Process
6. Example Application
6-1. Application to Various Products
6-2. Various Uses of Scalable Video Coding
6-3. Others
7. Conclusion <1. Overview>

[1-1. Scalable Video Coding]

In the scalable video coding, a plurality of layers, each containing a series of images, is encoded. A base layer is a layer encoded first to represent roughest images. An encoded stream of the base layer may be independently decoded without decoding encoded streams of other layers. Layers other than the base layer are layers called enhancement layer representing finer images. Encoded streams of enhancement layers are encoded by using information contained in the encoded stream of the base layer. Therefore. to reproduce an image of an enhancement layer. encoded streams of both of the base layer and the enhancement layer are decoded. The number of layers handled in the scalable video coding may be any number equal to 2 or greater. When three layers or more are encoded, the lowest layer is the base layer and the remaining layers are enhancement layers. For an encoded stream of a higher enhancement layer. information contained in encoded stream of a lower enhancement layer and the base layer may be used for encoding and decoding.

Figure 1:
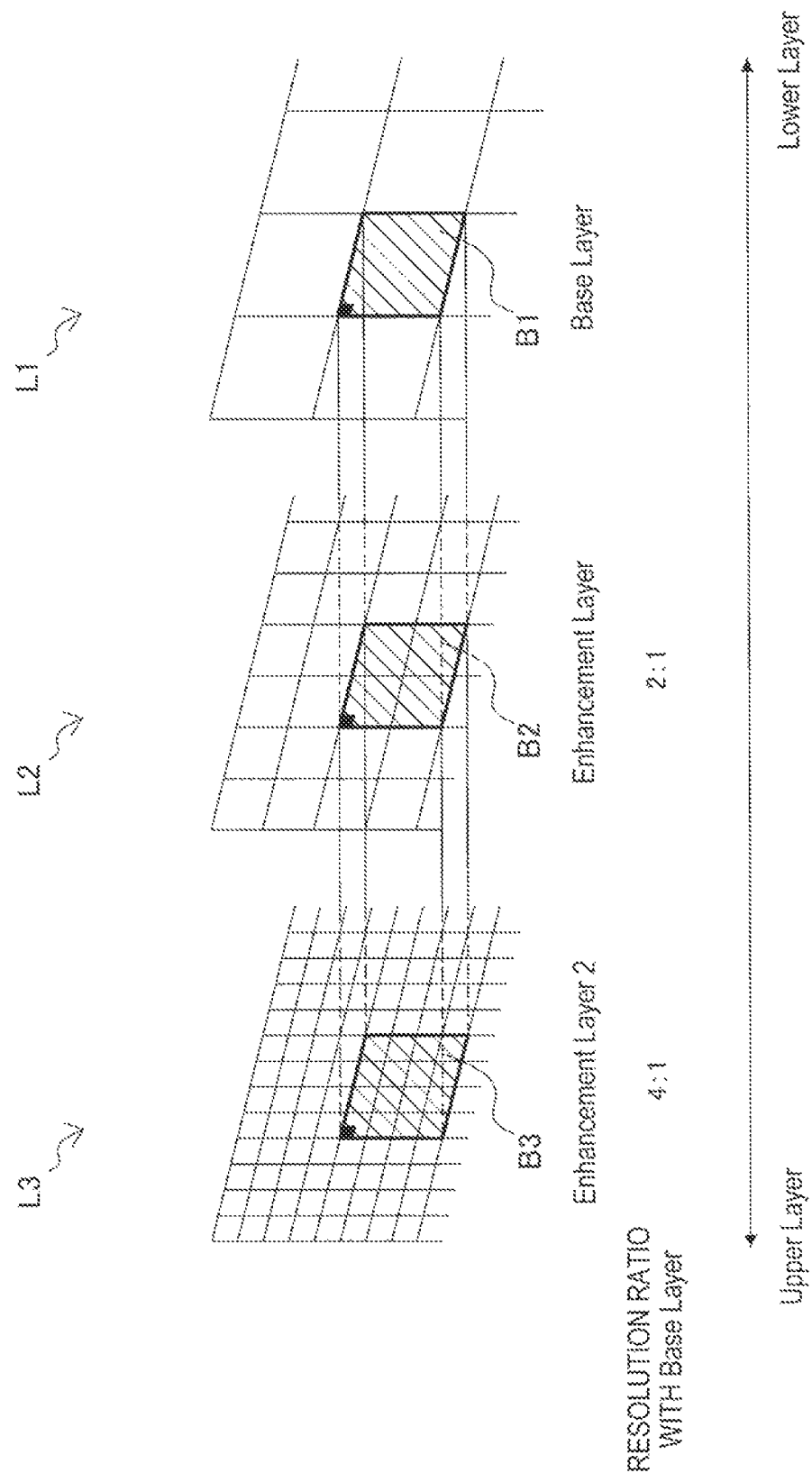
FIG. 1 is an explanatory view illustrating scalable video coding.

FIG. 1 shows three layers L1, L2, and L3 subjected to scalable video coding. The layer L1 is a base layer and the layers L2 and L3 are enhancement layers. A space resolution ratio of the layer L2 to the layer L1 is 2:1 and a space resolution ratio of the layer L3 to the layer L1 is 4:1. The resolution ratios herein are merely examples. For example, a resolution ratio of a non-integer such as 1.5:1 may be used. A block B of the layer L1 is a processing unit of an encoding process in a picture of the base layer. A block B2 of the layer L2 is a processing unit of an encoding process in a picture of the enhancement layer to which a common scene to the block B is projected. The block B2 corresponds to the block B1 of the layer L1. A block B3 of the layer L3 is a processing unit of an encoding process in a picture of the enhancement layer higher than the layers to which the common scene to the blocks B1 and B2 is projected. The block B3 corresponds to the block B1 of the layer L1 and the block B2 of the layer 2.

[1-2. Dynamic Range Scalability]

FIG. 1 shows three layers L1, L2, and L3 subjected to scalable video coding. The layer L1 is a base layer and the layers L2 and L3 are enhancement layers. A space resolution ratio of the layer L2 to the layer L1 is 2:1 and a space resolution ratio of the layer L3 to the layer L1 is 4:1. The resolution ratios herein are merely examples. For example, a resolution ratio of a non-integer such as 1.5:1 may be used. A block B1 of the layer L1 is a processing unit of an encoding process in a picture of the base layer. A block B2 of the layer L2 is a processing unit of an encoding process in a picture of the enhancement layer to which a common scene to the block B1 is projected. The block B2 corresponds to the block B1 of the layer L1. A block B3 of the layer L3 is a processing unit of an encoding process in a picture of the enhancement layer higher than the layers to which the common scene to the blocks B1 and B2 is projected. The block B3 corresponds to the block B1 of the layer L and the block B2 of the layer L2.

Figure 2:
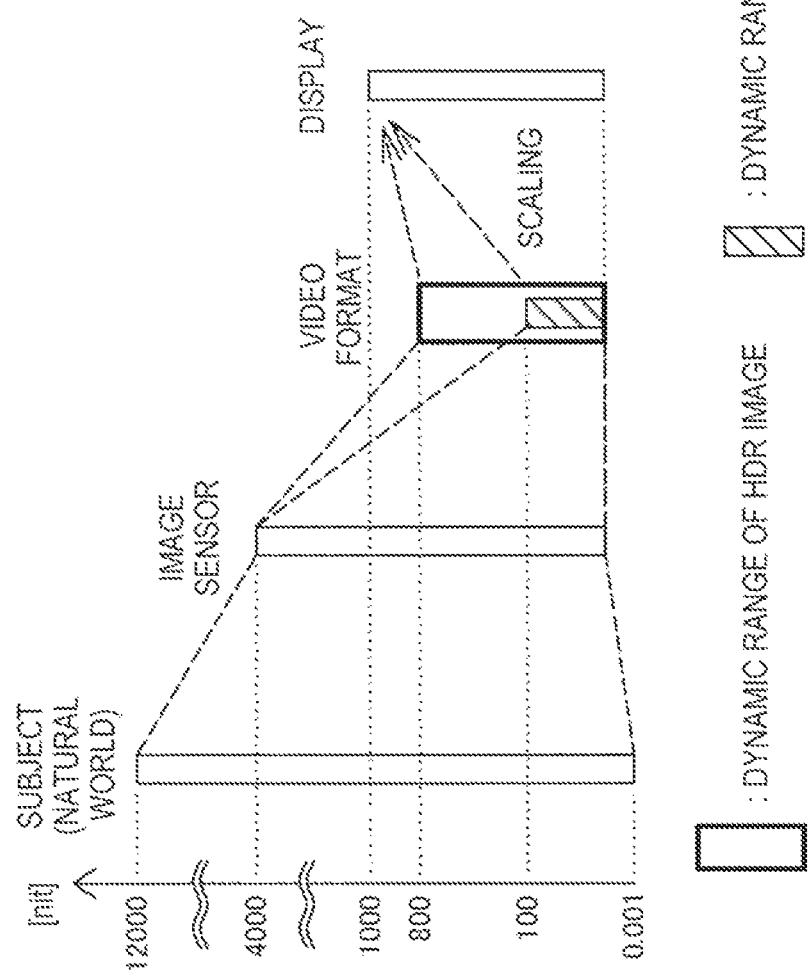
FIG. 2 is an explanatory view illustrating a dynamic range of a video format.

FIG. 2 is an explanatory view illustrating a dynamic range of a video format. The vertical axis of FIG. 2 represents luminance [nits]. The maximum luminance of the natural world reaches 20000 nits and the maximum luminance of a general subject is, for example. about 12000 nits. On the other hand, the upper limit of the dynamic range of an image sensor is lower than the maximum luminance of the natural world and can be, for example, 4000 nits. An image signal generated by an image sensor is further recorded in a predetermined video format. The dynamic range of an SDR image is shown by a bar shaded with diagonal lines in the drawing and the upper limit of this dynamic range is 100 nits. Accordingly. when a captured image is recorded as an SDR image, a luminance dynamic range is considerably compressed by, for example. a method such as knee compression. When the maximum luminance which can be expressed by a display is 1000 nits, scaling is performed 10 times at the time of display of an SDR image. However, the image quality of a display image easily deteriorates as the result of scaling. The dynamic range of an HDR image is shown by a thick-frame bar in the drawing and the upper limit of this dynamic range is 800 nits. Accordingly, when a captured image is recorded as an HDR image, a luminance dynamic range is also compressed by, for example, a method such as knee compression. When the maximum luminance which can be expressed by a display is 1000 nits, scaling is performed 1.25 times at the time of display of an HDR image. However, since a scaling ratio is small, the deterioration in the image quality of a display image is small.

Accordingly, when an HDR image is supported as a video format, there is a benefit that high-quality images can be supplied to users. Further, for the purpose of ensuring compatibility with a device which supports an SDR image and dealing with storage restriction and various transmission bands, it is beneficial to realize herein a scalable encoding technology called dynamic range scalability. In the dynamic range scalability, an SDR image is transmitted with the base layer and information for restoring an HDR image from the SDR image is transmitted with the enhancement layer. In order to restore an HDR image from an SDR image, it is important to keep mounting as simple as possible and ensure format versatility and scalability. For example, it is desirable to process each of input color components independently without requiring conversion of a color region in an encoder and a decoder that are not a special image processing engine for improving the image quality through post-processing. In this regard, the technique according to the present disclosure implements the dynamic range scalability by employing a model of causing a relation between an SDR image and an HDR image to approximate an independent linear relation for each color component and predicting an HDR image from an SDR image according to the linear model.

[1-3. Basic Configuration Example of Encoder]

Figure 3:
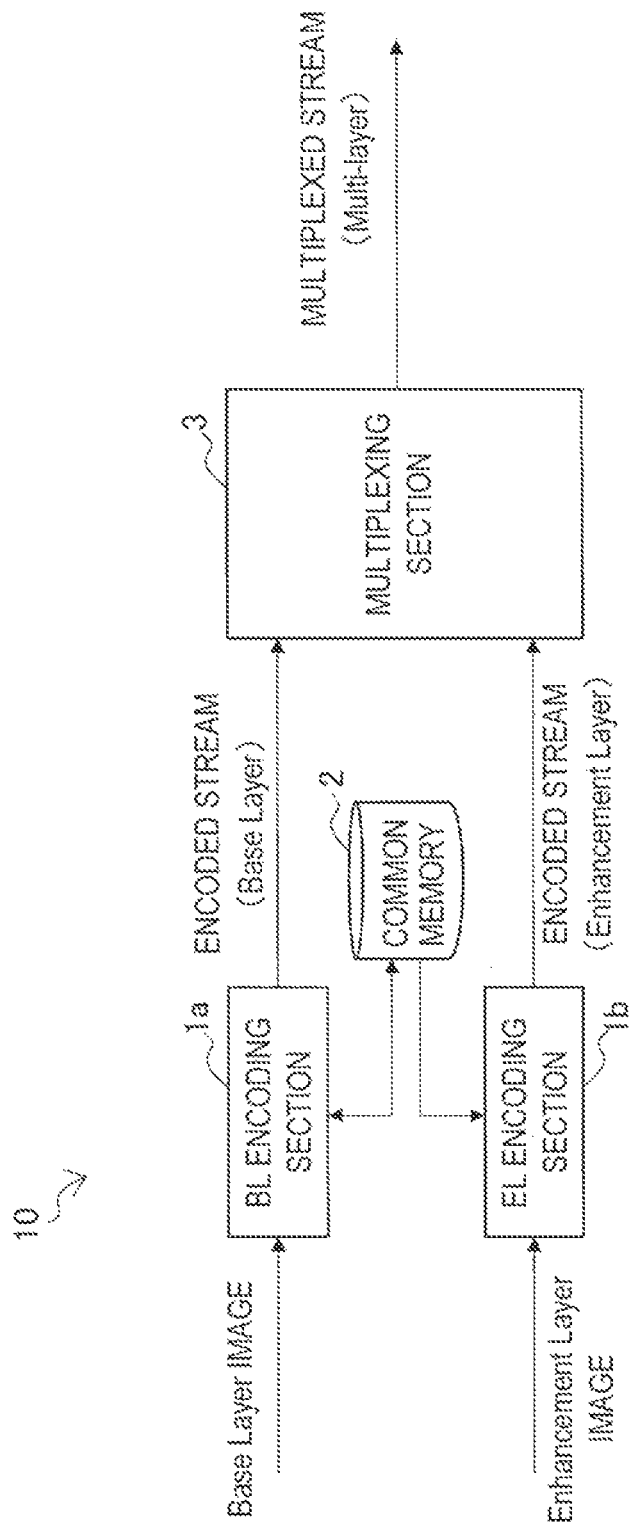
FIG. 3 is a block diagram showing a schematic configuration of an image encoding device according to an embodiment.

FIG. 3 is a block diagram showing a schematic configuration of an image encoding device 10 according to an embodiment supporting scalable video coding. Referring to FIG. 3, the image encoding device 10 includes a base layer (BL) encoding section 1a, an enhancement layer (EL) encoding section 1b, a common memory 2, and a multiplexing section 3.

The BL encoding section 1a encodes a base layer image to generate an encoded stream of the base layer. The EL eacoding section 1b encodes an enhancement layer image to generate an encoded stream of an enhancement layer. The common memory 2 stores information commonly used between layers. The multiplexing section 3 multiplexes an encoded stream of the base layer generated by the BL encoding section 1a and an encoded stream of at least one enhancement layer generated by the EL encoding section 1b to generate a multilayer multiplexed stream.

[1-4. Basic Configuration Example of Decoder]

Figure 4:
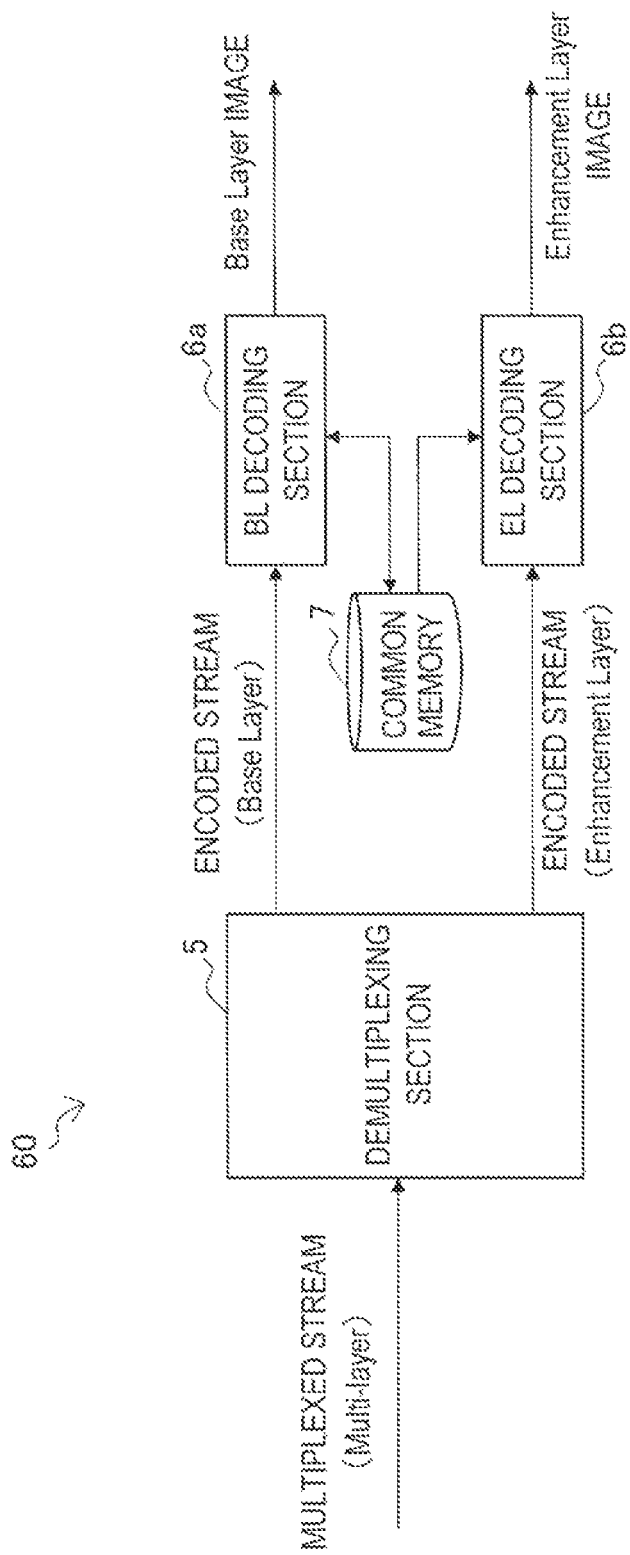
FIG. 4 is a block diagram showing a schematic configuration of an image decoding device according to an embodiment.

FIG. 4 is a block diagram showing a schematic configuration of an image decoding device 60 according to an embodiment supporting scalable video coding. Referring to FIG. 4, the image decoding device 60 includes a demultiplexing section 5, a base layer (BL) decoding section 6a, an enhancement layer (EL) decoding section 6b, and a common memory 7.

The demultiplexing section 5 demultiplexes a multilayer multiplexed stream into an encoded stream of the base layer and an encoded stream of at least one enhancement layer. The BL decoding section 6a decodes a base layer image from an encoded stream of the base layer. The EL decoding section 6b decodes an enhancement layer image from an encoded stream of an enhancement layer. The common memory 7 stores information commonly used between layers.

In the image encoding device 10 illustrated in FIG. 3, the configuration of the BL encoding section 1a to encode the base layer and that of the EL encoding section 1b to encode an enhancement layer are similar to each other. Some parameters and images generated or acquired by the BL encoding section 1a may be buffered by using the common memory 2 and reused by the EL encoding section 1b. In the next section, such a configuration of the EL encoding section 1b will be described in detail.

Similarly, in the image decoding device 60 illustrated in FIG. 4, the configuration of the BL decoding section 6a to decode the base layer and that of the EL decoding section 6b to decode an enhancement layer are similar to each other. Some parameters and images generated or acquired by the BL decoding section 6a may be buffered by using the common memory 7 and reused by the EL decoding section 6b. Further in the next section. such a configuration of the EL decoding section 6b will be described in detail.

<2. Configuration Example Of El Encoding Section In An Embodiment>

[2-1. Overall Configuration]

Figure 5:
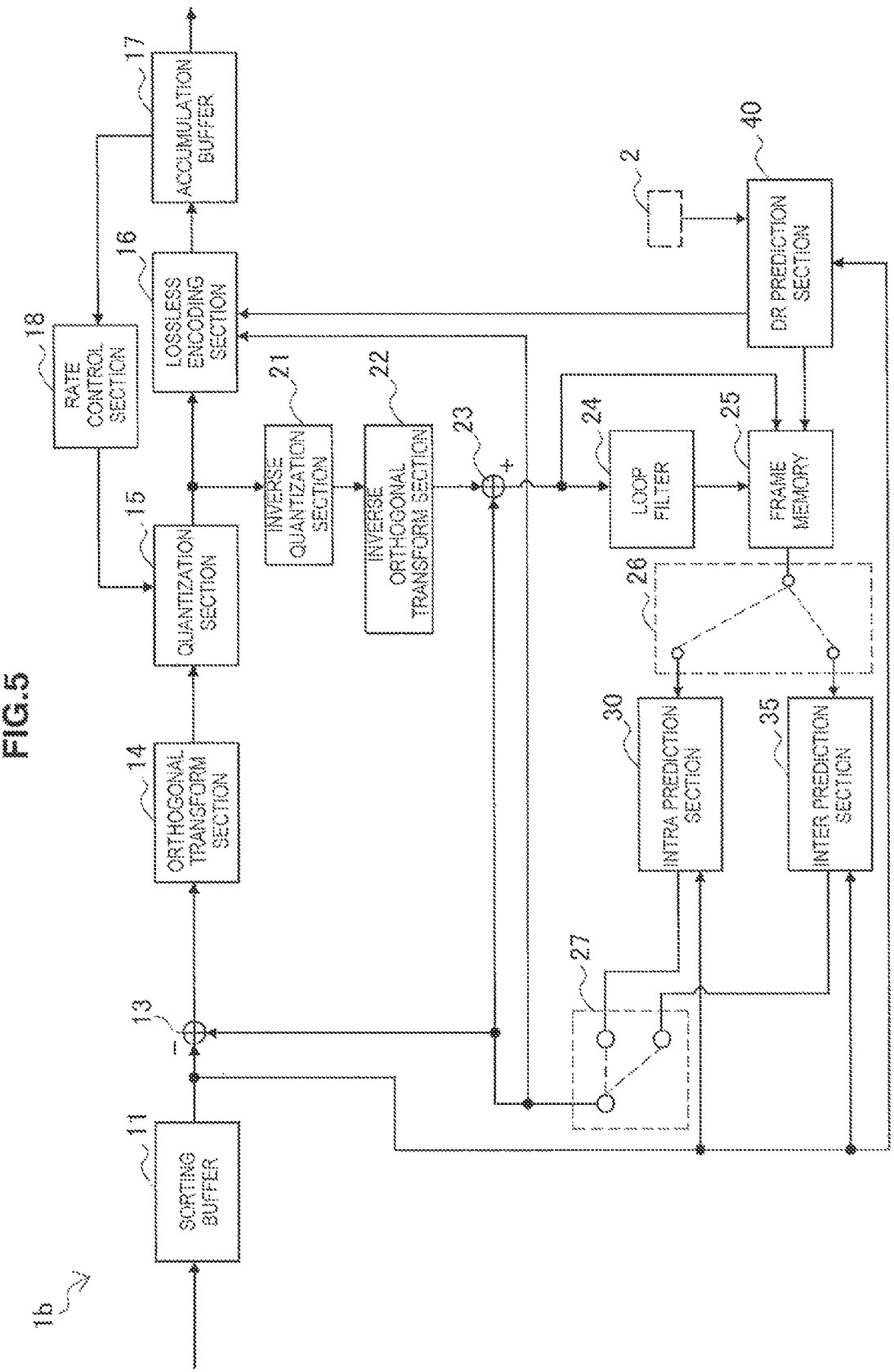
FIG. 5 is a block diagram showing an example of the configuration of an EL encoding section shown in FIG. 3.

FIG. 5 is a block diagram showing an example of the configuration of the EL encoding section 1b illustrated in FIG. 3. Referring to FIG. 5, the EL encoding section 1b includes a sorting buffer 11. a subtraction section 13, an orthogonal transform section 14, a quantization section 15, a lossless encoding section 16, an accumulation buffer 17, a rate control section 18, an inverse quantization section 21. an inverse orthogonal transform section 22, an addition section 23, a loop filter 24, a frame memory 25, selectors 26 and 27, an intra prediction section 30. an inter prediction section 35, and a dynamic range (DR) prediction section 40.

The sorting buffer 11 sorts the images included in the series of image data. After sorting the images according to a GOP (Group of Pictures) structure according to the encoding process, the sorting buffer 11 outputs the image data which has been sorted to the subtraction section 13, the intra prediction section 30, the inter prediction section 35. and the DR prediction section 40.

The image data input from the sorting buffer 11 and predicted image data input by the intra prediction section 30 or the inter prediction section 35 described later are supplied to the subtraction section 13. The subtraction section 13 calculates predicted error data which is a difference between the image data input from the sorting buffer 11 and the predicted image data and outputs the calculated 6 predicted error data to the orthogonal transform section 14.

The orthogonal transform section 14 performs orthogonal transform on the predicted error data input from the subtraction section 13. The orthogonal transform to be performed by the orthogonal transform section 14 may be discrete cosine transform (DCT) or Karhunen-Loeve transform, for example. In HEVC, an orthogonal transform is performed for each block called a transform unit (TU). The TU is a block formed by dividing a coding unit (CU). The orthogonal transform section 14 outputs transform coefficient data acquired by the orthogonal transform process to the quantiation section 15.

The quantization section 15 is supplied with the transform coefficient data input from the orthogonal transform section 14 and a rate control signal from the rate control section 18 to be described below. The quantization section 15 quantizes the transform coefficient data in a quantization step determined according to the rate control signal. The quantization section 15 outputs the quantized transform coefficient data (hereinafter referred to as quantized data) to the lossless encoding section 16 and the inverse quantization section 21.

The lossless encoding section 16 performs a lossless encoding process on the quantized data input from the quantization section 15 to generate an encoded stream of an enhancement layer. The lossless encoding section 16 encodes various parameters referred to when the encoded stream is decoded and inserts the encoded parameters into a header region of the encoded stream. The parameters encoded by the lossless encoding section 16 can include information regarding intra prediction and information regarding inter prediction to be described below. Prediction parameters related to a HDR image prediction (hereinafter referred to as a DR prediction) can further be encoded. Then, the lossless encoding section 16 outputs the generated encoded stream to the accumulation buffer 17.

The accumulation buffer 17 temporarily accumulates an encoded stream 6 input from the lossless encoding section 16 using a storage medium such as a semiconductor memory. Then, the accumulation buffer 17 outputs the accumulated encoded stream to a transmission section (not shown) (for example. a communication interface or an interface to peripheral devices) at a rate in accordance with the band of a transmission path.

The rate control section 18 monitors the free space of the accumulation buffer 17. Then, the rate control section 18 generates a rate control signal according to the free space on the accumulation buffer 17. and outputs the generated rate control signal to the quantization section 15. For example, when there is not much free space on the accumulation buffer 17, the rate control section 18 generates a rate control signal for lowering the bit rate of the quantized data. Also, for example, when the free space on the accumulation buffer 17 is sufficiently large, the rate control section 18 generates a rate control signal for increasing the bit rate of the quantized data.

The inverse quantization section 21, the inverse orthogonal transform section 22. and the addition section 23 form a local decoder. In the quantization step used by the quantization section 15, the inverse quantization section 21 performs inverse quantization on the quantized data of an enhancement layer to thereby restore the transform coefficient data. Then, the inverse quantization section 21 outputs the restored transform coefficient data to the inverse orthogonal transform section 22.

The inverse orthogonal transform section 22 performs an inverse orthogonal transform process on the transform coefficient data input from the inverse quantization section 21 to thereby restore the predicted error data. As in the orthogonal transform, the inverse orthogonal transform is performed for each TU. Then, the inverse orthogonal transform section 22 outputs the restored predicted error data to the addition section 23.

The addition section 23 adds the restored predicted error data input from the inverse orthogonal transform section 22 and the predicted image data input from the intra prediction section 30 or the inter prediction section 35 to thereby generate decoded image data (reconstructed image of the enhancement layer). Then, the addition section 23 outputs the generated decoded image data to the loop filter 24 and the frame memory 25.

The loop filter 24 includes a filter group for the purpose of improving image quality. A deblock filter (DF) is a filter that reduces block distortion occurring when an image is encoded. A sample adaptive offset (SAO) filter is a filter that adds an adaptively determined offset value to each pixel value. An adaptive loop filter (ALF) is a filter that minimizes an error between an image subjected to the SAO and an original image. The loop filter 24 filters the decoded image data input from the addition section 23 and outputs the filtered decoded image data to the frame memory 25.

The frame memory 25 stores the decoded image data of the enhancement layer input from the addition section 23, the filtered decoded image data of the enhancement layer input from the loop filter 24, and reference image data of the base layer input from the DR prediction section 40 using a storage medium.

The selector 26 reads the decoded image data before the filtering used for the intra prediction from the frame memory 25 and supplies the read decoded image data as reference image data to the intra prediction section 30. Further, the selector reads the filtered decoded image data used for the inter prediction from the frame memory 25 and supplies the read decoded image data as reference image data to the inter prediction section 35. When inter layer prediction is performed by the intra prediction section 30 or the inter prediction section 35, the selector 26 supplies the reference image data of the base layer to the intra prediction section 30 or the inter prediction section 35.

In the intra prediction mode, the selector 27 outputs predicted image data as a result of intra prediction output from the intra prediction section 30 to the subtraction section 13 and also outputs information about the intra prediction to the lossless encoding section 16. Further, in the inter prediction mode, the selector 27 outputs predicted image data as a result of inter prediction output from the inter prediction section 35 to the subtraction section 13 and also outputs information about the inter prediction to the lossless encoding section 16. The selector 27 switches the inter prediction mode and the intra prediction mode in accordance with the magnitude of a cost function value.

The intra prediction section 30 performs an intra prediction process on each prediction unit (PU) of HEVC based on the original image data and the decoded image data of the enhancement layer. For example, the intra prediction section 30 evaluates a prediction result according to each candidate mode in a prediction mode set using a predetermined cost function. Next, the intra prediction section 30 selects a prediction mode in which a cost function value is the minimum, i.e., a prediction mode in which a compression ratio is the highest, as an optimum prediction mode. The intra prediction section 30 generates predicted image data of the enhancement layer according to the optimum prediction mode. The intra prediction section 30 may include intra BL prediction which is a kind of inter layer prediction in the prediction mode set in the enhancement layer. In the intra BL prediction, a co-located block in the base layer corresponding to a prediction target block of the enhancement layer is used as a reference block, and a predicted image is generated based on a decoded image of the reference block. The intra prediction section 30 may include intra residual prediction which is a kind of inter layer prediction. In the intra residual prediction, a predicted error of intra prediction is predicted based on the predicted error image of the reference block which is the co-located block in the base layer, and a predicted image for which the predicted error has been predicted and added is generated. The intra prediction section 30 outputs information regarding the intra prediction including prediction mode information indicating the selected optimum prediction mode, the cost function value, and the predicted image data to the selector 27.

The inter prediction section 35 performs an inter prediction process on each prediction unit (PU) of HEVC based on the original image data and the decoded image data of the enhancement layer. For example, the inter prediction section 35 evaluates a prediction result according to each candidate mode in a prediction mode set using a predetermined cost function. Next, the inter prediction section 35 selects a prediction mode in which a cost function value is the minimum, i.e., a prediction mode in which a compression ratio is the highest, as an optimum prediction mode. The inter prediction section 35 generates predicted image data of the enhancement layer according to the optimum prediction mode. The inter prediction section 35 may include inter residual prediction which is a kind of inter layer prediction. In the inter residual prediction, a predicted error of intra prediction is predicted based on the predicted error image of the reference block which is the co-located block in the base layer, and a predicted image for which the predicted error has been predicted and added is generated. The inter prediction section 35 outputs information regarding the intra prediction including prediction mode information and motion information indicating the selected optimum prediction mode, the cost function value. and the predicted image data to the selector 27.

The DR prediction section 40 up-samples an image (a decoded image or a prediction error image) of the base layer buffered by the common memory 2 according to the resolution ratio between the base layer and the enhancement layer. Further, when the image of the enhancement layer has the larger luminance dynamic range than the image of the base layer, the DR prediction section 40 converts the dynamic range of the up-sampled image of the base layer into the same dynamic range as the image of the enhancement layer. In the present embodiment, the DR prediction section 40 converts the dynamic range by approximately predicting the image of the enhancement layer from the image of the base layer based on the premise of the independent linear relation of each color component between the base layer and the enhancement layer. The image of the base layer whose dynamic range has been converted by the DR prediction section 40 may be stored in the frame memory 25 and used as the reference image at the time of inter-layer prediction by the intra prediction section 30 or the inter prediction section 35. Furthermore, the DR prediction section 40 generates several parameters used for DR prediction. For example, the parameters generated by the DR prediction section 40 include a prediction mode parameter indicating the prediction mode. Further, when an adaptive parameter mode is selected as the prediction mode, the parameters generated by the DR prediction section 40 include a prediction parameter of each color component, that is, a gain and an offset. The DR prediction section 40 outputs the prediction mode parameter and the prediction parameter to the lossless encoding section 16.

FIG. 6A is a table indicating three candidates of the prediction mode when an HDR image is predicted from an SDR image. Referring to FIG. 6A, a prediction mode number is any one of "0," "1," and "2," and there are three types of prediction mode candidates. When the prediction mode number is "0," a pixel value ($Y_{HDR}, U_{HDR}, V_{HDR}$) of an HDR image is predicted from a pixel value ($Y_{SDR}, U_{SDR}, V_{SDR}$) of an SDR image of each color component through a bit shift (bit increment) as in the following Formulas (1) to (3). In Formulas (1) to (3), $n_{shift}$ indicates the number of bits corresponding to a dynamic range difference. This prediction mode is referred to as a bit shift mode in the present specification.

[Math 1]

$$Y_{HDR} = Y_{SDR} << n_{shift} \quad (1)$$

$$U_{HDR} = U_{SDR} << n_{shift} \quad (2)$$

$$V_{HDR} = V_{SDR} << n_{shift} \quad (3)$$

When the prediction mode number is "1" or "2," a pixel value of a HDR image is predicted from a pixel value of an SDR image for each color component through linear conversion using a gain $g_i$ and an offset $o_i$ (i=1, 2, 3) as in the following Formulas (4) to (6).

[Math 2]

$$Y_{HDR} = g_1 \cdot Y_{SDR} + o_1 \quad (4)$$

$$U_{HDR} = g_2 \cdot U_{SDR} + o_2 \quad (5)$$

$$V_{HDR} = g_3 \cdot V_{SDR} + o_3 \quad (6)$$

When the prediction mode number is "1," fixed values specified in advance are used as values of the gain and the offset. The prediction mode in which the prediction mode number is "1" is referred to as a fixed parameter mode in the present specification. When the prediction mode number is "2," variable values that are designated adaptively are used as values of the gain and the offset. The prediction mode in which the prediction mode number is "2" is referred to as an adaptive parameter mode in the present specification. When the adaptive parameter mode is selected, six types of prediction parameters (three gains and three offsets) are additionally encoded as the prediction parameter.

FIGS. 6B and 6C are explanatory views for describing an example of a syntax of the prediction parameter. "use_dr_wediction" in a 3rd line of FIG. 6B is a flag indicating whether or not a PPS (Picture Parameter Set) includes a syntax for dynamic range prediction. "dr_pred_data ( )" in a 5th line of FIG. 6B is a function of a syntax for DR scalability, and content thereof is illustrated in FIG. 6C. "dr_rediction_model" in a 1st line of FIG. 6C is a parameter indicating a selected prediction mode. and has a value of any one of "0," "1." and "2" illustrated in FIG. 6A. In the cue of the adaptive parameter mode ("dr_pediction_model=2"), the number of bits ("numFactionBits") corresponding to a denominator of a gain in a 3rd line, a numerator ("dr_prediction_pin[I]") of a gain on an I-th color component in a 5th line, and an offset ("dr_prediction_offset[I]") on an I-th color component in a 6th line are designated.

Further, the adaptive parameter mode is a mode in which the highest prediction accuracy can be expected among the three prediction modes. In order to reduce the code amount of the prediction parameter that can be encoded in units of pictures in the adaptive parameter mode, the DR prediction section 40 may calculate a difference from a previous value of the prediction parameter. In this case, the prediction mode parameter, and the difference of the prediction parameter may be encoded through the lossless encoding section 16.

[2-2. Detailed Configuration of DR Prediction Section]

FIG. 7 is a block diagram illustrating an example of a configuration of the DR prediction section 40 illustrated in FIG. 5. Referring to FIG. 7, the DR prediction section 40 includes an up-sampling section 41, a prediction mode setting section 42, a parameter calculation section 43, and a dynamic range (DR) conversion section 44.

(1) Up-Sampling Section

The up-sampling section 41 up-samples the image of the base layer acquired from the common memory 2 according to the resolution ratio between the base layer and the enhancement layer. More specifically, the up-sampling section 41 calculates an interpolation pixel value of each of interpolation pixels sequentially scanned according to the resolution ratio by filtering the image of the base layer using a predefined filter coefficient. As a result, the space resolution of the image of the base layer used as the reference block is increased up to the resolution equal to that of the enhancement layer. The up-sampling section 41 outputs the up-sampled image to the parameter calculation section 43 and the DR conversion section 44. When the layers have the same resolution, the up-sampling may be skipped. In this case, the up-sampling section 41 may output the image of the base layer to the parameter calculation section 43 and the DR conversion section 44 without change.

(2) Prediction Mode Setting Section

The prediction mode setting section 42 sets the prediction mode that is defined in advance or dynamically selected among the prediction mode candidates for DR prediction to the DR prediction section 40. The prediction mode candidate may include the bit shift mode, the fixed parameter mode, and the adaptive parameter mode. In an embodiment. the prediction mode setting section 42 may set an optimum prediction mode in units of pictures. In another embodiment, the prediction mode setting section 42 may set an optimum prediction mode in units of slices. One picture may include one or more slices. Further, in another embodiment, the prediction mode setting section 42 may set the prediction mode in units of sequences and may maintain the same prediction mode over a plurality of pictures and a plurality of slices in one sequence. The prediction mode setting section 42 may evaluate the coding efficiency or the prediction accuracy on each of the prediction mode candidates and select the optimum prediction mode. The prediction mode setting section 42 outputs the prediction mode parameter indicating the set prediction mode to the lossless encoding section 16.

(3) Parameter Calculation Section

When the adaptive parameter mode is set through the prediction mode setting section 42, or when the coding efficiency or the prediction accuracy of the adaptive parameter mode is evaluated through the prediction mode setting section 42, the parameter calculation section 43 calculates the prediction parameter to be used in the adaptive parameter mode. The prediction parameter includes the gain $g_i$ and the offset $o_i$ (i=1, 2, 3) illustrated in Formulas (4) to (6). Here, a subscript i means each of the three types of color components. The gain $g_i$ is a coefficient by which the pixel value of the base layer is multiplied. The offset $o_i$ is a numerical value added to the product of the pixel value of the base layer and the gain $g_i$. For example, the parameter calculation section 43 may calculate a gain and an offset capable of bringing the up-sampled image of the base layer input from the up-sampling section 41 closest to the original image input from the sorting buffer 11 for each color component.

Further, in one modified example, the parameter calculation section 43 may calculate a difference from the previous values of the gain and the offset when the prediction mode setting section 42 sets the adaptive parameter mode as the prediction mode. Here, the previous value may be, for example. a value calculated for an immediately previous picture when the gain and the offset are calculated for each picture. The previous value may be a value calculated for a slice (co-located slice) at the same position of an immediately previous picture when the gain and the offset are calculated for each slice. When the bit shift mode is set to the immediately previous picture or the slice at the same position as the immediately previous picture. the parameter calculation section 43 may use the values of the gain and the offset corresponding to the bit shift amount as the basis of the difference. Further, when the fixed parameter mode is set to the immediately previous picture or the slice at the same position as the immediately previous picture, the parameter calculation section 43 may use predefined fixed values of the gain and the offset as the basis of the difference.

The parameter calculation section 43 outputs the calculated gain and the offset (or the difference thereof) to the lossless encoding section 16. The value of the gain may include a fractional value. In this regard, the prediction mode setting section 42 may resolve the value of the gain into the denominator and the numerator and output the denominator and the numerator (or the difference thereof) to the lossless encoding section 16. Further, the prediction mode setting section 42 may limit the value of the denominator of the gain only to an integral power of two in order to increase the coding efficiency and reduce the calculation cost. In this case, a logarithm having 2, the value of the denominator, as its base may be used as the prediction parameter.

(4) DR Conversion Section

The DR conversion section 44 converts the dynamic range of the up-sampled SDR image of the base layer input from the up-sampling section 41 according to the prediction mode set by the prediction mode setting section 42 into the same dynamic range as the HDR image of the enhancement layer. For example, when the bit shift mode is set, the DR conversion section 44 calculates a prediction pixel value by shifting the up-sampled pixel value of the base layer left by a certain bit shift amount according to Formulas (1) to (3). Further, when the fixed parameter mode is set. the DR conversion section 44 calculates the prediction pixel value by multiplying the up-sampled pixel value of the base layer by the fixed gain according to Formulas (4) to (6) and further adding the fixed offset. Further, when the adaptive parameter mode is set, the DR conversion section 44 calculates the prediction pixel value using the gain and the offset adaptively calculated by the parameter calculation section 43 instead of the fixed gain and the fixed offset. As a result, the reference image for the inter-layer prediction is generated. The DR conversion section 44 stores the generated reference image for the inter-layer prediction (the image of the base layer having the large dynamic range corresponding to the HDR image) in the fame memory 25.

[2-3. Example of Syntax]

(1) Basic Example

The prediction mode parameter output from the prediction mode setting section 42 and the prediction parameter (the gain and the offset of each color component) output from the parameter calculation section 43 may be encoded through the lossless encoding section 16 illustrated in FIG. 5 and inserted into the encoded stream of the enhancement layer. FIG. 8 is an explanatory view for describing an example of a syntax of an encoded parameter for the DR prediction. Here, an example in which the differences of the gain and the offset are encoded is illustrated herein, but a syntax described herein can be applied ("delta_" in the head of a parameter name may be deleted) even when the gain and the offset are encoded.

For example, the syntax illustrated in FIG. 8 may be included in a PPS or a slice header. "dr_prediction_flag" in a 1st line of the syntax is a flag indicating whether or not the PPS or the slice header includes a syntax extended for the DR prediction. "dr_prediction_model" in a 3rd line is a prediction mode parameter indicating the prediction mode set by the prediction mode setting section 42. As described above with reference to FIG. 6A, when the prediction mode parameter is equal to "0," the prediction mode is the bit shift mode. When the prediction mode parameter is equal to "1," the prediction mode is the fixed parameter mode. When the prediction mode parameter is "2," the prediction mode is the adaptive parameter mode. The present disclosure is not limited to this example, and any other type of prediction mode may be employed. Prediction parameters in 5th and subsequent lines are encoded when the prediction mode parameter indicates the adaptive parameter mode. "delta_luma_log 2_pin_denom" in a 10th line is a difference from the previous value for a logarithm having 2 of the value of the denominator of the gain of the luma component as the base. "delta_luma_pain_dr" in an 11th line is a difference from the previous value for the value of the numerator of the gin of the luma component. "delta_luma_offset_dr" in a 12th line is a difference of the value of the luma component. Further, when "luma_gain_dr_flag" in a 5th line indicates zero, encoding of the difference of the prediction parameter of the luma component may be omitted. In this case, the previous value of the prediction parameter may be used even in the latest picture or slice without change (that is, a difference of zero). "delta_chroma_log 2_gain_denom" in a 15th line is a difference from the previous value for a logarithm having 2, a value of a denominator of a gain of a chroma component, as its base. Further, an example in which a common denominator of the two chroma components is used is illustrated in FIG. 8, but different denominators may be used for the two chroma components, or the denominator of the gain of the luma component and the denominator of the pin of the chroma component may be standardized. "delta_chroma_gain_dr[j]" in a 17th line is a difference from the previous value for a numerator of a gain of a j-th (j=1,2) chroma component. "delta_chroma_offset_dr[j]" in an 18th line is a difference from the previous value for a value of an offset of the j-th chroma component. Further, when "chroma_gain_dr_flag" in a 7th line indicates zero, encoding of the difference of the prediction parameter of the chroma component may be omitted. In this case, the previous value of the prediction parameter may be used even in the latest picture or slice (that is, a difference of zero).

In the example of FIG. 8, the prediction mode parameter "dr_prediction_model" is encoded for each PPS or slice header. In this case, even when the prediction mode parameter of the latest picture or slice indicates the adaptive parameter mode, the prediction mode parameter does not necessarily indicate the adaptive parameter mode for an immediately previous picture or a slice at the same position as an immediately previous picture serving as the basis of the difference. For example, when an immediately previous prediction mode parameter indicates the bit shift mode, difference parameters with a prefix "delta_" in the syntax of FIG. 8 indicate differences calculated by subtracting the parameter value corresponding to the bit shift amount from the latest value (gain or offset) of the prediction parameter. For example, when the bit shift amount $n_{shift}$ is equal to 2, a value of a corresponding gain is $2^2=4$. A value of a corresponding offset may be zero regardless of the bit shift amount $n_{shift}$. Further, when an immediately previous prediction mode parameter indicates the fixed parameter mode. the difference parameters in the syntax of FIG. 8 indicate differences calculated by subtracting a fixed parameter value (a gain $g_{i\_fixed}$ or an offset $o_{i\_fixed}$) from the latest value (gain or offset) of the prediction parameter. The gin $g_{i\_fixed}$ and the offset $o_{i\_fixed}$ a may be stored in the encoder and the decoder in advance without being encoded. When an immediately previous prediction mode parameter indicates the adaptive parameter mode, the difference parameters in the syntax of FIG. 8 indicate differences calculated by subtracting an immediately previous parameter value (the gain $g_{i\_prev}$ or the offset $o_{i\_prev}$) from the latest value (gain or offset) of the prediction parameter. FIG. 9 illustrates the basis of the differences of the gin and the offset described herein in a table form. Further, when there is a previous value, for example in the head of the sequence, the basis of the difference may be zero or may be a fixed parameter value (the gain $g_{i\_fixed}$ or the offset $o_{i\_fixed}$).

(2) Encoding of Prediction Mode Parameter in Units of Sequences

An extension flag "dr_prediction_flag" in the 1st line and the prediction mode parameter "dr_pediction_model" in the 3rd line of FIG. 8 may be encoded in units of sequences and inserted in an SPS (Sequence Parameter Set). In this case, the same prediction mode is maintained within one sequence. If the prediction mode is not changed within one sequence, since it is unnecessary to switch the basis of the difference depending on the immediately previous prediction mode as illustrated in FIG. 9, the difference calculation complexity is mitigated, and it is easy to implement the device. Further, it is possible to reduce the code amount for the extension flag and the prediction mode parameter.

(3) Encoding of Prediction Parameter in Units of Slices or Tiles

Figure 10:
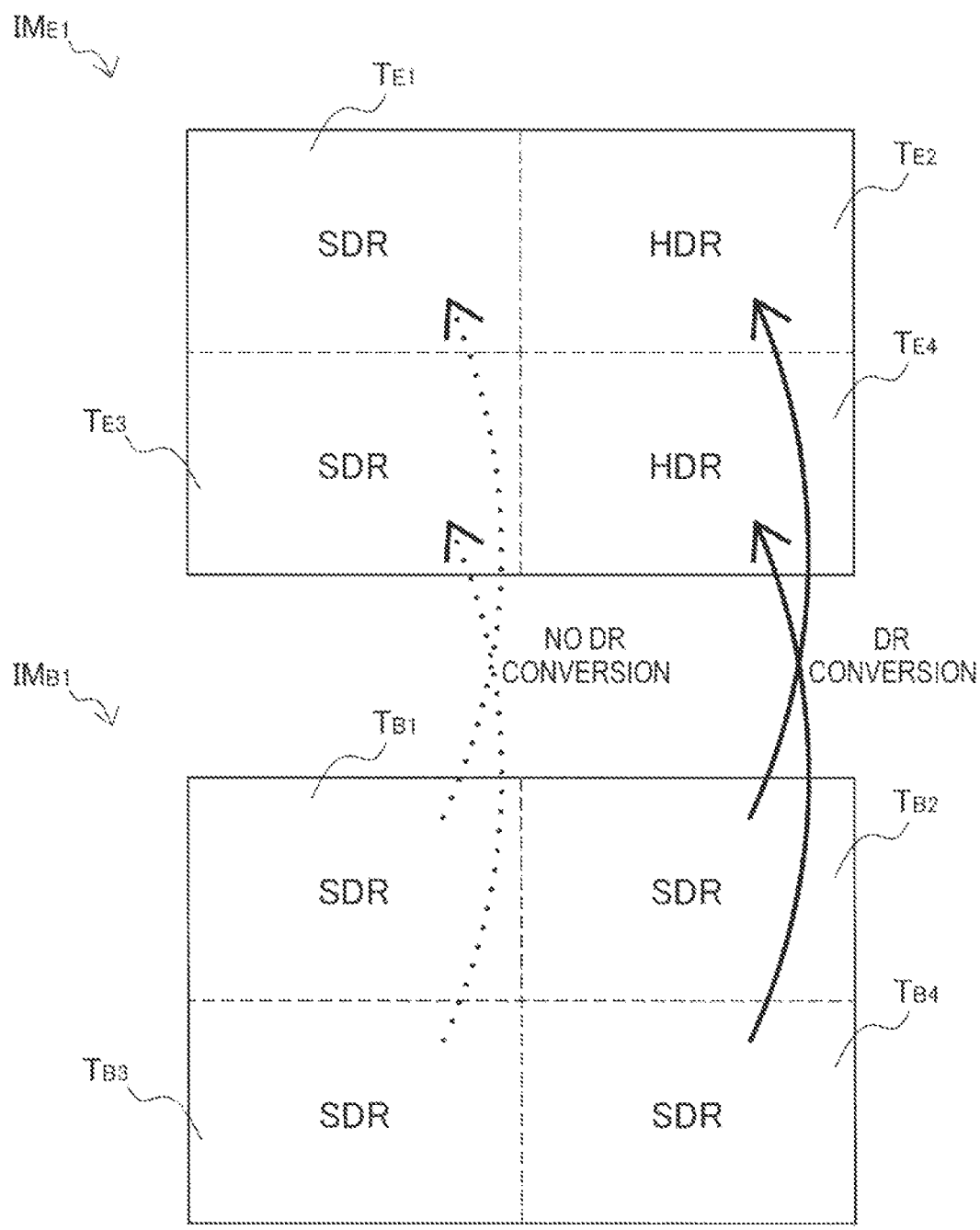
FIG. 10 is an explanatory view for describing an example of an encoding purpose of a gain and an offset of each slice.

The prediction mode parameter and the prediction parameter for the DR prediction have been described as being encoded and then inserted into the PPS with reference to FIGS. 6B and 6C. However. if the purpose for which a different luminance dynamic range differing according to a partial region of an image is used is considered, it is advantageous to encode the differences of the prediction mode parameter and the prediction parameter in units of slices or tiles. For example, in an example illustrated in FIG. 10, a base layer image $IM_{B1}$ is divided into four tiles $T_{B1}$, $T_{B2}$, $T_{B3}$, and $T_{B4}$. An enhancement layer image $IM_{E1}$ is divided into four tiles $T_{E1}$, $T_{E2}$, $T_{E3}$, and $T_{E4}$. The four tiles project videos imaged by different cameras. For example, the base layer image $IM_{B1}$ may display an SDR version of a composite video from cameras installed at four locations, and the tiles $T_{E2}$ and $T_{E4}$ of the enhancement layer image $IM_{E1}$ may display an HDR version of the same composite video as the tiles $T_{B2}$ and $T_{B4}$. In this case, it is possible to perform the optimum DR prediction in units of tiles and increase the coding efficiency by encoding the prediction mode parameters and the prediction parameters in the slice headers of the slices corresponding to the tile $T_{E2}$ and the tile $T_{E4}$.

(4) Reuse of Syntax for Weighted Prediction

The syntax of the prediction parameter of the DR prediction illustrated in FIG. 8 is similar to the syntax of the parameter related to the weighted prediction introduced in the HEVC. The weighted prediction is a technique introduced to improve the prediction accuracy of the inter prediction for a video to which an effect such as fade-in and fade-out is applied. FIG. 11 illustrates a syntax defined for a weighted prediction-related parameter in Non-Patent Literature 1.

"luma_log 2_weight_denom" in a 2nd line and "delta_chroma_log 2_weight_denom" in a 4th line of FIG. 11 specify values of weight denominators of the luma component and the chroma component in common to an L0 reference frame and an L reference frame that can be used in the weighted prediction. 5th to 20th lines specify remaining weighted prediction-related parameters for the L0 reference frame. 21st to 38th lines specify remaining weighted prediction-related parameters for the L1 reference frame when bi-prediction is possible. Meanings of individual parameters are described in Non-Patent Literature 1.

Table 1 shows an example of mapping between the weighted prediction-related parameters illustrated in FIG. 11 and the DR prediction parameters illustrated in FIG. 8. As understood from Table 1. all parameters excluding the extension flag "dr_prediction_flag" and the prediction mode parameter "dr_prediction_model" among the DR prediction parameters illustrated in FIG. 8 can be mapped with any one of the weighted prediction parameters. Roles of individual parameters may differ, for example, since the value of the weighted prediction-related parameter does not necessarily mean the difference from the previous value, but the form of the parameters to be mapped are the same. Since one reference frame (the base layer image) is used in the DR prediction, an argument i and a variable "num_ref_idx_10_active_minus1" corresponding to a reference frame number are unnecessary.

TABLE 1

| Weighted prediction-related parameter | DR prediction parameter |
|---|---|
| - | dr_prediction_flag |
| - | dr_prediction_model |
| luma_log2_weight_denom | delta_luma_log2_gain_denom |
| delta_chroma_log2_weight_denom | delta_chroma_log2_gain_denom |
| num_ref_idx_l0_active_minus1 | NOT NEEDED |
| luma_weight_l0_flag[i] | luma_gain_dr_flag |
| chroma_weight_l0_flag[i] | chroma_gain_dr_flag |
| delta_luma_weight_l0[i] | delta_luma_gain_dr |
| luma_offset_l0[i] | delta_luma_offset_dr |
| delta_chroma_weight_l0[i][j] | delta_chroma_gain_dr[j] |
| delta_chroma_offset_l0[i][j] | delta_chroma_offset_dr[j] |

In this regard, in an embodiment, for example, the lossless encoding section may encode the prediction parameter of the DR prediction within the header (slice header) having the syntax shared with the weighted prediction-related parameter. Thus, it is unnecessary to define a new syntax, the redundancy of the syntax is reduced, and it is easy to implement the encoder and the decoder and secure compatibility at the time of version upgrade. The extension flag "dr_prediction_flag" and the prediction mode parameter "dr_prediction_model" may be separately encoded in the SPS, the PPS, or the slice header. Further, a flag indicating whether or not one of the weighted prediction-related parameter and the DR prediction parameter has been encoded may be additionally encoded.

Effects such as fade-in and fade-out are commonly applied to both the base layer and the enhancement layer equally. Thus, in order to increase the coding efficiency, it is advantageous to reuse the weighted prediction-related parameter between layers. When the weighted prediction-related parameter of the base layer is reused in the enhancement layer, the lossless encoding section 16 does not encode the weighted prediction-related parameter specific to the enhancement layer. In this case, the syntax of FIG. 11 defined in Non-Patent Literature 1 is not used for the weighted prediction in the enhancement layer. In this regard, by encoding the prediction parameter of the DR prediction using the same syntax instead of the weighted prediction-related parameter, it is possible to efficiently me the definition of the syntax. In this case, the syntax (the 11th to 38th lines of FIG. 11) for the parameters of the L1 reference frame may not be used. A value of the variable "num_ref idx_10_active_minus1" corresponding to the number of reference frames (minus 1) may be considered to be zero (that is, the number of base layer images whose dynamic range has to be converted is 1).

In another embodiment, the weighted prediction-related parameters may be encoded even in the enhancement layer, and some parameters may be used for the DR prediction. For example, the denominators defined by "luma_log 2_weight_denom" and "delta_chroma_log 2_weight_denom" illus- trated in FIG. 11 may be reused as the denominators of the gains of the luma component and the chroma component. In this case, the lossless encoding section 16 does not encode "delta_luma_log 2_gain_denom" and "delta_chroma_log 2_gain_denom" illustrated in FIG. 8. As a result, it is possible to reduce the code amount additionally necessary for the DR prediction and increase the coding efficiency.

(5) Provision of Two Versions of Prediction Parameter

In the previous section, it has been described that the syntax for the parameter of the L1 reference frame may not be used when the syntax of the weighted prediction-related parameter is reused for the prediction parameter of the DR prediction. However, in a modified example, two versions of the prediction parameter of the DR prediction may be provided by reusing both the syntax of the parameter of the L0 reference frame and the syntax of the parameter of the L1 reference frame.

For example, when the adaptive parameter mode is set by the prediction mode setting section 42 or when the coding efficiency or the prediction accuracy of the adaptive parameter mode is evaluated, the parameter calculation section 43 of the DR prediction section 40 calculates a first version of the gain $g_i$ and the offset $o_i$ (i=1, 2, 3). The parameter calculation section 43 calculates a second version of the gain $g_i$ and the offset $o_i$ (i=1, 2, 3) as well. Then, the DR conversion section 44 selectively uses the first version and the second version of the prediction parameter in order to predict the image of the enhancement layer, that is, in order to generate the reference image for the inter-layer prediction. Further, the parameter calculation section 43 may calculate the difference from the previous value for the first version of the prediction parameter and the difference from the previous value for the second version of the prediction parameter. The lossless encoding section 16 encodes the value (or the difference thereof) calculated for the first version as an L0 reference frame part of the syntax shared with the weighted prediction-related parameter. Further, the lossless encoding section 16 encodes the value (or the difference thereof) calculated for the second version as an L1 reference frame part of the syntax shared with the weighted prediction-related parameter.

Two exemplary techniques for switching a version to be used to predict the image of the enhancement layer will be described below.

(5-1) First Technique

In a first technique, the first version and the second version of the prediction parameter are selectively used according to a band to which a pixel value belongs. Here, the band of the pixel value is not limited to but may correspond to brightness for the luma component and vividness for the chroma component.

Figure 12:
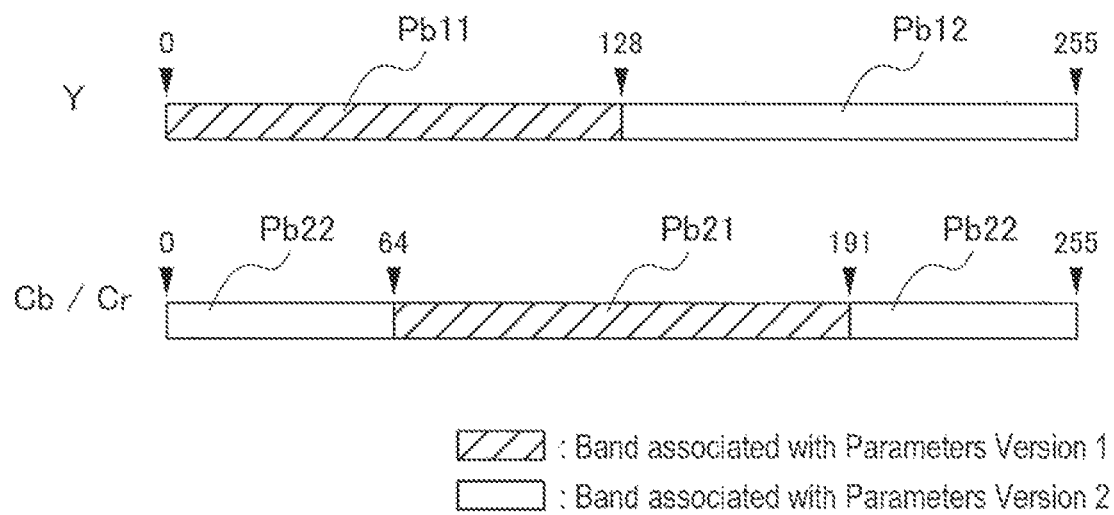
FIG. 12 is an explanatory view for describing selective use of a prediction parameter according to a band to which a pixel value belongs.

FIG. 12 is an explanatory view for describing selective use of the prediction parameter according to the band to which the pixel value belongs. FIG. 12 illustrates two bans representing pixel value ranges of the luma component (Y) and the chroma component (Cb/Cr), and when the bit depth is 8 bits, the ranges are 0 to 255. The range of the luma component is divided into a lower band Pb11 and an upper band Pb12 based on a boundary value, and in the example of FIG. 12, the boundary value of the luma component is equal to 128 (that is, the center of the range). Then, when the pixel value of the luma component (of the up-sampled image, for example) belongs to the band Pb11, the DR conversion section 44 may use the first version of the prediction parameter in calculating the prediction pixel value from the pixel value. Further, when the pixel value of the luma component belongs to the band Pb12, the DR conversion section 44 may use the second version of the prediction parameter in calculating the prediction pixel value from the pixel value. Further, the range of the chrome component is divided into an inner band Pb21 and an outer band Pb22 based on two boundary values, and in the example of FIG. 12, the boundary values of the chroma component are equal to 64 and 191 (that is, a value of ¼ of the range and a value of ¾ of the range). Then, when the pixel value of the chroma component (of the up-sampled image, for example) belongs to the band Pb21, the DR conversion section 44 may use the first version of the prediction parameter in calculating the prediction pixel value from the pixel value. Further, when the pixel value of the chroma component belongs to the band Pb22, the DR conversion section 44 may use the second version of the prediction parameter in calculating the prediction pixel value from the pixel value.

The boundary value for switching of the version to be used may be known to both the encoder and the decoder in advance. Instead, the lossless encoding section 16 may further encode boundary information specifying the boundary value. For example, for the luma component, the boundary information may indicate an adjustment value for the luma component added to the reference value of the center of the range (for example, 128 when the bit depth is 8 bits). Further, for the chroma component, the boundary information may indicate an adjustment value for the chroma component that is subtracted from a first reference value equal to ¼ of the range and added to a second reference value equal to ¾ of the range.

Figure 13:
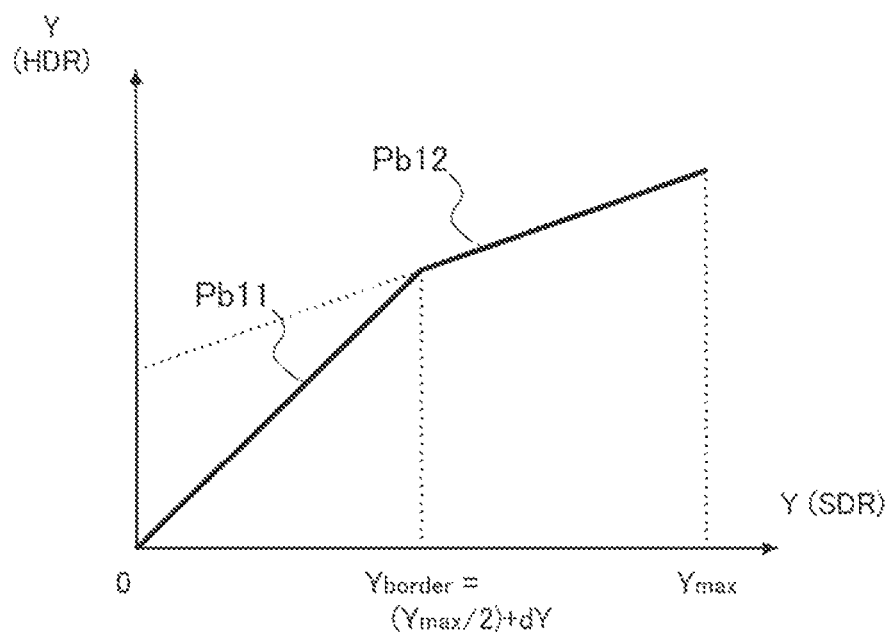
FIG. 13 is a graph schematically representing a prediction model represented by a technique described with reference to FIG. 12 for a luma component.

FIG. 13 is a graph schematically representing the prediction model represented by the first technique for the luma component. A horizontal axis of the graph of FIG. 13 corresponds to the pixel value of the luma component of the base layer, and the pixel value is represented by the SDR. A vertical axis corresponds to the pixel value of the luma component of the enhancement layer, and the pixel value is represented by the HDR. A thick line indicates the trajectory of the prediction pixel value of the enhancement layer predicted from the pixel value of the base layer using the gain and the offset of the adaptive parameter mode. In the trajectory, a left band Pb11 and a right band P12 of a boundary value $Y_{border}$ on the horizontal axis have different inclinations and segments and form a broken line shape. When it is possible to use the prediction model of drawing the trajectory of the broken line shape, it is possible to reduce the prediction error of the DR prediction and improve the coding efficiency, compared to the perfectly linear (that is, the trajectory of the straight line shape) prediction model. The boundary value $Y_{border}$ may be equal to half ($Y_{max}/2$) of a maximum value $Y_{max}$ of the pixel value of the luma component of the base layer or may be equal to a value obtained by adding an adjustment value dY to $Y_{max}/2$. Additional encoding of the adjustment value dY means that the boundary value $Y_{border}$ can be adaptively controlled. In this case, it is possible to further increase the prediction accuracy as a result of extension of flexibility of the prediction model of the DR prediction.

FIG. 14 is an explanatory view for describing an example of a syntax associated with the technique described above with reference to FIG. 12. A line number in the syntax illustrated in FIG. 14 corresponds to the line number of the syntax of the weighted prediction-related parameter illustrated in FIG. 11. In the syntax of the weighted prediction-related parameter, a part for the parameter of the L1 reference frame is omitted from FIG. 14 for the sake of concise description. Referring to FIG. 14, an additional flag "inter_layer_pred_flag" is defined after a 2nd line. The flag "inter_layer_pred_flag" is set to True when the syntax is used for the DR prediction parameter. A parameter "delta_pix_value_luma[i]" after a 13th line is the boundary information for the luma component. As an example, the parameter "delta_pix_value_luma[i]" specifies the adjustment value for the luma component added to the reference value of the center of the range for the luma component. A parameter "delta_pix_value_chroma[i][j]" after an 18th line is the boundary information for the chroma component. As an example, the parameter "delta_pix_value_chroma[i][j]" specifies the adjustment value for the chroma component that is subtracted from the first reference value equal to ¼ of the range and added to the second reference value equal to ¾ of the range for the chrome component. The additional parameters illustrated in FIG. 14 may be included in an extension of the slice header rather than the slice header.

(5-2) Second Technique

In a second technique, the first version and the second version of the prediction parameter are selectively used according to an image region to which a pixel belongs. Here, the image region may correspond to each of individual regions that can be formed by segmenting a picture, a slice, or a tile.

Figure 15:
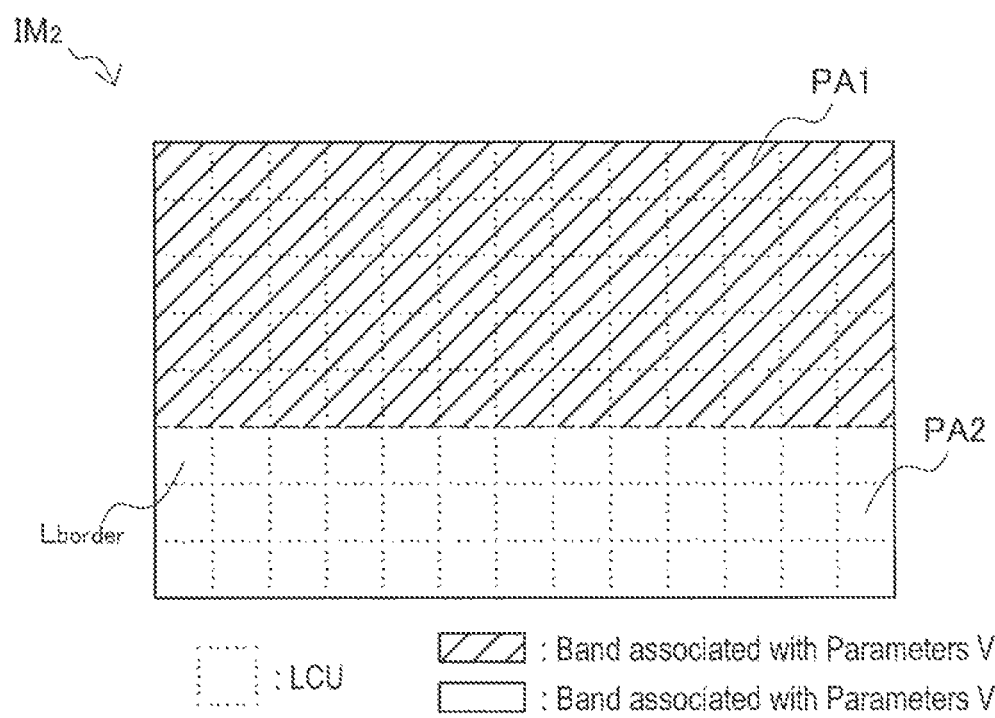
FIG. 15 is an explanatory view for describing selective use of a prediction parameter according to an image region to which a pixel belongs.

FIG. 15 is an explanatory view for describing selective use of the prediction parameter according to an image region to which a pixel belongs. Referring to FIG. 15, an image $IM_2$ is illustrated. For example, the image $IM_2$ may be an up-sampled image that can be output from the up-sampling section 41. The image $IM_2$ is segmented into an upper image region PA1 and a lower image region PA2. For example, the DR conversion section 44 may use the first version of the prediction parameter in calculating the prediction pixel value for the pixel belonging to the image region PA1 and use the second version of the prediction parameter in calculating the prediction pixel value for the pixel belonging to the image region PA2.

A region boundary for switching of a version to be used may be known to both the encoder and the decoder in advance (for example, a boundary dividing a picture, a slice, or a tile in half). Instead, the lossless encoding section 16 may further encode the boundary information specifying the region boundary. For example, the boundary information may be information designating a first LCU (an LCU $L_{border}$ in FIG. 15) subsequent to the region boundary in the raster scan. The first LCU subsequent to the region boundary may be designated by the number of LCUs counted from a certain location of a picture, a slice, or a tile or may be designated by a flag included in the header of the first LCU. In the former case, the certain location may be the head of a picture, a slice, or a tile or a middle point thereof (for example, a location exactly in the middle of the total number of LCUs). In the latter case, it is possible to adaptively control the region boundary for switching of the two versions of prediction parameters by adding only a 1-bit flag to the encoded parameter. In the existing specification of the HEVC, size information directly indicating the size of a slice is not encoded. Thus, the decoder does not recognize the size of the slice while the slice is being decoded (before the decoding of the slice is completed). Thus, additionally encoding the boundary information specifying the region boundary is advantageous in the case in which the region boundary is fixed (for example, a boundary dividing a slice in half).

FIG. 16 is an explanatory view for describing an example of a syntax associated with the technique described above with reference to FIG. 15. A line number in the syntax illustrated in FIG. 16 corresponds to the line number of the syntax of the weighted prediction-related parameter illustrated in FIG. 11. In the syntax of the weighted prediction-related parameter, a part for the parameter of the L1 reference frame is omitted from FIG. 16 for the sake of concise description. Referring to FIG. 16, an additional flag "inter_layer_pred_flag" similar to that illustrated in FIG. 14 is defined after a 2nd line. The flag "inter_layer_pred_flag" is set to True when the syntax is used for the DR prediction parameter. The parameter "delta_num_ctb" after the flag is the boundary information. The parameter "delta_num_ctb" is information indicating a first LCU subsequent to the region boundary in the raster scan order using the number of LCUs. The parameter "delta_num_ctb" may indicate a positive or negative integer when the number of LCUs is counted from a middle point of a picture, a slice, or a tile. The additional parameters illustrated in FIG. 16 may also be included in an extension of the slice header rather than the slice header.

As described above, when it is possible to use a prediction parameter of a version differing according to an image region, it is possible to apply the optimum prediction model to the DR prediction in each image region. For example, a bright region and a dark region of an image differ in an optimum combination of the gain and the offset. In this case, it is possible to reduce the prediction error of the DR prediction and improve the coding efficiency using the gain and the offset optimized for each region for the DR prediction. Additional encoding of the boundary information specifying the region boundary means that a location of the region boundary can be adaptively controlled. In this case, it is possible to further reduce the prediction error of the DR prediction by shifting the region boundary according to content of an image.

(5-3) Control of Each Color Component

In a modified example, the technique described in the present section in which the two versions of prediction parameters are provided may be applied only to the luma component and may not be applied to the chroma component. In this case, for the chroma component, regardless of a band to which a pixel value belongs or an image region to which a pixel belongs, the prediction parameter (typically, the gain and the offset) that can be encoded in the part for the L0 reference frame in the syntax of the weighted prediction-related parameter and decoded from the corresponding part is used. The parameter for the chrome component included in the part for the L1 reference frame may be set to an arbitrary value (for example, zero) that can be mapped to a shortest code word by variable length coding (the value may be ignored in DR conversion). Generally, since a contribution of the chroma component to subjective image quality is smaller than a contribution of the hum component, it is possible to reduce the code amount of the prediction parameter by simplifying processing of the chrome component in the DR conversion and slightly sacrificing image quality.

Further, when a chrome format indicates that the resolution of the chroma component is equal to the resolution of the luma component, the two versions of prediction parameters may be provided for both the luma component and the chroma component, and when the chroma format indicates the resolution of the chroma component is equal to the resolution of the luma component, only one version of a prediction parameter may be provided for the chroma component. For example, when the chroma format is 4:2:0, the resolution of the chroma component is lower than that of the luma component in both the vertical direction and the horizontal direction. When the chroma format is 4:2:2, the resolution of the chroma component is lower than that of the luma component in the horizontal direction. Thus, in this case, by performing prediction more roughly only for the chroma component, the code amount of the prediction parameter can be effectively reduced.

(6) Control of Timing to Execute Bit Shift

The base layer image and the enhancement layer image may differ in the image size and the bit depth as well as the dynamic range. When processes of converting the three attributes are individually executed, a processing cost necessary for the entire inter-layer processing is significantly increased. In this regard, JCTVC-O0194 ("SCE4: Test 5.1 results on bit-depth and color-gamut scalability," Alireza Aminlou, el. al. Oct. 23 to Nov. 1, 2013) proposes a technique of suppressing the processing cost by incorporating a bit shift operation into an up-sampling filter operation.

Figure 17A:
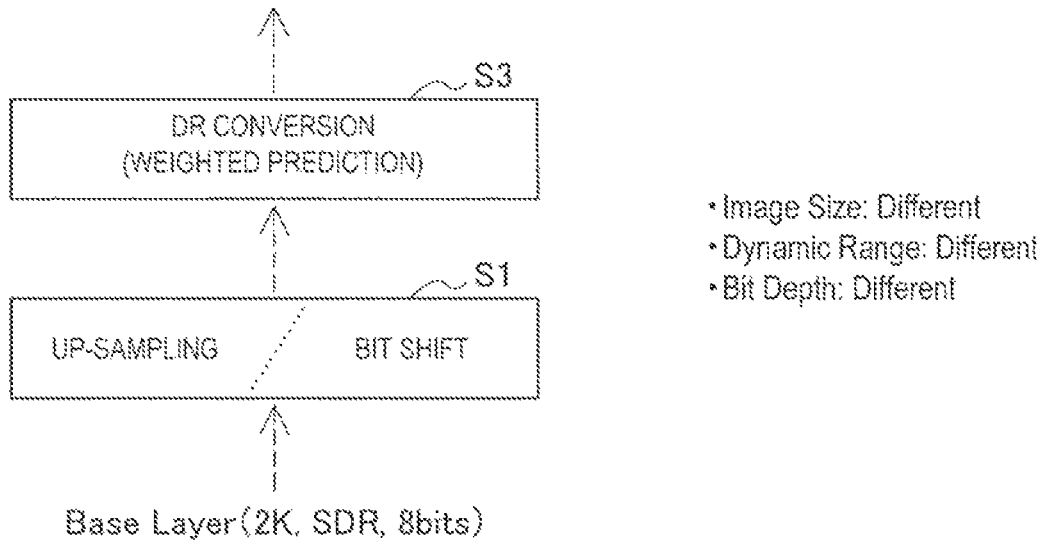
FIG. 17A is a first explanatory view for describing a technique of suppressing a processing cost of inter-layer prediction proposed in JCTVC-O0194.
Figure 17B:
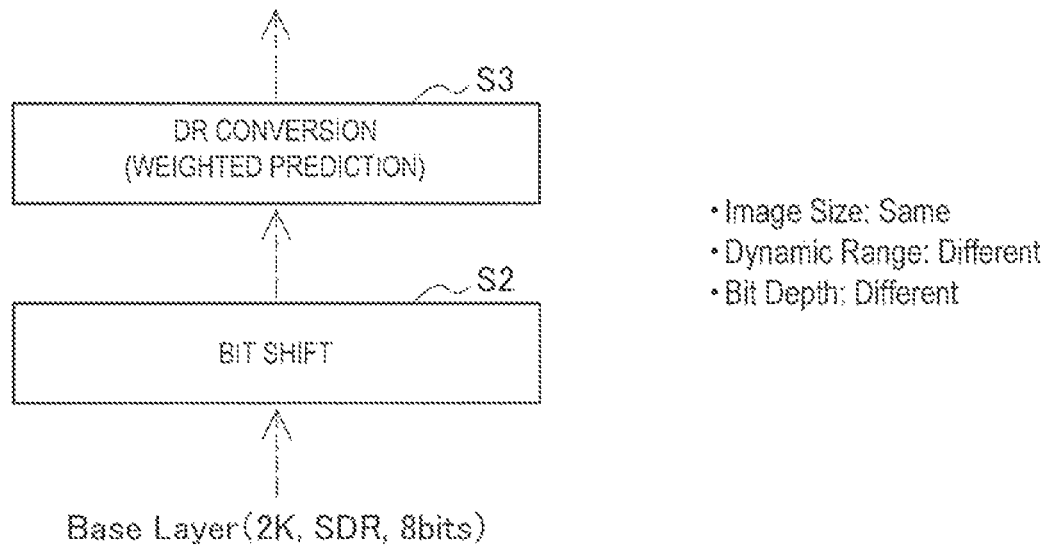
FIG. 17B is a second explanatory view for describing a technique of suppressing a processing cost of inter-layer prediction proposed in JCTVC-O0194.
Figure 17C:
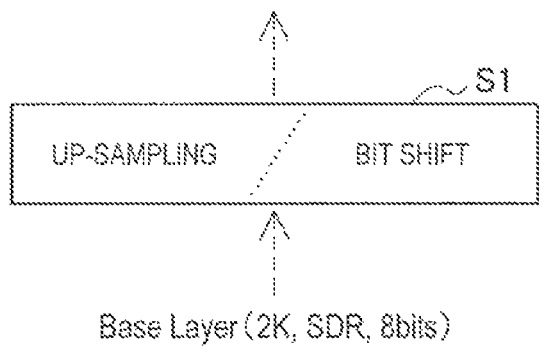
FIG. 17C is a third explanatory view for describing a technique of suppressing a processing cost of inter-layer prediction proposed in JCTVC-O0194.

FIGS. 17A to 17C are explanatory views for describing the technique proposed in JCTVC-O0194. In the example of FIG. 17A, the image size of the base layer is 2K (for example. 1920×1080 pixels), the dynamic range is the SDR, and the bit depth is 8 bits. The image size of the enhancement layer is 4K (for example, 3840×2160 pixels), the dynamic range is the HDR. and the bit depth is 10 bits. In the inter-layer prediction, the up-sampling section 41 executes the bit shift together with the up-sampling (step S1). For example, in the filter operation, addition of two terms may correspond to a 1-bit left shift, and addition of four terms may correspond to a 2-bit left shift. Thus, the bit shift may be performed substantially at the same time as the up-sampling. Thereafter, the DR conversion section 44 converts the dynamic range the up-sampled image input from the up-sampling section 41 (step S3). Here, the conversion of the dynamic range may be a linear conversion similar to the weighted prediction.

In the example of FIG. 17B, the image size of the base layer is 2K, the dynamic range is the SDR, and the bit depth is 8 bits. The image size of the enhancement layer is 2K, the dynamic range is the HDR, and the bit depth is 10 bits. In the inter-layer prediction, the up-sampling section 41 executes only the bit shift since the layers have the same resolution (step S2). Thereafter, the DR conversion section 44 converts the dynamic range of the up-sampled image input from the up-sampling section 41 (step S3).

In the example of FIG. 17C, the image size of the base layer is 2K, the dynamic range is the SDR, and the bit depth is 8 bits. The image size of the enhancement layer is 4K. the dynamic range is the SDR, and the bit depth is 10 bits. In the inter-layer prediction, the up-sampling section 41 executes the bit shift together with the up-sampling (step S1). Since the layers have the same dynamic range, the DR conversion section 44 does not perform the DR conversion.

In the cases of FIGS. 17A and 17C. the up-sampling and the bit shift are executed simultaneously, and thus. compared with the case in which the up-sampling and the bit shift are executed individually, the processing cost necessary for the entire inter-layer processing is suppressed. On the other hand. in the case of FIG. 17B. although the DR conversion includes an operation similar to the bit shift, since the bit shift is executed independently of the DR conversion, there is room for improvement in terms of the processing cost.

In this regard, in an embodiment, the DR conversion section 44 can execute the bit shift together in the operation of the DR conversion. Particularly, when the syntax for the weighted prediction is assumed to be reused, the operation of the DR conversion may be represented as follows:

[Math 3]

$$X_{k,Pred} = \frac{w_k}{2^{n_k}} X_k + o_k \quad (7)$$

In Formula (7), $X_k$ is a pixel value of a k-th color component before conversion, and $X_{k,Pred}$ is a pixel value of the k-th color component after conversion. $w_k$, $n_k$, and $o_k$ are a numerator of a weight (gain), a binary logarithm of the denominator of the weight, and an offset, respectively, which are applied to the k-th color component. Here, when a bit depth difference between layers is assumed to be m bits, an operation in which the DR conversion section 44 executes the m-bit bit shift (left shift) at the same time as the DR conversion may be represented as follows:

[Math 4]

$$X_{k,Pred} = \frac{w_k}{2^{(n_k-m)}} X_k + (o_k << m) \quad (8)$$

When the bit shift and the up-sampling can be simultaneously executed, and the bit shift and the DR conversion can be simultaneously executed, the encoder and the decoder (or the decoders having different implementations) are likely to differ in a timing at which the bit shift is executed. For example, although the encoder executes the bit shift at the same time as the DR conversion, if the decoder executes the bit shift at the same time as the up-sampling, the accuracy of the inter-layer prediction is lowered. In this regard, in the present embodiment, the lossless encoding section 16 further encodes a bit shift control flag for controlling an execution timing of the bit shift. For example, the bit shift control flag is a control parameter indicating whether the bit shift for the inter-layer prediction is to be executed at the same time as the DR conversion or at the same time as the up-sampling when the bit depth of the enhancement layer is larger than the bit depth of the base layer.

Figure 18A:
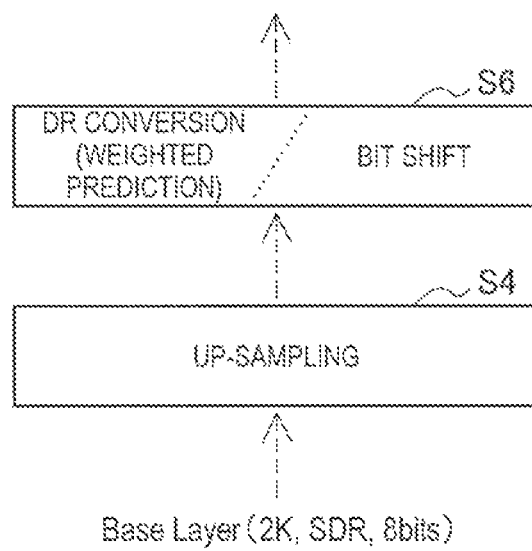
FIG. 18A is a first explanatory view for describing a new technique for suppressing a processing cost of inter-layer prediction.
Figure 18B:
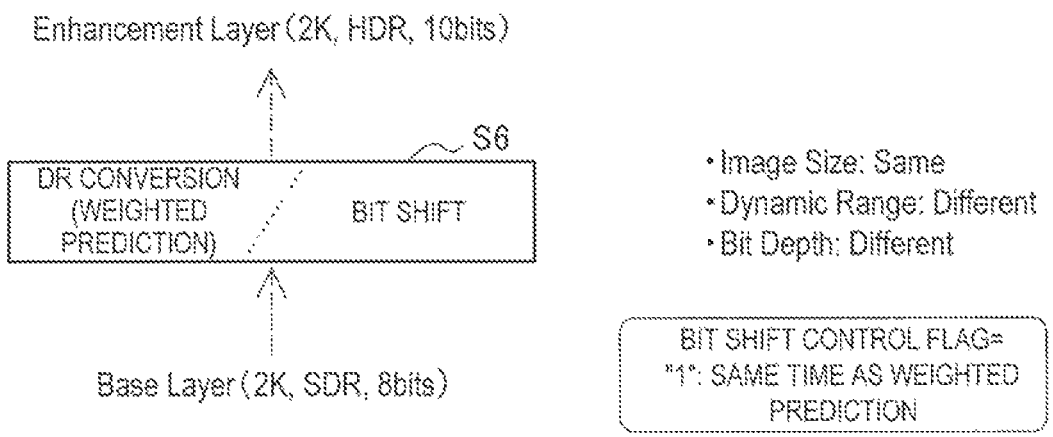
FIG. 18B is a second explanatory view for describing a new technique for suppressing a processing cost of inter-layer prediction.
Figure 18C:
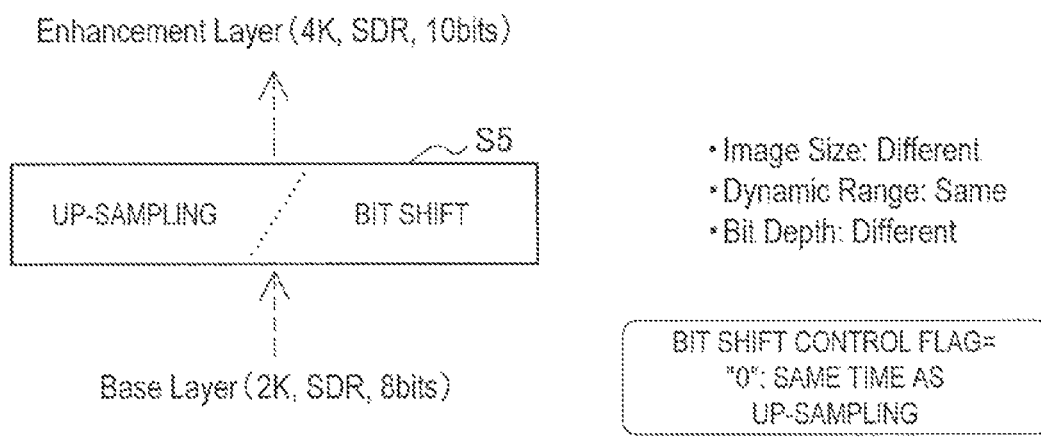
FIG. 18C is a third explanatory view for describing a new technique for suppressing a processing cost of inter-layer prediction.

FIGS. 181A to 18C are explanatory views for describing a new technique for controlling the processing cost of the inter-layer prediction. In the example of FIG. 18A, the attributes of the base layer and the enhancement layer are the same as those in FIG. 17A. Here, the bit shift control flag indicates "1" (the bit shift is executed at the same time as the weighted prediction). In this case, in the inter-layer prediction, the up-sampling section 41 executes the up-sampling without executing the bit shift for increasing the bit depth (step S4). Thereafter, the DR conversion section 44 executes the bit shift while converting the dynamic range of the up-sampled image input from the up-sampling section 41 as in Formula (8) (step S6).

In the example of FIG. 18B, the attributes of the base layer and the enhancement layer are the same as those of FIG. 17B. Here, the bit shift control flag indicates "1" (the bit shift is executed at the same time as the weighted prediction). In this case, in the inter-layer prediction, the up-sampling section 41 executes neither the bit shift nor the up-sampling. The DR conversion section 44 executes the bit shift while converting the dynamic range of the image of the base layer as in Formula (8) (step S6).

In the example of FIG. 18C, the attributes of the base layer and the enhancement layer are the same as those of FIG. 17C. Here, the bit shift control flag indicates "0" (the bit shift is performed at the same time as the up-sampling).

In this case, in the inter-layer prediction, the up-sampling section 41 executes the bit shift together with the up-sampling (step S5). Since the layers have the same dynamic range, the DR conversion section 44 does not execute the DR conversion.

If FIGS. 17A to 17C are compared with FIGS. 18A to 18C, it is understood that the processing step is deleted in the new technique in connection with the second example (FIG. 17B and FIG. 18B) in which the image size does not change between layers. Further, in the new technique, the presence of the bit shift control flag makes it possible to adaptively switch the bit shift execution timing and minimize the number of processing steps of the DR prediction.

FIG. 19 is an explanatory view for describing an example of a syntax associated with the technique described above with reference to FIGS. 18A to 18C. A line number in the syntax illustrated in FIG. 19 corresponds to the line number of the syntax of the weighted prediction-related parameter illustrated in FIG. 1. In the syntax of the weighted prediction-related parameter, a part for the parameter of the L1 reference frame is omitted from FIG. 19 for the sake of concise description.

Referring to FIG. 19, two encoded parameters "weighted_prediction_and_bit_shift_luma_flag" and "weighted_prediction_and_bit_shift_chroma_flag" that are encoded when a layer 1D is not zero (that is, when the corresponding layer is the enhancement layer) are defined after a 1st line. Of the two, the former is a bit shift control flag for controlling the bit shift execution timing of the luma component. The latter is a bit shift control flag for controlling the bit shift execution timing of the chroma component. The flags are set to True when the bit shift is to be executed at the same time as the DR conversion and False when the bit shift is to be executed at the same time as the up-sampling. Since the image size and the bit depth are defined to differ according to each color component, by encoding the bit shift control flag individually on the luma component and the chroma component, it is possible to flexibly control the bit shift execution timing according to the definitions of the attributes. The present disclosure is not limited to this example, and a single bit shift control flag may be encoded for both of the luma component and the chroma component. Further, when the layers have the same bit depth, encoding of the bit shift control flag may be omitted, or the flag may be set to a specific value (for example, zero). Further, even when the syntax of FIG. 19 is used for the weighted prediction in the inter prediction within the layer rather than the inter-layer prediction, encoding of the bit shift control flag may be omitted, or the flag may be set to a specific value (for example, zero).

<3. Process Flow For Encoding According To An Embodiment>

[3-1. Schematic Flow]

Figure 20:
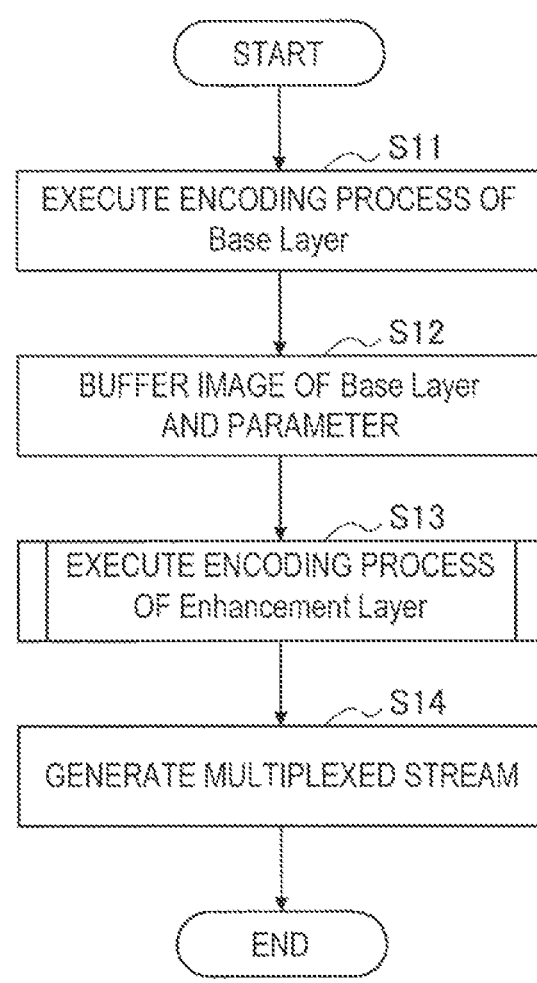
FIG. 20 is a flow chart showing an example of a schematic process flow for encoding according to an embodiment.

FIG. 20 is a flow chart showing an example of schematic process flow for encoding according to an embodiment. For the sake of brevity of description, process steps that are not directly related to technology according to the present disclosure are omitted from FIG. 20.

Referring to FIG. 20, the BL encoding section 1a first performs an encoding process for the base layer to generate an encoded stream of the base layer (step S11).

The common memory 2 buffers an image (one or both of a decoded image and a predicted error image) of the base layer generated in the encoding process for the base layer and the parameters reused between the layers (step S12). The parameters reused between the layers may include the weighted prediction-related parameter, for example.

Next, the EL encoding section 1*b* performs an encoding process for the enhancement layer to generate an encoded stream of the enhancement layer (step S13). In the encoding process for the enhancement layer performed herein, the image of the base layer buffered by the common memory 2 is up-sampled by the DR prediction section 40 so that the dynamic range is converted from SDR to HDR. Then, the image of the base layer after the DR conversion can be used as a reference image in the inter layer prediction.

Then, the multiplexing section 3 multiplexes an encoded stream of the base layer generated by the BL encoding section 1*a* and an encoded stream of the enhancement layer generated by the EL encoding section 1*b* to generate a multilayer multiplexed stream (step S14).

[3-2. DR Prediction Process]

(1) First Example

Figure 21:
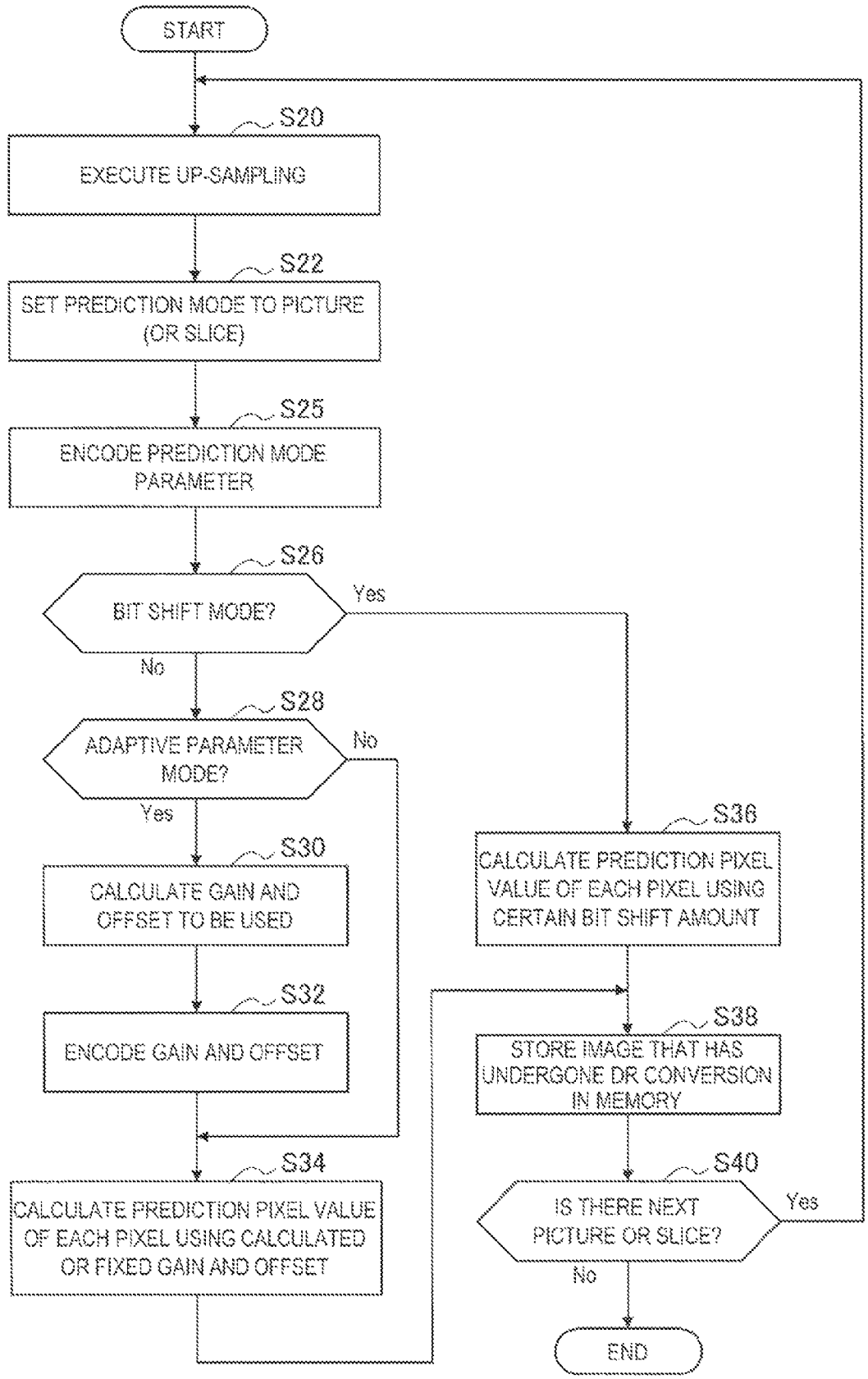
FIG. 21 is a flowchart illustrating a first example of a DR prediction process flow in an encoding process of an enhancement layer.

FIG. 21 is a flowchart illustrating a first example of DR prediction process flow in the encoding process of the enhancement layer. The DR prediction process described herein is repeated in units of pictures or slices.

Referring to FIG. 21, first, the up-sampling section 41 up-samples the image of the base layer acquired from the common memory 2 according to the resolution ratio between the base layer and the enhancement layer (step S20).

Then, the prediction mode setting section 42 sets one prediction mode among the prediction mode candidates for the DR prediction to a picture (or a slice) (step S22). The prediction mode setting section 42 may set a predefined prediction mode or may set a prediction mode dynamically selected based on evaluation of the coding efficiency or the prediction accuracy on each of the prediction mode candidates.

Then, the lossless encoding section 16 encodes the prediction mode parameter indicating the prediction mode set by the prediction mode setting section 42 (step S25). The prediction mode parameter encoded by the lossless encoding section 16 is inserted into, for example, the PPS or the slice header.

A subsequent process diverges depending on the prediction mode set by the prediction mode setting section 42 (steps S26 and S28). For example, when the set prediction mode is the adaptive parameter mode, the parameter calculation section 43 calculates optimum values of the gain and the offset to be used for the DR prediction (conversion) (step S30). The parameter calculation section 43 may further calculate the difference from the previous value for the calculated optimum values of the gain and the offset. Then, the lossless encoding section 16 encodes the gain and the offset (or the differences thereof) calculated by the parameter calculation section 43 (step S32). The prediction parameter encoded by the lossless encoding section 16 is inserted into, for example, the PPS or the slice header.

When the set prediction mode is the adaptive parameter mode or the fixed parameter mode, the DR conversion section 44 calculates the prediction pixel value of each pixel by multiplying the up-sampled pixel value of the base layer by the adaptively calculated gain or the fixed gain and further adding the offset according to Formulas (4) to (6) (step S34).

When the set prediction mode is the bit shift mode, the DR conversion section 44 calculates the prediction pixel value of each pixel by shifting the up-sampled pixel value of the base layer left by a certain bit shift amount according to Formulas (1) to (3) (step S36).

When all the prediction pixel values within a picture or a slice of a processing target are calculated, the DR conversion section 44 stores the image of the base layer that has undergone the DR conversion, that is, a predicted image serving as the HDR image, in the frame memory 25 (step S38).

Thereafter, when there is a non-processed next picture or slice. the process returns to step S20. and the above-described process is repeatedly performed on the next picture or slice (step S40).

(2) Second Example

Figure 22:
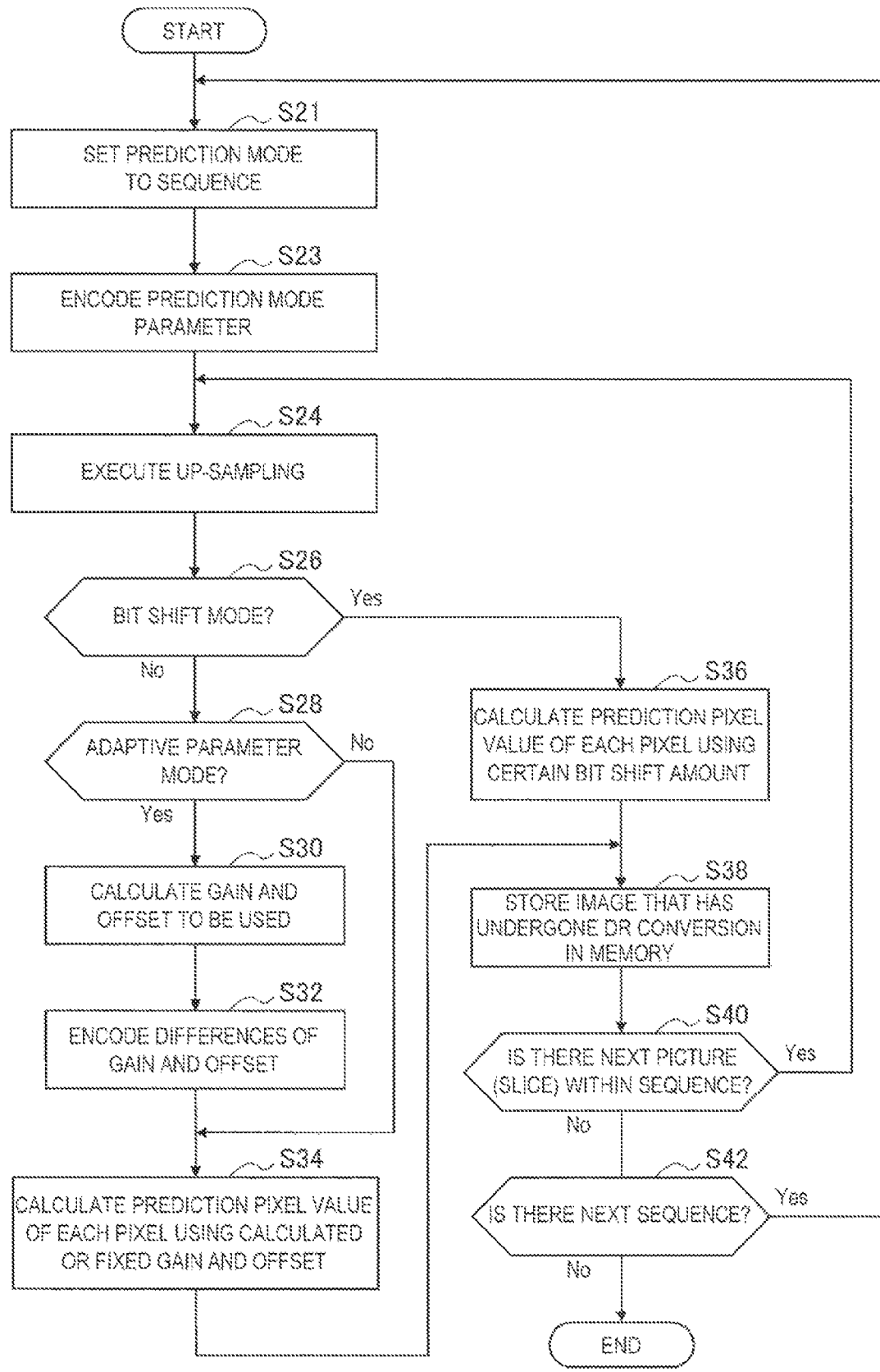
FIG. 22 is a flowchart illustrating a second example of a DR prediction process flow in an encoding process of an enhancement layer.

FIG. 22 is a flowchart illustrating a second example of the DR prediction process flow in the encoding process of the enhancement layer.

Referring to FIG. 22, first, the prediction mode setting section 42 sets one prediction mode among the prediction mode candidates for the DR prediction in a sequence (step S21). Then, the lossless encoding section 16 encodes the prediction mode parameter indicating the prediction mode set by the prediction mode setting section 42 (step S23). The prediction mode parameter encoded by the lossless encoding section 16 is inserted into the SPS.

The process of steps S24 to S40 is repeatedly performed on each picture or slice within a sequence.

The up-sampling section 41 samples the image of the base layer acquired from the common memory 2 according to the resolution ratio between the base layer and the enhancement layer (step S24).

Furthermore, the process diverges depending on the prediction mode set by the prediction mode setting section 42 (steps S26 and S28). For example, when the set prediction mode is the adaptive parameter mode, the parameter calculation section 43 calculates optimum values of the gain and the offset to be used for the DR prediction (conversion) (step S30). The parameter calculation section 43 may further calculate the difference from the previous value for the calculated optimum values of the gain and the offset. Then, the lossless encoding section 16 encodes the gain and the offset (or the differences thereof) calculated by the parameter calculation section 43 (step S32). The prediction parameter encoded by the lossless encoding section 16 is inserted into, for example, the PPS or the slice header.

When the set prediction mode is the adaptive parameter mode or the fixed parameter mode, the DR conversion section 44 calculates the prediction pixel value of each pixel by multiplying the up-sampled pixel value of the base layer by the adaptively calculated gain or the fixed gain and further adding the offset according to Formulas (4) to (6) (step S34).

When the set prediction mode is the bit shift mode, the DR conversion section 44 calculates the prediction pixel value of each pixel by shifting the up-sampled pixel value of the base layer left by a certain bit shift amount according to Formulas (1) to (3) (step S36).

When all the prediction pixel values within a picture or a slice of a processing target are calculated, the DR conversion section 44 stores the image of the base layer that has undergone the DR conversion, that is, a predicted image serving as the HDR image, in the frame memory 25 (step S38).

Thereafter, when there is a non-processed picture or slice within a sequence, the process returns to step S24, and the up-sampling and the DR conversion are repeatedly performed on a next picture or slice (step S40). Further, when the DR conversion has ended on all pictures or all slices within the sequence, it is further determined whether or not there is a next sequence (step S42). Then, when there is a (3) Third Example FIG. 23 is a flowchart illustrating a third example of the DR prediction process flow in the encoding process of the enhancement layer.

Figure 23:
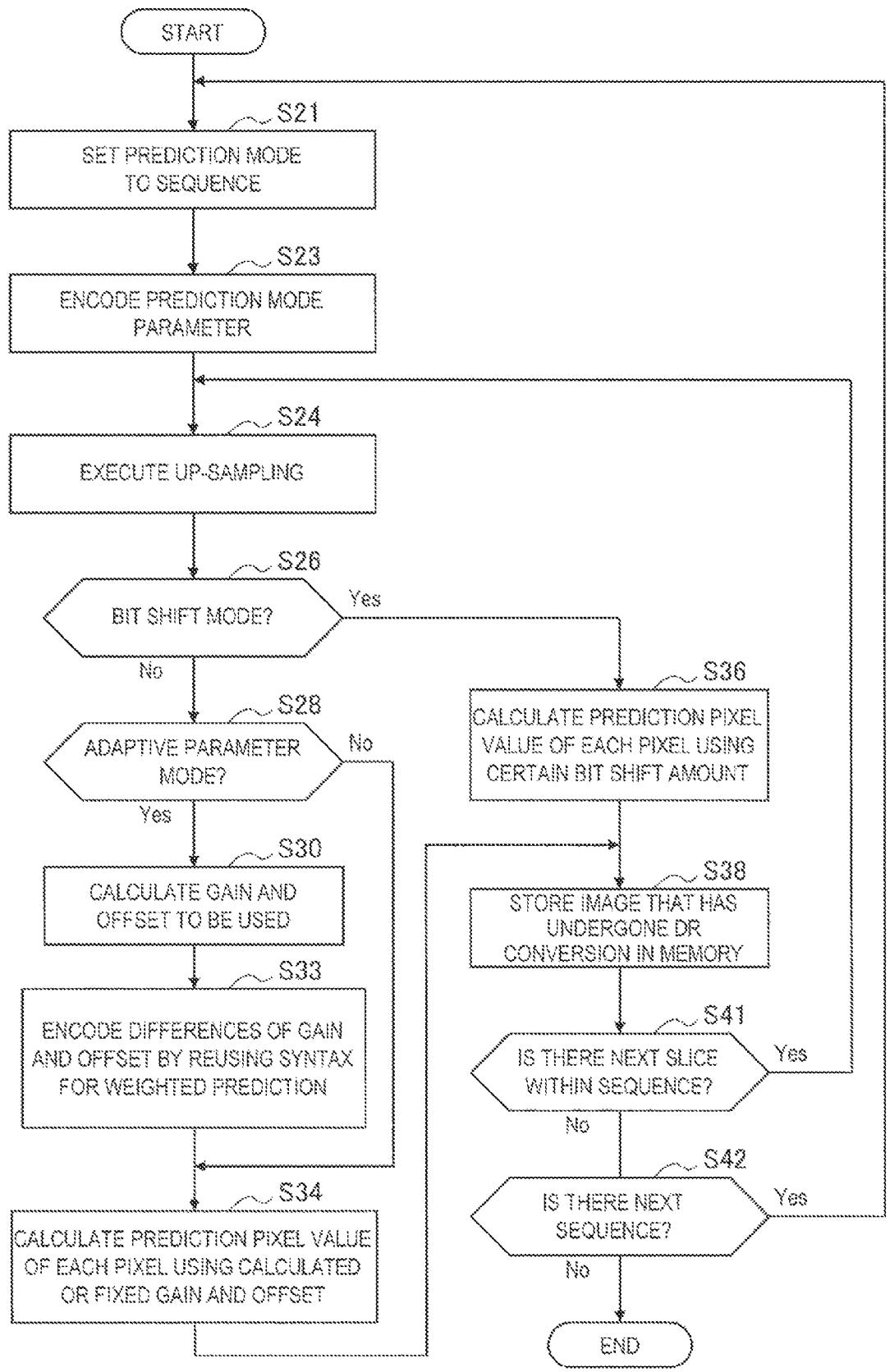
FIG. 23 is a flowchart illustrating a third example of a DR prediction process flow in an encoding process of an enhancement layer.

Referring to FIG. 23, first, the prediction mode setting section 42 sets one prediction mode among the prediction mode candidates for the DR prediction in a sequence (step S21). Then. the lossless encoding section 16 encodes the prediction mode parameter indicating the prediction mode set by the prediction mode setting section 42 (step S23). The prediction mode parameter encoded by the lossless encoding section 16 is inserted into the SPS.

The process of steps S24 to S41 is repeatedly performed on each slice within a sequence.

The up-sampling section 41 samples the image of the base layer acquired from the common memory 2 according to the resolution ratio between the base layer and the enhancement layer (step S24). Here, the up-sampling filter operation may include the bit shift or may not include the bit shift.

Furthermore, the process diverges depending on the prediction mode set by the prediction mode setting section 42 (steps S26 and S28). For example, when the set prediction mode is the adaptive parameter mode, the parameter calculation section 43 calculates optimum values of the gain and the offset to be used for the DR prediction (conversion) (step S30). The parameter calculation section 43 may further calculate the difference from the previous value for the calculated optimum values of the gain and the offset.

When the set prediction mode is the adaptive parameter mode or the fixed parameter mode, the DR conversion section 44 calculates the prediction pixel value of each pixel by multiplying the up-sampled pixel value of the base layer by the adaptively calculated gain or the fixed gain and further adding the offset according to Formulas (4) to (6) (step S34). When the bit shift is not performed in step S24, the calculation of the prediction pixel value herein may include the bit shift.

When the set prediction mode is the bit shift mode, the DR conversion section 44 calculates the prediction pixel value of each pixel by shifting the up-sampled pixel value of the base layer left by a certain bit shift amount according to Formulas (1) to (3) (step S36).

When all the prediction pixel values within a slice of a processing target are calculated, the DR conversion section 44 stores the image of the base layer that has undergone the DR conversion, that is, a predicted image serving as the HDR image, in the frame memory 25 (step S38).

Thereafter, when there is a non-processed slice within a sequence, the process returns to step S24. and the up-sampling and the DR conversion are repeatedly performed on a next slice (step S41). Further. when the DR conversion has ended on all slices within the sequence, it is further determined whether or not there is a next sequence (step S42). Then, when there is a next sequence, the process returns to step S21, and the above-described process is repeatedly performed on the next sequence.

(4) Fourth Example

Figure 24:
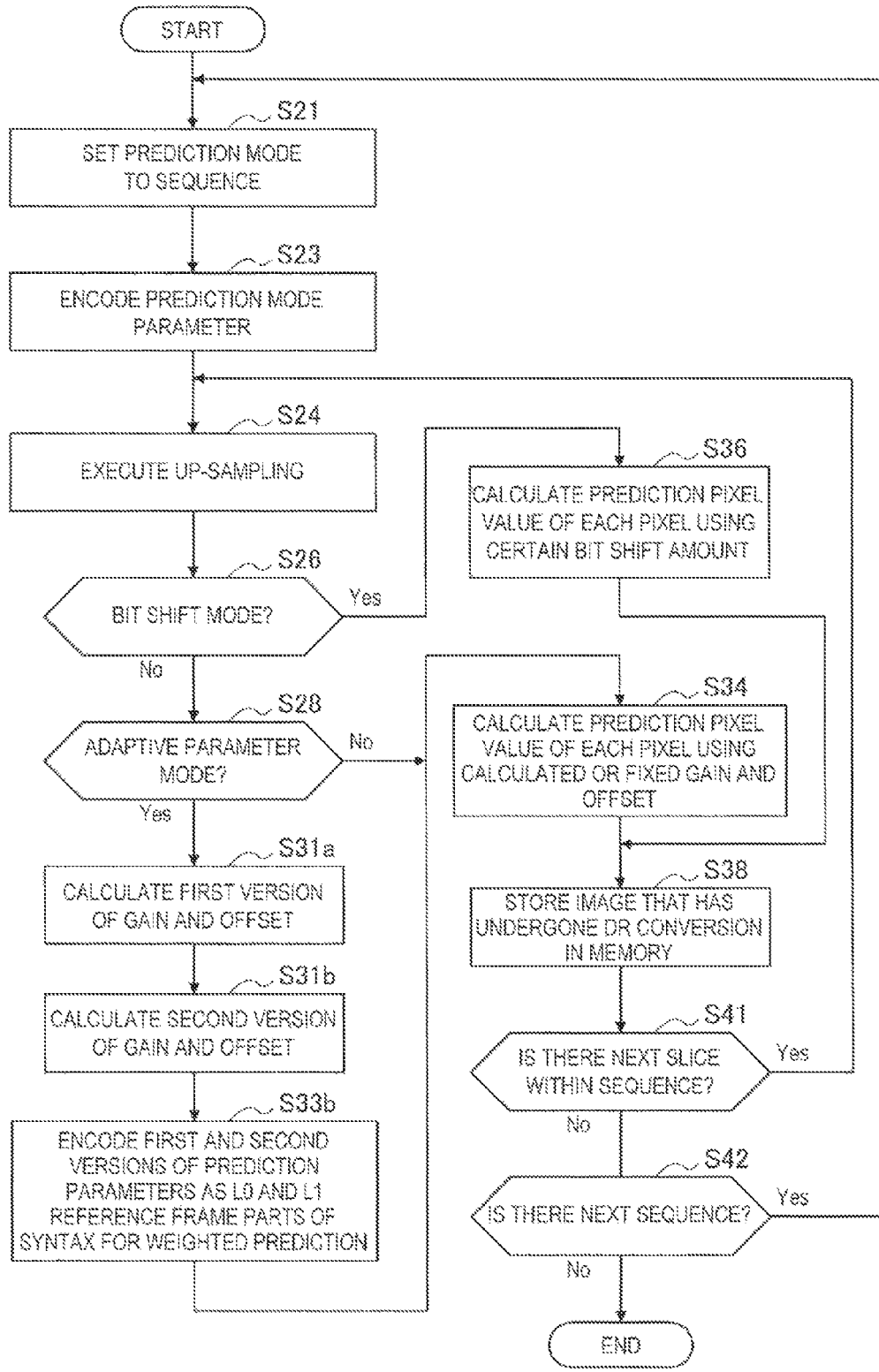
FIG. 24 is a flowchart illustrating a fourth example of a DR prediction process flow in an encoding process of an enhancement layer.

FIG. 24 is a flowchart illustrating a fourth example of the DR prediction process flow in the encoding process of the enhancement layer.

Referring to FIG. 24, first, the prediction mode setting section 42 sets one prediction mode among the prediction mode candidates for the DR prediction in a sequence (step S21). Then. the lossless encoding section 16 encodes the prediction mode parameter indicating the prediction mode set by the prediction mode setting section 42 (step S23). The prediction mode parameter encoded by the lossless encoding section 16 is inserted into the SPS.

The process of steps S24 to S41 is repeatedly performed on each slice within a sequence.

The up-sampling section 41 samples the image of the base layer acquired from the common memory 2 according to the resolution ratio between the base layer and the enhancement layer (step S24). Here, the up-sampling filter operation may include the bit shift or may not include the bit shift.

Further. the process is bifurcated depending on the prediction mode set by the prediction mode setting section 42 (steps S26 and S28). For example, when the set prediction mode is the adaptive parameter mode, the parameter calculation section 43 calculates the first version of the gain and the offset to be used for the DR prediction (conversion) (step S31a). Similarly, the parameter calculation section 43 calculates the second version of the gain and the offset (step S31b). Each of the first version and the second version may include a set of optimum values to be used for a first band and a second band in the pixel value range. Instead, each of the first version and the second version may include a set of optimum values to be used for a first image region and a second image region. The parameter calculation section 43 may further calculate a difference of each of the gain and the offset from the previous value for the first version and the second version. Then, the lossless encoding section 16 encodes the prediction parameters (or the differences thereof) for the first version and the second version as the L0 reference frame part and the L1 reference frame part of the syntax of the weighted prediction-related parameter (step S33b). These prediction parameters encoded by the lossless encoding section 16 are inserted into the slice header. When the above-described bit shift control flag is employed in the syntax, the encoded bit shift control flag also can be inserted into the slice header here.

A subsequent process flow may be similar to the third example described above with reference to FIG. 23 except that switching of the version of the prediction parameter according to a band to which a pixel value belongs or an image region to which a pixel belongs can be performed in step S34. Further, in step S33b, the lossless encoding section 16 may additionally encode the boundary information specifying the boundary value between bands or the region boundary between image regions for switching of the version of the prediction parameter, for example, to be included in the slice header or an extension of the slice header.

(5) Modified Example of Processing Procedure

According to the existing technique, in the inter-layer processing, the DR conversion is executed after the up-sampling (and the bit shift as necessary) is executed. The flowcharts of FIGS. 21 to 24 also follow this processing procedure. However, since the processing cost of the DR conversion is in proportion to the number of pixels of the processing target, it is difficult to say that executing the DR conversion on the pixels increased by the q-sampling is optimal in terms of the processing cost. Further, when the DR conversion is executed on the pixel having the extended bit depth after the bit shift, it means that it is increased to be larger than processing resources (for example, the number of necessary bits of the register) necessary for the operation of the DR conversion. In this regard, in a modified example, when the space resolution (the image size) of the enhancement layer is higher than the space resolution of the base layer, the DR prediction section 40 may predict an enhancement layer image by converting the dynamic range of the base layer image and then up-sampling the converted image.

Figure 25A:
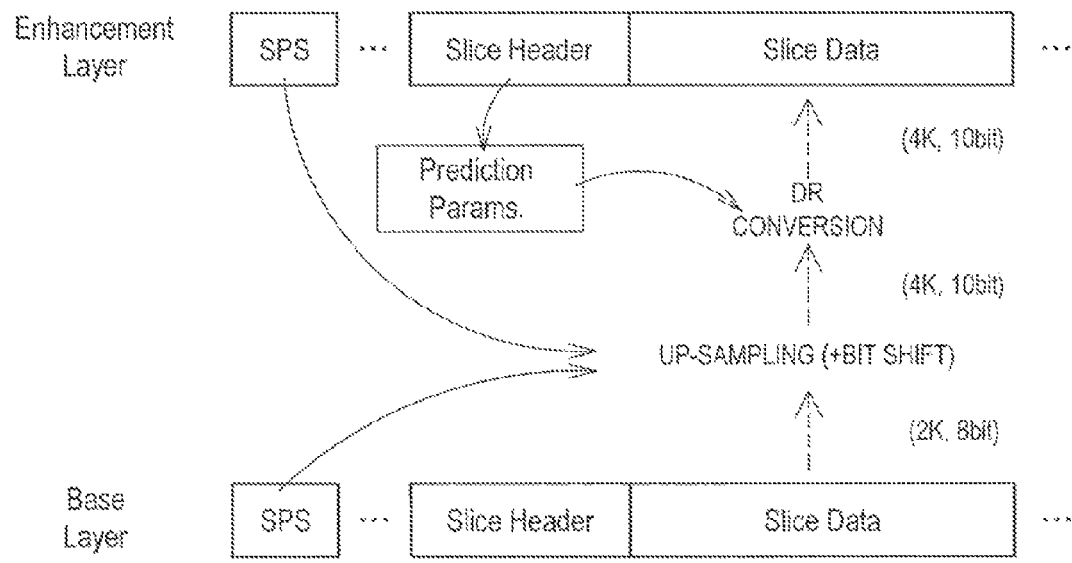
FIG. 25A is an explanatory view for describing a typical example of a processing procedure of inter-layer prediction.

FIG. 25A is an explanatory view for describing a typical example of the processing procedure of the inter-layer prediction. FIG. 25A illustrates two processing steps similar to those of FIG. 17A as an example. First, the image size and the bit depth (for example, 2K/8 bits) of an image included in slice data of the base layer can be increased (for example, to 4K/10 bits) through the up-sampling and the bit shift. Then, the dynamic range of the up-sampled image is converted to the larger dynamic range of the enhancement layer according to the prediction parameter.

Figure 25B:
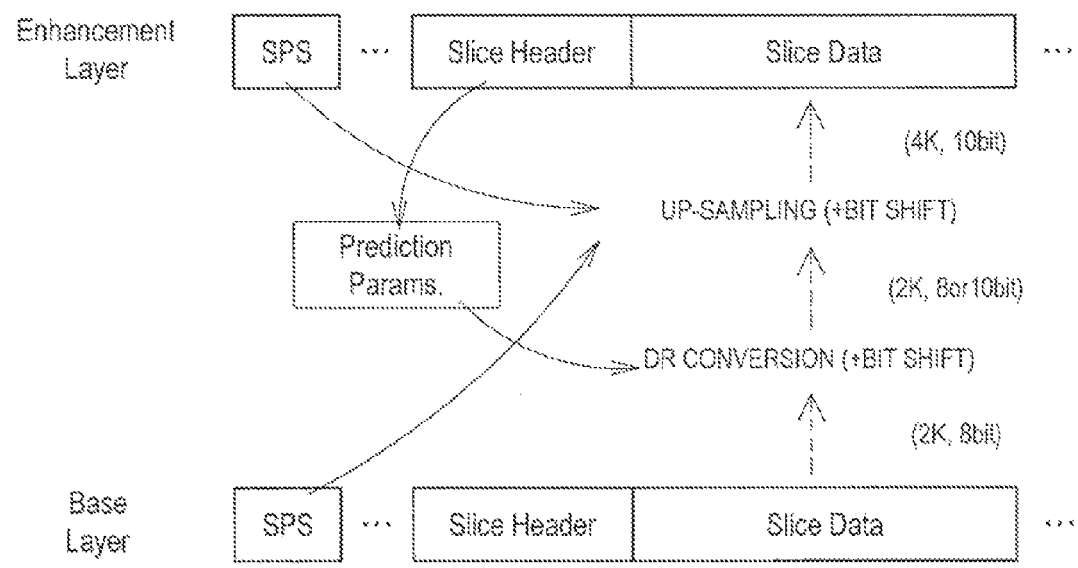
FIG. 25B is an explanatory view for describing an example of a processing procedure of new inter-layer prediction.

FIG. 25B is an explanatory view for describing an example of a processing procedure of new inter-layer prediction according to a modified example. In the present modified example, first, the DR prediction section 40 converts the dynamic range of the image included in the slice data of the base layer into the larger dynamic range of the enhancement layer according to the prediction parameter. Then, the DR prediction section 40 increases the image size (for example, 2K) of the image that has undergone the DR conversion (for example, to 4K) through the up-sampling. The bit shift may be executed at the same time as the DR conversion or may be executed at the same time as the up-sampling. A bit shift execution timing may be designated by the bit shift control flag. According to the new processing procedure. the number of pixels of the processing target of the DR conversion and the bit depth are reduced to be smaller than in the existing processing procedure, and thus the processing cost for the entire inter-layer processing is further suppressed.

<4. Configuration Example Of El Decoding Section In An Embodiment>

4-1. Overall Configuration

Figure 26:
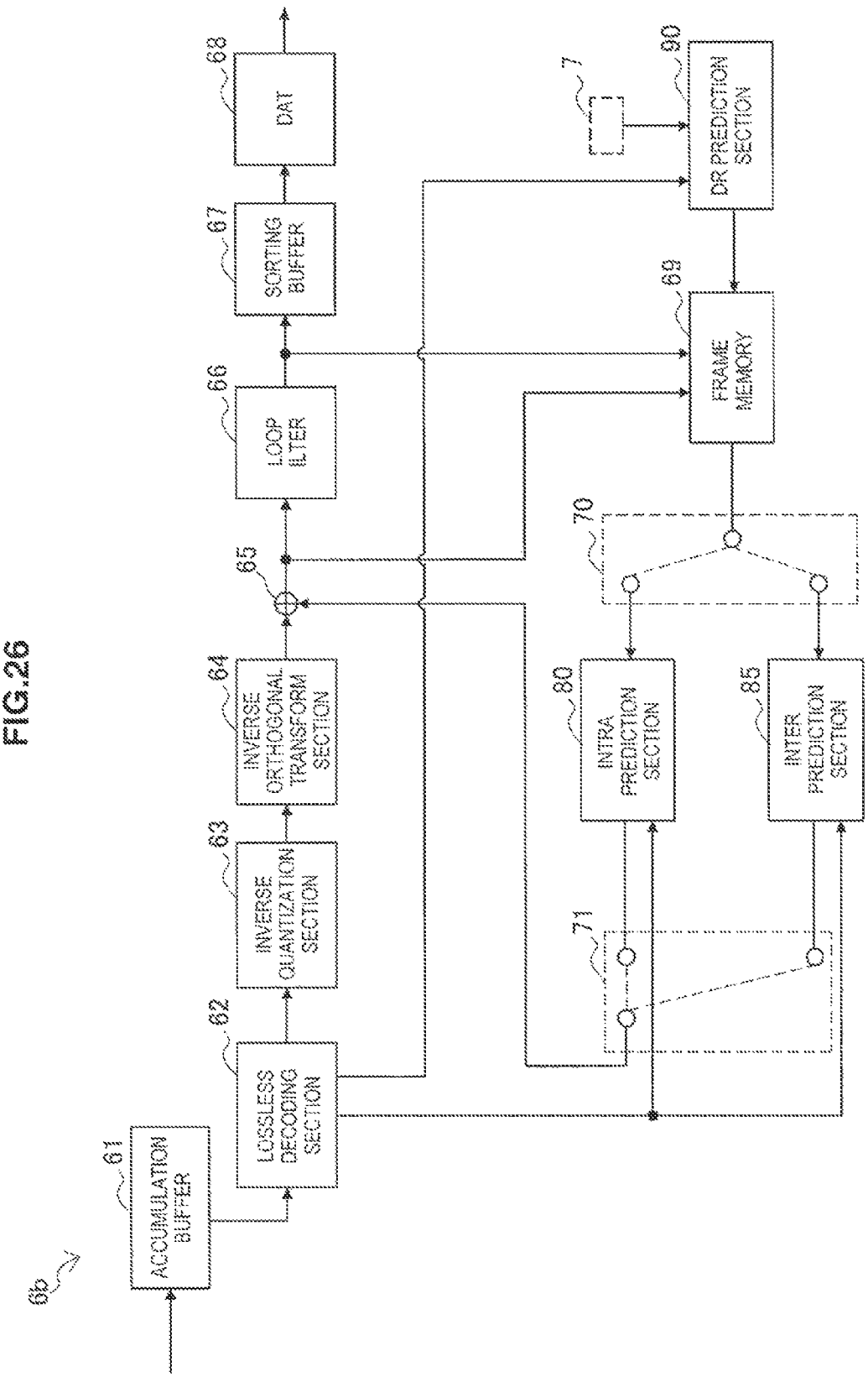
FIG. 26 is a block diagram showing an example of the configuration of an EL decoding section shown in FIG. 4.

FIG. 26 is a block diagram showing an example of the configuration of the EL decoding section 6b shown in FIG. 4. Referring to FIG. 26, the EL decoding section 6b includes an accumulation buffer 61, a lossless decoding section 62, an inverse quantization section 63, an inverse orthogonal transform section 64, an addition section 65, a loop filter 66. a sorting buffer 67, a digital-to-analog (D/A) conversion section 68, a frame memory 69. selectors 70 and 71, an intra prediction section 80, an inter prediction section 85, a DR prediction section 90.

The accumulation buffer 61 temporarily accumulates the encoded stream of the enhancement layer input from the demultiplexing section 5 using a storage medium.

The lossless decoding section 62 decodes the quantized data of the enhancement layer from the encoded stream of the enhancement layer input from the accumulation buffer 61 according to the encoding scheme used at the time of the encoding. The lossless decoding section 62 decodes the information inserted into the header region of the encoded stream. The information decoded by the lossless decoding section 62 can include, for example, the information regarding the intra prediction and the information regarding the inter prediction. The parameters for the DR prediction can also be decoded in the enhancement layer. The lossless decoding section 62 outputs the quantized data to the inverse quantization section 63. The lossless decoding section 62 outputs the information regarding the intra prediction to the intra prediction section 80. The lossless decoding section 62 outputs the information regarding the inter prediction to the inter prediction section 85. The lossless decoding section 62 outputs the parameters for the DR prediction to the DR prediction section 90.

The inverse quantization section 63 inversely quantizes the quantized data input from the lossless decoding section 62 in the quantization step used at the time of the encoding to restore the transform coefficient data of the enhancement layer. The inverse quantization section 63 outputs the restored transform coefficient data to the inverse orthogonal transform section 64.

The inverse orthogonal transform section 64 performs an inverse orthogonal transform on the transform coefficient data input from the inverse quantization section 63 according to the orthogonal transform scheme used at the time of the encoding to generate the predicted error data. The inverse orthogonal transform section 64 outputs the generated predicted error data to the addition section 65.

The addition section 65 adds the predicted error data input from the inverse orthogonal transform section 64 and the predicted image data input from the selector 71 to generate decoded image data. Then, the addition section 65 outputs the generated decoded image data to the loop filter 66 and the frame memory 69.

As in the loop filter 24 of the EL encoding section 1b, the loop filter 66 includes a deblock filter that reduces block distortion, a sample adaptive offset filter that adds an offset value to each pixel value, and an adaptive loop filter that minimizes an error with the original image. The loop filter 66 filters the decoded image data input from the addition section 65 and outputs the decoded image data after filtering to the sorting buffer 67 and the frame memory 69.

The sorting buffer 67 sorts the images input from the loop filter 66 to generate a chronological series of image data. Then, the sorting buffer 67 outputs the generated image data to the D/A conversion section 68.

The D/A conversion section 68 converts the image data with a digital format input from the sorting buffer 67 into an image signal with an analog format. Then, the D/A conversion section 68 displays the image of the enhancement layer by outputting the analog image signal to, for example, a display (not shown) connected to the image decoding device 60.

The frame memory 69 stores the decoded image data before the filtering input from the addition section 65, the decoded image data after the filtering input from the loop filter 66, and the reference image data of the base layer input from the DR prediction section 90 using a storage medium.

The selector 70 switches an output destination of the image data from the frame memory 69 between the intra prediction section 80 and the inter prediction section 85 for each block in the image according to the mode information acquired by the lossless decoding section 62. For example, when the intra prediction mode is designated, the selector 70 outputs the decoded image data before the filtering supplied from the frame memory 69 as the reference image data to the intra prediction section 80. When the inter prediction mode is designated, the selector 70 outputs the decoded image data after the filtering as the reference image data to the inter prediction section 85. When the inter layer prediction is performed in the intra prediction section 80 or the inter prediction section 85, the selector 70 supplies the reference image data of the base layer to the intra prediction section 80 or the inter prediction section 85.

The selector 71 switches an output source of the predicted image data to be supplied to the addition section 65 between the intra prediction section 80 and the inter prediction section 85 according to the mode information acquired by the lossless decoding section 62. For example, when the intra prediction mode is designated, the selector 71 supplies the predicted image data output from the intra prediction section 80 to the addition section 65. When the inter prediction mode is designated, the selector 71 supplies the predicted image data output from the inter prediction section 85 to the addition section 65.

The intra prediction section 80 performs the intra prediction process of the enhancement layer based on the information regarding the intra prediction input from the lossless decoding section 62 and the reference image data from the frame memory 69 to generate predicted image data. The intra prediction process is performed for each PU. When the intra BL prediction or the intra residual prediction is designated as the intra prediction mode, the intra prediction section 80 uses a co-located block in the base layer corresponding to a prediction target block as a reference block. In the case of the intra BL prediction, the intra prediction section 80 generates the predicted image based on the decoded image of the reference block. In the case of the intra residual prediction, the intra prediction section 80 predicts a prediction error of the intra prediction based on the predicted error image of the reference block and generates the predicted image to which the predicted prediction error is added. The intra prediction section 80 outputs the generated predicted image data of the enhancement layer to the selector 71.

The inter prediction section 85 performs an inter prediction process (motion compensation process) of the enhancement layer based on the information regarding the inter prediction input from the lossless decoding section 62 and the reference image data from the frame memory 69 to generate predicted image data. The inter prediction process is performed for each PU. When the inter residual prediction is designated as the inter prediction mode, the inter prediction section 85 uses a co-located block in the base layer corresponding to a prediction target block as a reference block. In the case of the inter residual prediction, the inter prediction section 85 predicts a prediction error of the inter prediction based on the predicted error image of the reference block and generates a predicted image to which the predicted prediction error is added. The inter prediction section 85 outputs the generated predicted image data of the enhancement layer to the selector 71.

The DR prediction section 90 up-samples the image (the decoded image or the prediction error image) of the base layer buffered by the common memory 7 according to the resolution ratio between the base layer and the enhancement layer. Further, when the image of the enhancement layer has the luminance dynamic range larger than that of the image of the base layer, the DR prediction section 90 converts the dynamic range of the up-sampled image of the base layer into the same dynamic range as that of the image of the enhancement layer. In the present embodiment, the DR prediction section 90 converts the dynamic range by approximately predicting the image of the enhancement layer from the image of the base layer based on the premise of the independent linear relation of each color component between the base layer and the enhancement layer. The image of the base layer whose dynamic range has been converted by the DR prediction section 90 may be stored in the frame memory 69 and used as the reference image in the inter-layer prediction through the intra prediction section 80 or the inter prediction section 85. The DR prediction section 90 acquires the prediction mode parameter indicating the prediction mode for the DR prediction from the lossless decoding section 62. Further, when the prediction mode parameter indicates the adaptive parameter mode, the DR prediction section 90 further acquires the prediction parameter (or the difference from the previous value) from the lossless decoding section 62. Then, the DR prediction section 90 predicts the image of the enhancement layer from the up-sampled image of the base layer using the parameter acquired from the lossless decoding section 62.

[4-2. Detailed Configuration of DR Prediction Section]

Figure 27:
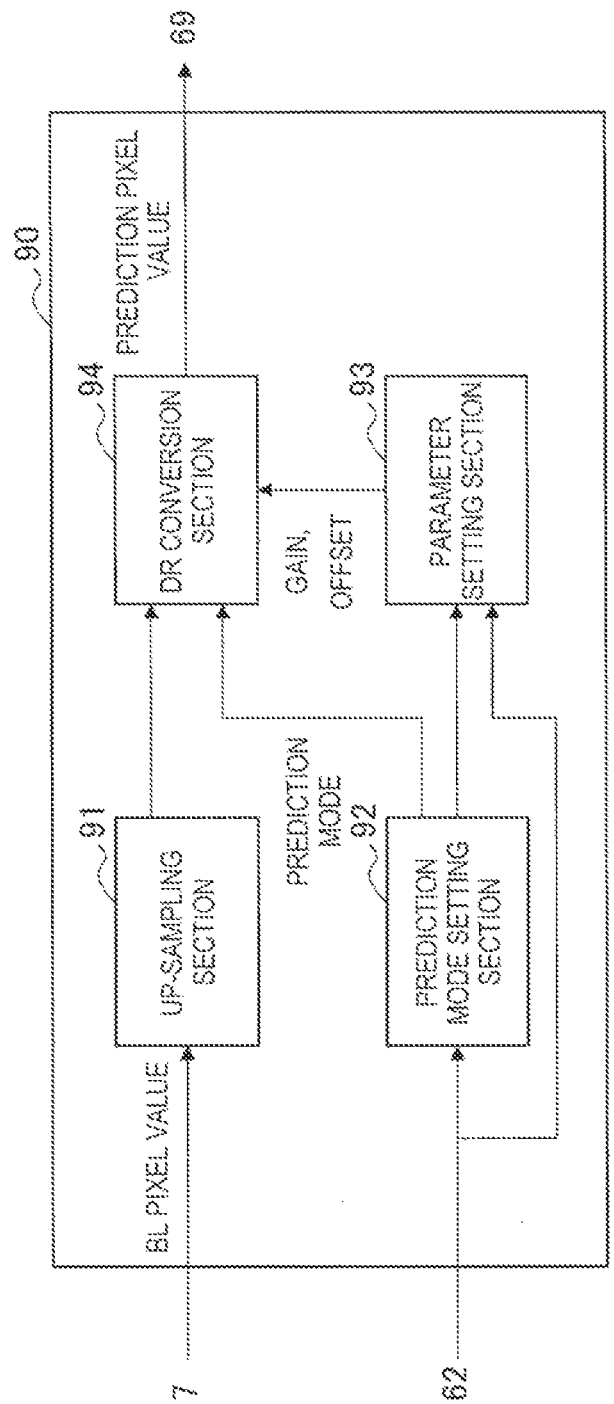
FIG. 27 is a block diagram illustrating an example of a configuration of a DR prediction section illustrated in FIG. 26.

FIG. 27 is a block diagram illustrating an example of a configuration of the DR prediction section 90 illustrated in FIG. 26. Referring to FIG. 27, the DR prediction section 90 includes an up-sampling section 91, a prediction mode setting section 92, a parameter setting section 93, and a DR conversion section 94.

(1) Up-Sampling Section

The up-sampling section 91 up-samples the image of the base layer acquired from the common memory 7 according to the resolution ratio between the base layer and the enhancement layer. More specifically, the up-sampling section 91 calculates an interpolation pixel value of each of interpolation pixels sequentially scanned according to the resolution ratio by filtering the image of the base layer using a predefined filter coefficient. As a result, the space resolution of the image of the base layer used as the reference block is increased up to the resolution equal to that of the enhancement layer. The up-sampling section 91 outputs the up-sampled image to the DR conversion section 94. When the layers have the same resolution, the up-sampling may be skipped. In this case. the up-sampling section 41 may output the image of the base layer to the parameter calculation section 43 and the DR conversion section 44 without change.

(2) Prediction Mode Setting Section

The prediction mode setting section 92 sets the prediction mode indicated by the prediction mode parameter decoded by the lossless decoding section 62 among the prediction mode candidates for DR prediction to the DR prediction section 90. The prediction mode candidate may include the bit shift mode, the fixed parameter mode, and the adaptive parameter mode. In an embodiment, the prediction mode setting section 92 may set the prediction mode according to the prediction mode parameter decoded from the PPS. In another embodiment, the prediction mode setting section 92 may set the prediction mode according to the prediction mode parameter decoded from the slice header. Further. in another embodiment, the prediction mode setting section 92 may set the prediction mode according to the prediction mode parameter decoded from the SPS. When the prediction mode parameter is decoded from the SPS, the same prediction mode can be maintained within one sequence.

(3) Parameter Setting Section

When the adaptive parameter mode is set by the prediction mode setting section 92. the parameter setting section 93 sets the prediction parameter to be used for the DR prediction according to the prediction parameter decoded by the lossless decoding section 62. Here, the prediction parameter includes the gain $g_i$ and the offset $o_i$ (i=1, 2, 3) indicated in Formulas (4) to (6).

According to a modified example, in the adaptive parameter mode, the parameter setting section 93 acquires the differences of the gain and the offset from the lossless decoding section 62. In this case, the parameter setting section 93 may calculate the latest values of the gain and the offset by adding the differences of the previous values of the gain and the offset. Here, the previous value may be, for example, a value calculated for an immediately previous picture when the gain and the offset are calculated for each picture. The previous value may be a value calculated for a slice at the same position of an immediately previous picture when the gain and the offset are calculated for each slice.

When the latest prediction mode parameter indicates the adaptive parameter mode, and an immediately previous prediction mode parameter indicates the bit shift mode, the parameter setting section 93 adds the difference decoded by the lossless decoding section 62 to the prediction parameter value corresponding to the bit shift amount. Further, when the latest prediction mode parameter indicates the adaptive parameter mode, and an immediately previous prediction mode parameter indicates the fixed parameter mode, the parameter setting section 93 adds the difference decoded by the lossless decoding section 62 to a predefined fixed prediction parameter value. The previous values (that is, the basis of the differences) to which the differences of the gain and the offset are added are illustrated in FIG. 9.

The parameter setting section 93 outputs setting values of the gain and the offset to the DR conversion section 94. Further, since the value of the gain may include a fractional value, the denominator and the numerator (or the differences thereof) may be individually decoded. Thus, the parameter setting section 93 may acquire the denominator and the numerator (or the differences thereof) of the gain from the lossless decoding section 62. Multiplication of the gain by the DR conversion section 94 may be performed practically by multiplication of the integer numerator and a shift operation corresponding to division by the denominator. A range of a value of the denominator of the gain may be limited to an integer power of 2 in order to reduce the calculation cost. In this case, a logarithm having 2, the value of the denominator, as its base may be used as the prediction parameter.

(4) DR Conversion Section

The DR conversion section 94 converts the dynamic range of the up-sampled SDR image of the base layer input from the up-sampling section 91 according to the prediction mode set by the prediction mode setting section 42 into the same dynamic range as the HDR image of the enhancement layer. For example, when the bit shift mode is set, the DR conversion section 94 calculates a prediction pixel value by shifting the up-sampled pixel value of the base layer left by a certain bit shift amount according to Formulas (1) to (3). Further, when the fixed parameter mode is set. the DR conversion section 94 calculates the prediction pixel value by multiplying the up-sampled pixel value of the base layer by the fixed gain according to Formulas (4) to (6) and further adding the fixed offset. Further, when the adaptive parameter mode is set, the DR conversion section 94 calculates the prediction pixel value using the gin and the offset set by the parameter setting section 93 instead of the fixed gain and the fixed offset. As a result, the reference 6 image for the inter-layer prediction is generated. The DR conversion section 44 stores the generated reference image for the inter-layer prediction (the image of the base layer having the large dynamic range corresponding to the HDR image) in the frame memory 69.

An example of the syntax of the prediction mode parameter and the prediction parameter (the gain and the offset of each color component) decoded by the lossless decoding section 62 is illustrated in FIG. 8. The parameter may be decoded from the encoded stream of the enhancement layer through the lossless decoding section 62. The syntax illustrated in FIG. 8 may be included, for example, in the PPS or the slice header. As described above, the example in which the prediction mode parameter and the prediction parameter are decoded from the slice header has an advantage in terms of the purpose for which a dynamic range differing according to each partial region of an image is used. The extension flag "dr_prediction_flag" and the prediction mode parameter "dr_prediction_model" may be decoded from the SPS for each sequence. In this case, the same prediction mode is maintained within one sequence.

Further, in an embodiment. the lossless decoding section 62 may decode the prediction parameter of the DR prediction from the header (slice header) having the syntax shared with the weighted prediction-related parameter according to the mapping shown in Table 1. By reusing the syntax, the redundancy of the syntax is reduced, and it is easy to implement the encoder and the decoder and secure compatibility at the time of version upgrade. Here, the extension flag "dr_redicrion_lag" and the prediction mode parameter "dr_prediction_model" may be separately decoded from the SPS, the PPS, or the slice header. Further, the lossless decoding section 62 may decode the flag indicating whether or not one of the weighted prediction-related parameter and the DR prediction parameter has been encoded and decode the DR prediction parameter according to the decoded flag. When the weighted prediction-related parameter is reused between layers, the lossless decoding section 62 may decode the prediction parameter of the DR prediction with the same syntax instead without decoding the weighted prediction-related parameter specific to the enhancement layer. In this case. the syntax (the 11th to 38th lines of FIG. 11) for the parameter of the L1 reference frame may not be used. Further, the value of the variable "num_ref_idx_10_active_minus1" corresponding to the number of reference frames (minus 1) may be considered to be zero (that is, the number of base layer images whose dynamic range has to be converted is 1).

In another embodiment. the lossless decoding section 62 may reuse some weighted prediction-related parameters for the DR prediction. For example, the denominators defined by "luma_log 2_weight_denom" and "delta_chroma_log 2_weight_denom" illustrated in FIG. 11 may be reused as the denominators of the gains of the luma component and the chrome component. In this case, the lossless decoding section 62 docs not decode "delt_luma_log 2 gain_denom" and "delta_chroma_log 2_gain_denom" illustrated in FIG. 8.

In a modified example, the lossless decoding section 62 may decode the first version (or the difference thereof) of the prediction parameter of the DR prediction from the L0 reference frame pert of the syntax shared with the weighted prediction-related parameter and decode the second version (or the difference thereof) of the prediction parameter of the DR prediction from the L1 reference frame pert of the syntax. When the differences are decoded, the parameter setting section 93 calculates the first version of the prediction parameter of the DR prediction using the difference decoded for the first version, and calculates the second version of the prediction parameter of the DR prediction using the difference decoded for the second version. Then, the DR conversion section 94 selectively uses the first version and the second version of the prediction parameter in order to predict the image of the enhancement layer, that is. in order to generate the reference image for the inter-layer prediction.

In the modified example, the DR conversion section 94 may select the version to be used from the first version and the second version of the prediction parameter, for example, according to the band to which the pixel value belongs. The boundary value corresponding to the boundary between bands for switching of the version to be used may be known to both of the encoder and the decoder in advance or may be adaptively set. When the boundary value is adaptively set. the DR conversion section 94 determines the band to which the pixel value belongs according to the boundary value specified by the boundary information that can be further decoded by the lossless decoding section 62. Then, the DR conversion section 94 may select the version to be used from the first version and the second version of the prediction parameter based on the determination result.

Instead, in the modified example, the DR conversion section 94 may select the version to be used from the first version and the second version of the prediction parameter, for example, according to the image region to which the pixel belongs. The region boundary for switching of the version to be used may be known to both the encoder and the decoder in advance or may be adaptively set. When the region boundary is adaptively set, the DR conversion section 94 determines the image region to which the pixel belongs according to the region boundary specified by the boundary information that can be further decoded by the lossless decoding section 62. Then, the DR conversion section 94 may select the version to be used from the first version and the second version of the prediction parameter based on the determination result.

According to this modified example, compared to the existing technique, the prediction error of the DR prediction is reduced, and the code amount of the prediction error data is reduced. As a result, the coding efficiency is increased. The technique of providing the two versions of prediction parameters may be applied only to the luma component and may not be applied to the chroma component.

Further, in an embodiment, when the bit depth of the enhancement layer is larger than the bit depth of the base layer, the DR conversion section 94 is allowed to execute the bit shift at the same time as the DR conversion when the image of the enhancement layer is predicted. The lossless decoding section 62 decodes the bit shift control flag indicating whether or not the bit shift is to be executed at the same time as the DR conversion in the inter-layer processing as the control parameter of the enhancement layer. Then, the DR conversion section 94 executes the bit shift at the same time as the DR conversion when the bit shift control flag indicates that the bit shift is to be executed at the same time as the DR conversion, and otherwise executes the bit shift, for example, at the same time as the up-sampling. Thus, it is possible to adaptively switch the bit shift execution timing and minimize the number of processing steps in the inter-layer processing. As a result, the processing cost can be suppressed to be smaller than in the existing technique. The lossless decoding section 62 may decode the bit shift control flag separately for the luma component and the chroma component. In this case, it is possible to perform more flexible control according to the setting (the setting of the image size and the bit depth) of each color component. The bit shift control flag may be typically decoded from the slice header as illustrated in FIG. 19. However, the present disclosure is not limited to this example, and the bit shift control flag may be decoded from any other location such as the SPS or the PPS.

<5. Process Flow For Decoding According To An Embodiment>

[5-1. Schematic Flow]

Figure 28:
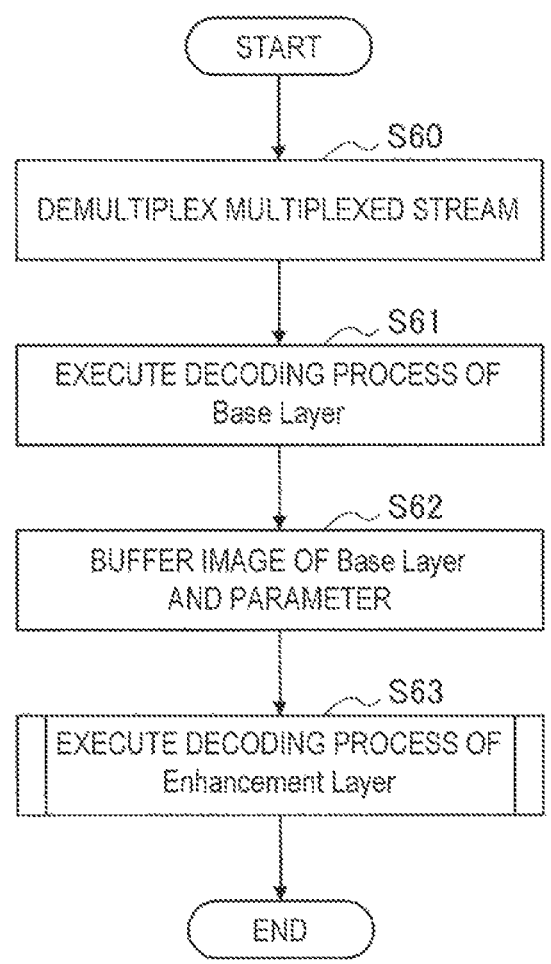
FIG. 28 is a flow chart showing an example of schematic process flow at the time of decoding according to an embodiment.

FIG. 28 is a flow chart showing an example of a schematic process flow at the time of the decoding according to an embodiment. For the sake of brevity of description, process steps not directly relevant to the technology in the present disclosure are omitted from the drawing.

Referring to FIG. 28, the demultiplexing section 5 first demultiplexes the multilayer multiplexed stream into the encoded stream of the base layer and the encoded stream of the enhancement layer (step S60).

Next, the BL decoding section 6a performs the decoding process of the base layer to reconstruct the image of the base layer from the encoded steam of the base layer (step S61).

The common memory 7 buffers an image (one or both of a decoded image and a predicted error image) of the base layer generated in the decoding process for the base layer and the parameters reused between the layers (step S62). The parameters reused between the layers may include the weighted prediction-related parameter.

Next, the EL decoding section 6b performs the decoding process for the enhancement layer to reconstruct the image of the enhancement layer (step S63). In the decoding process for the enhancement layer performed herein, the image of the base layer buffered by the common memory 7 is up-sampled by the DR prediction section 90 so that the dynamic range is converted from SDR to HDR. The image of the base layer after the DR conversion can be used as a reference image in the inter layer prediction.

[5-2. DR Prediction Process]

(1) First Example

Figure 29:
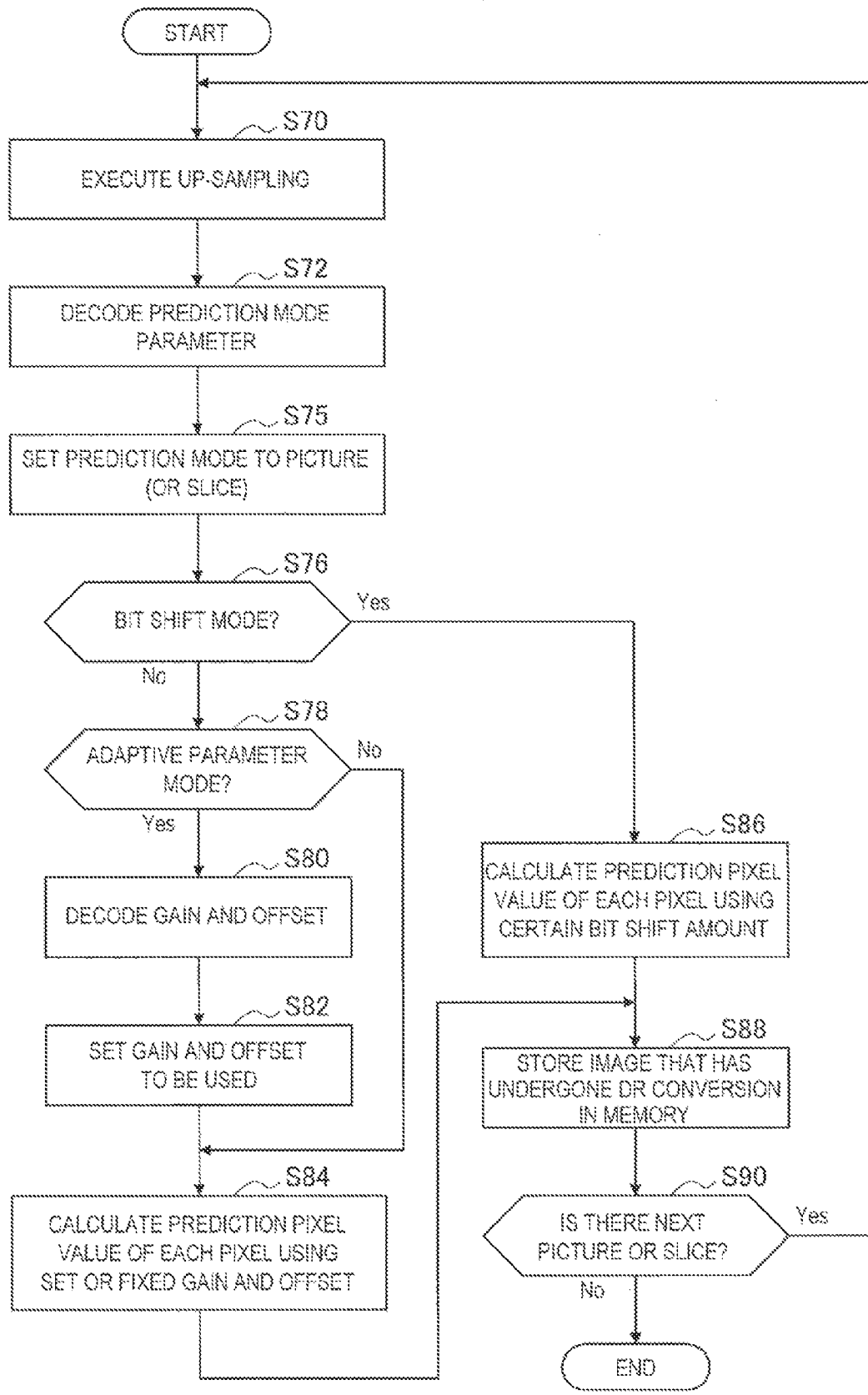
FIG. 29 is a flowchart illustrating a first example of a DR prediction process flow in a decoding process of an enhancement layer.

FIG. 29 is a flowchart illustrating a first example of a DR prediction process flow in a decoding process of the enhancement layer. The DR prediction process described herein is repeated in units of pictures or slices.

Referring to FIG. 29, first, the up-sampling section 91 up-samples the image of the base layer acquired from the common memory 7 according to the resolution ratio between the base layer and the enhancement layer (step S70).

Further, the lossless decoding section 62 decodes the prediction mode parameter indicating the prediction mode to be set for the DR prediction from the PPS or the slice header (step S72). Then, the prediction mode setting section 92 sets the prediction mode indicated by the decoded prediction mode parameter to a picture (or a slice) (step S75).

A subsequent process diverges depending on the prediction mode set by the prediction mode setting section 92 (steps S76 and S78). For example, when the set prediction mode is the adaptive parameter mode, the lossless decoding section 62 decodes the gain and the offset (or the differences thereof from the previous value) from the PPS or the slice header (step S80). Then, the parameter setting section 93 sets the gain and the offset to be used to the latest picture or slice (step S82). When the differences of the gain and the offset are decoded, the parameter setting section 93 may calculate the gain and the offset to be used by adding the decoded differences to the previous values of the gain and the offset, respectively.

When the set prediction mode is the adaptive parameter mode or the fixed parameter mode, the DR conversion section 94 calculates the prediction pixel value of each pixel by multiplying the up-sampled pixel value of the base layer by the dynamically set gain or the fixed gain and further adding the offset according to Formulas (4) to (6) (step S84).

When the set prediction mode is the bit shift mode, the DR conversion section 94 calculates the prediction pixel value of each pixel by shifting the up-sampled pixel value of the base layer left by a certain bit shift amount according to Formulas (1) to (3) (step S86).

When all the prediction pixel values within the picture or slice of the processing target are calculated, the DR conversion section 94 stores the image of the base layer that has undergone the DR conversion, that is, the predicted image serving as the HDR image in the frame memory 69 (step S88).

(2) Second Example

Figure 30:
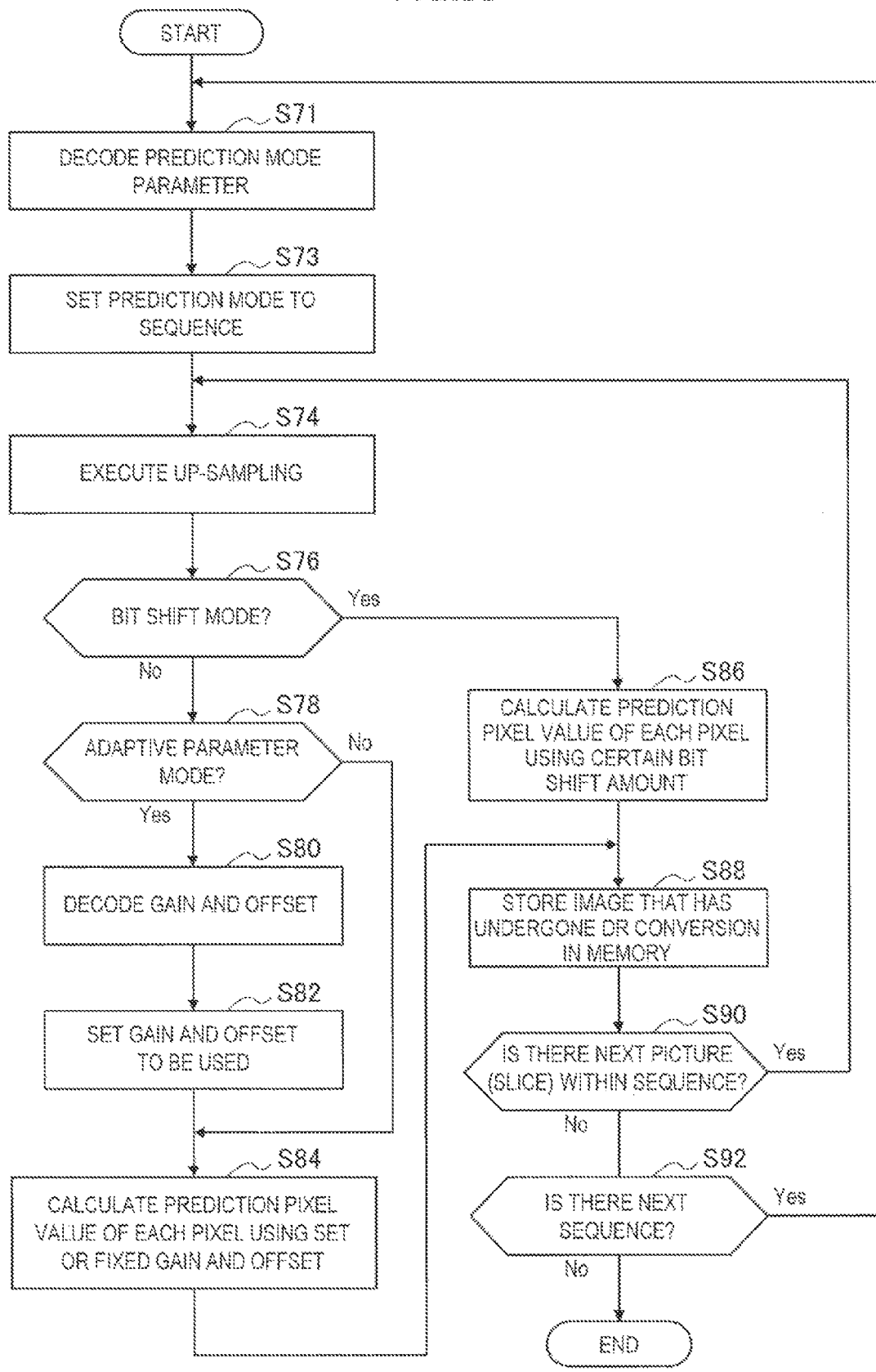
FIG. 30 is a flowchart illustrating a second example of a DR prediction process flow in a decoding process of an enhancement layer.

FIG. 30 is a flowchart illustrating a second example of the DR prediction process flow in the decoding process of the enhancement layer.

Referring to FIG. 30, first, the lossless decoding section 62 decodes the prediction mode parameter indicating the prediction mode to be set for the DR prediction from the SPS (step S71). Then, the prediction mode setting section 92 sets the prediction mode indicated by the decoded prediction mode parameter in a sequence (step S73).

The process of steps S74 to S90 is repeatedly performed on each picture or slice within a sequence.

The up-sampling section 91 up-samples the image of the base layer acquired from the common memory 7 according to the resolution ratio between the base layer and the enhancement layer (step S74).

Further, the process diverges depending on the prediction mode set by the prediction mode setting section 92 (steps S76 and S78). For example, when the set prediction mode is the adaptive parameter mode, the lossless decoding section 62 decodes the gain and the offset (or the differences thereof from the previous value) from the PPS or the slice header (step 880). Then, the parameter setting section 93 sets the gain and the offset to be used to the latest picture or slice (step S82). When the differences of the gain and the offset are decoded, the parameter setting section 93 may calculate the gain and the offset to be used by adding the decoded difference to the previous values of the gain and the offset.

When the set prediction mode is the adaptive parameter mode or the fixed parameter mode, the DR conversion section 94 calculates the prediction pixel value of each pixel by multiplying the up-sampled pixel value of the base layer by the dynamically set gain or the fixed gin and further adding the offset according to Formulas (4) to (6) (step S84).

When the set prediction mode is the bit shift mode, the DR conversion section 94 calculates the prediction pixel value of each pixel by shifting the up-sampled pixel value of the base layer left by a certain bit shift amount according to Formulas (1) to (3) (step S86).

When all the prediction pixel values within the picture or slice of the processing target are calculated, the DR conversion section 94 stores the image of the base layer that has undergone the DR conversion, that is, the predicted image serving as the HDR image in the frame memory 69 (step S88).

Thereafter, when there is a non-processed next picture or slice within a sequence, the process returns to step S74, and the up-sampling and the DR conversion are repeatedly performed on the next picture or slice (step S90). Further. when the DR conversion has ended on all pictures or all slices within the sequence, it is further determined whether or not there is a next sequence (step S92). Then, when there is a next sequence, the process returns to step S71, and the above-described process is repeatedly performed on the next sequence.

(3) Third Example

Figure 31:
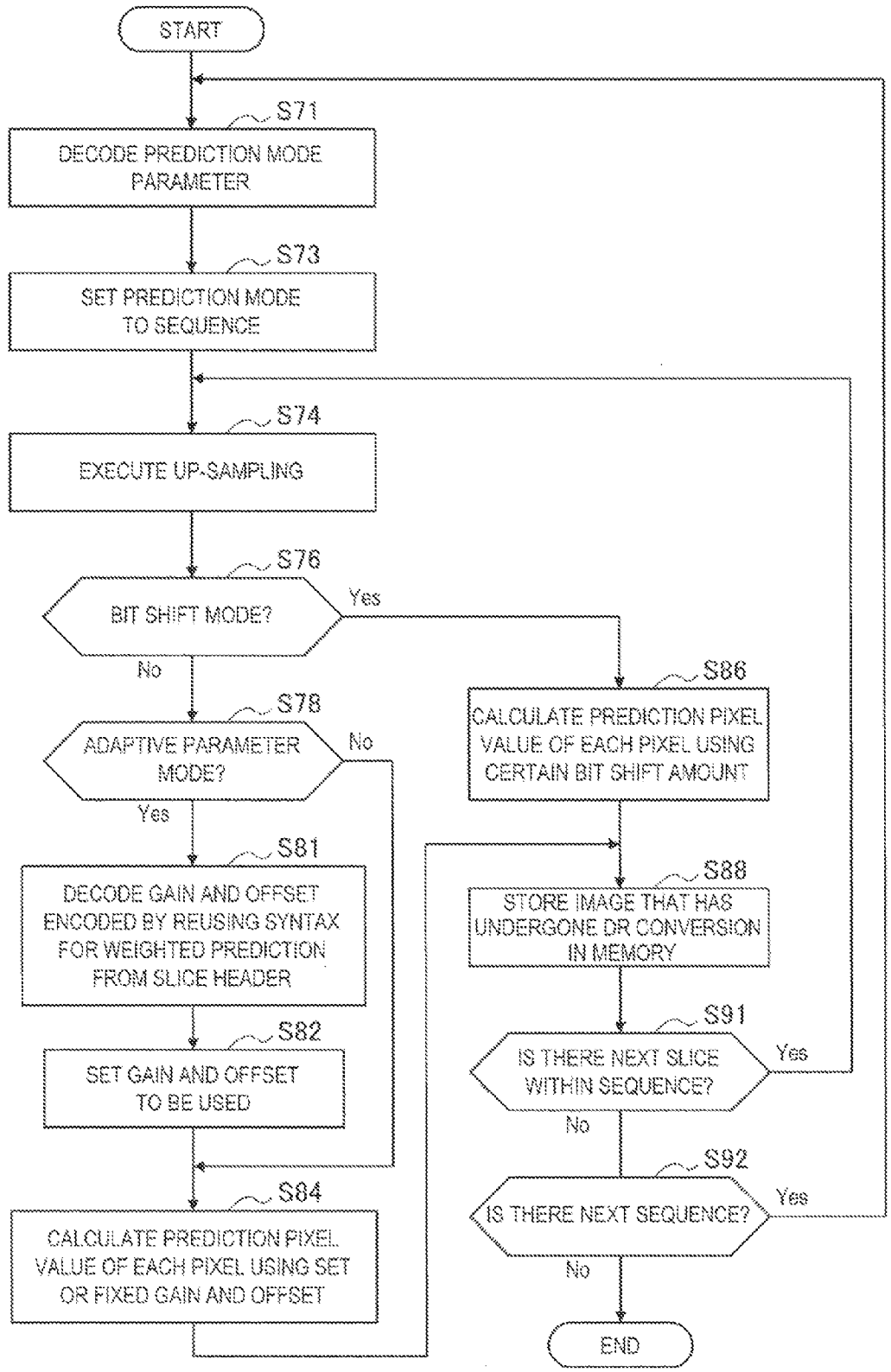
FIG. 31 is a flowchart illustrating a third example of a DR prediction process flow in a decoding process of an enhancement layer.

FIG. 31 is a flowchart illustrating a third example of the DR prediction process flow in the decoding process of the enhancement layer.

Referring to FIG. 31, first, the lossless decoding section 62 decodes the prediction mode parameter indicating the prediction mode to be set for the DR prediction from the SPS (step S71). Then. the prediction mode setting section 92 sets the prediction mode indicated by the decoded prediction mode parameter in a sequence (step S73).

The process of steps S74 to S91 is repeatedly performed on each slice within a sequence.

The up-sampling section 91 up-samples the image of the base layer acquired from the common memory 7 according to the resolution ratio between the base layer and the enhancement layer (step S74).

Further, the process diverges depending on the prediction mode set by the prediction mode setting section 92 (steps S76 and S78). For example, when the set prediction mode is the adaptive parameter mode, the lossless decoding section 62 decodes the gain and the offset (or the differences thereof from the previous value) encoded by reusing the syntax of the weighted prediction-related parameter from the slice header (step S81). Then, the parameter setting section 93 sets the gain and the offset to be used to the latest picture or slice (step S82). When the differences of the gain and the offset are decoded, the parameter setting section 93 may calculate the gain and the offset to be used by adding the decoded difference to the previous values of the gain and the offset.

When the set prediction mode is the adaptive parameter mode or the fixed parameter mode, the DR conversion section 94 calculates the prediction pixel value of each pixel by multiplying the up-sampled pixel value of the base layer by the dynamically set gain or the fixed gain and further adding the offset according to Formulas (4) to (6) (step S84). Further, the calculation of the prediction pixel value herein may include the bit shift for compensating for the bit depth difference between layers according to the bit shift control flag that can be decoded from the encoded stream. The bit shift may be included in the up-sampling filter operation in step S74.

When the set prediction mode is the bit shift mode, the DR conversion section 94 calculates the prediction pixel value of each pixel by shifting the up-sampled pixel value of the base layer left by a certain bit shift amount according to Formulas (1) to (3) (step S86).

When all the prediction pixel values within the slice of the processing target are calculated, the DR conversion section 94 stores the image of the base layer that has undergone the DR conversion, that is, the predicted image serving as the HDR image in the frame memory 69 (step S88).

Thereafter, when there is a non-processed next slice within a sequence, the process returns to step S74, and the up-sampling and the DR conversion are repeatedly performed on the next slice (step S91). Further. when the DR conversion has ended on all slices within the sequence, it is further determined whether or not there is a next sequence (step S92). Then, when there is a next sequence, the process returns to step S71, and the above-described process is repeatedly performed on the next sequence.

(4) Fourth Example

Figure 32:
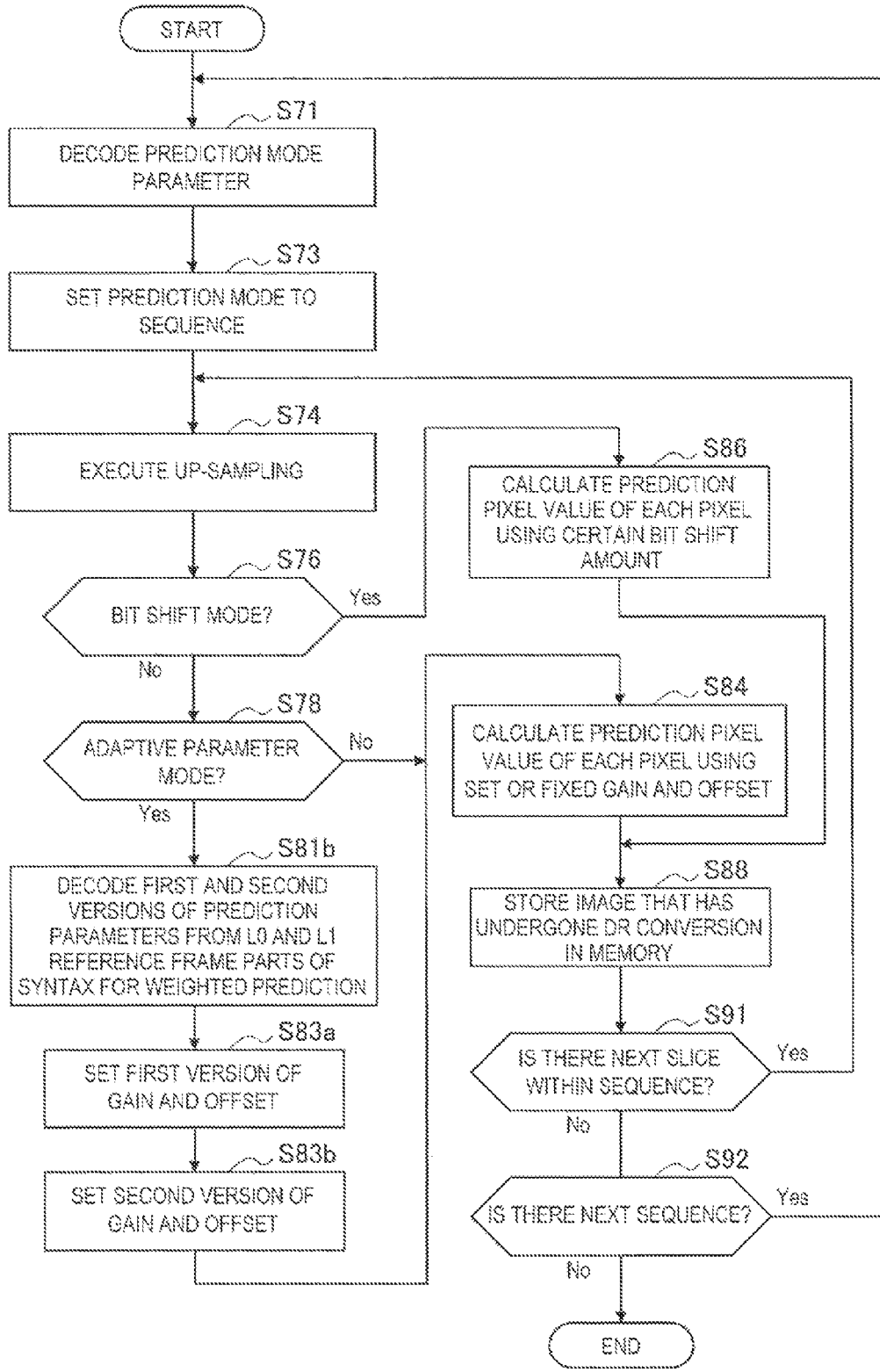
FIG. 32 is a flowchart illustrating a fourth example of a DR prediction process flow in a decoding process of an enhancement layer.

FIG. 32 is a flowchart illustrating a fourth example of the DR prediction process flow in the decoding process of the enhancement layer.

Referring to FIG. 31, first, the lossless decoding section 62 decodes the prediction mode parameter indicating the prediction mode to be set for the DR prediction from the SPS (step S71). Then, the prediction mode setting section 92 sets the prediction mode indicated by the decoded prediction mode parameter in a sequence (step S73).

The process of steps S74 to S91 is repeatedly performed on each slice within a sequence.

The up-sampling section 91 up-samples the image of the base layer acquired from the common memory 7 according to the resolution ratio between the base layer and the enhancement layer (step S74).

Further, the process diverges depending on the prediction mode set by the prediction mode setting section 92 (steps S76 and S78). For example, when the set prediction mode is the adaptive parameter mode, the lossless decoding section 62 decodes the first version and the second version of the prediction parameter from the L0 reference frame part and the L1 reference frame part of the syntax of the weighted prediction-related parameter (step S81b). Then, the parameter setting section 93 sets the first version of the gain and the offset to be used (step S83a). Similarly, the parameter setting section 93 sets the second version of the gain and the offset to be used (step S83b). Each of the first version and the second version may include a set of optimum values to be used for a first band and a second band in the pixel value range. Instead, each of the first version and the second version may include a set of optimum values to be used for a first image region and a second image region. When the differences of the gain and the offset are decoded for each version, the parameter setting section 93 may calculate the gain and the offset to be used by adding the decoded differences to the previous values of the gain and the offset of each version.

A subsequent process flow may be similar to the third example described above with reference to FIG. 31 except that switching of the version of the prediction parameter according to a band to which a pixel value belongs or an image region to which a pixel belongs can be performed in step S84. Further, in step S81b, the lossless decoding section 62 may additionally decode the boundary information specifying the boundary value between bands or the region boundary between image regions for switching of the version of the prediction parameter, for example, from the slice header or the extension of the slice header.

(5) Modified Example of Processing Procedure

The flowcharts of FIGS. 29 to 32 illustrate the example in which the DR conversion is executed after the up-sampling is executed. However, as described above with reference to FIGS. 25A and 25B, in a modified example, when the space resolution (the image size) of the enhancement layer is higher than the space resolution of the base layer, the DR prediction section 90 may predict the enhancement layer image by converting the dynamic range of the base layer image and up-sampling the converted image. According to this processing procedure, the number of pixels of the conversion target of the DR conversion is reduced to be smaller than in the case of the existing processing procedure, and thus the processing cost for the entire inter-layer processing can be further suppressed.

<6. Example Application>

[6-1. Application to Various Products]

The image encoding device 10 and the image decoding device 60 according to the embodiment described above may be applied to various electronic appliances such as a transmitter and a receiver for satellite broadcasting, cable broadcasting such as cable TV distribution on the Internet, distribution to terminals via cellular communication, and the like, a recording device that records images in a medium such as an optical disc, a magnetic disk or a flash memory, a reproduction device that reproduces images from such storage medium, and the like. Four example applications will be described below.

(1) First Application Example

Figure 33:
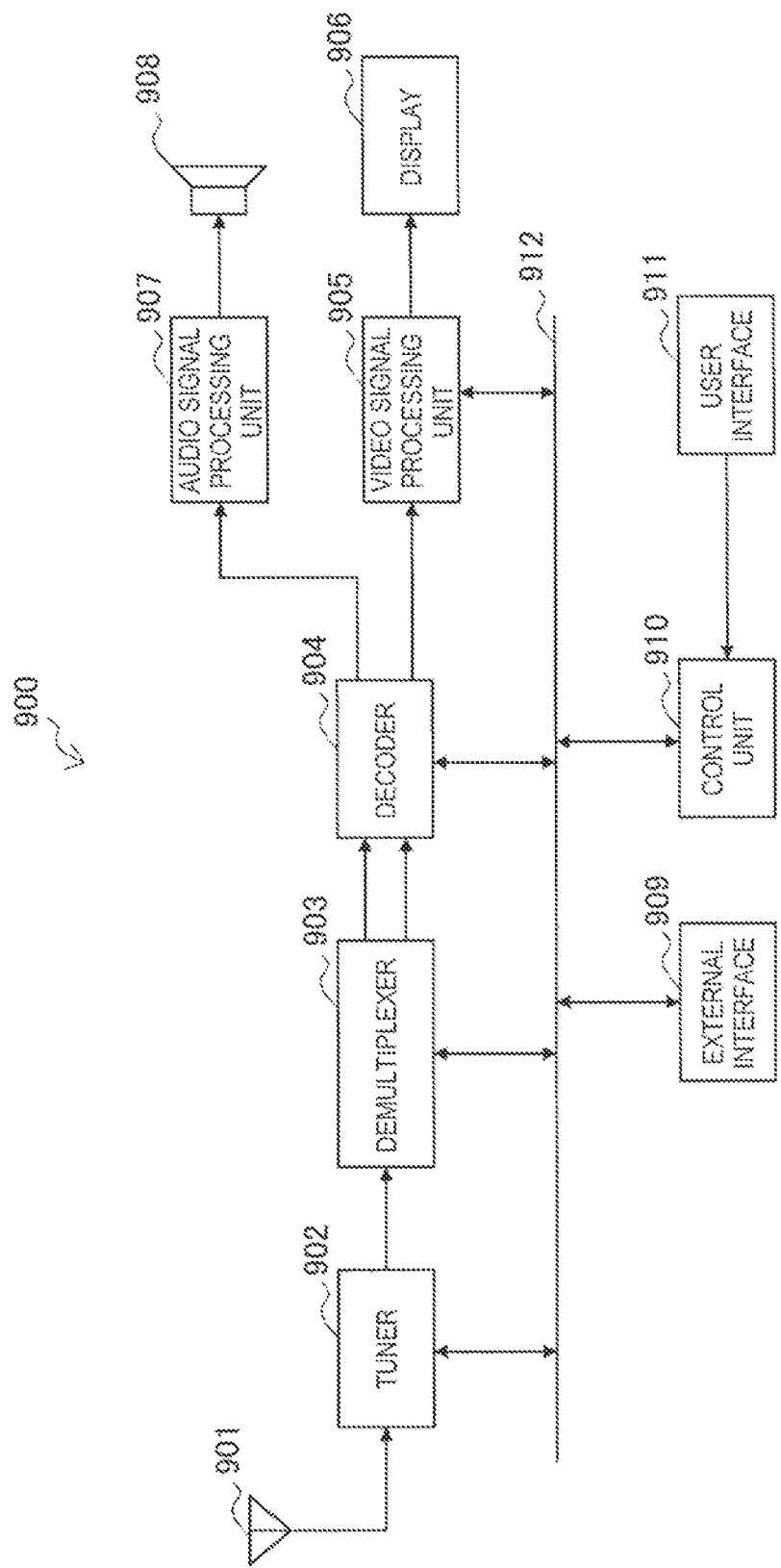
FIG. 33 is a block diagram showing an example of a schematic configuration of television.

FIG. 33 is a diagram illustrating an example of a schematic configuration of a television device applying the aforementioned embodiment. A television device 900 includes an antenna 901, a tuner 902, a demultiplexer 903, a decoder 904, a video signal processing unit 905, a display 906, an audio signal processing unit 907, a speaker 908, an external interface 909, a control unit 910, a user interface 911, and a bus 912.

The tuner 902 extracts a signal of a desired channel from a broadcast signal received through the antenna 901 and demodulates the extracted signal. The tuner 902 then outputs an encoded bit stream obtained by the demodulation to the demultiplexer 903. That is, the tuner 902 has a role as transmission means receiving the encoded stream in which an image is encoded, in the television device 900.

The demultiplexer 903 isolates a video stream and an audio stream in a program to be viewed from the encoded bit stream and outputs each of the isolated streams to the decoder 904. The demultiplexer 903 also extracts auxiliary data such as an EPG (Electronic Program Guide) from the encoded bit stream and supplies the extracted data to the control unit 910. Here, the demultiplexer 903 may descramble the encoded bit stream when it is scrambled.

The decoder 904 decodes the video stream and the audio stream that are input from the demultiplexer 903. The decoder 904 then outputs video data generated by the decoding process to the video signal processing unit 905. Furthermore, the decoder 904 outputs audio data generated by the decoding process to the audio signal processing unit 907.

The video signal processing unit 905 reproduces the video data input from the decoder 904 and displays the video on the display 906. The video signal processing unit 905 may also display an application screen supplied through the network on the display 906. The video signal processing unit 905 may further perform an additional process such as noise reduction on the video data according to the setting. Furthermore, the video signal processing unit 905 may generate an image of a GUI (Graphical User Interface) such as a menu, a button, or a cursor and superpose the generated image onto the output image.

The display 906 is driven by a drive signal supplied from the video signal processing unit 905 and displays video or an image on a video screen of a display device (such as a liquid crystal display, a plasma display, or an OELD (Organic ElectroLuminescence Display)).

The audio signal processing unit 907 performs a reproducing process such as D/A conversion and amplification on the audio data input from the decoder 904 and outputs the audio from the speaker 908. The audio signal processing unit 907 may also perform an additional process such as noise reduction on the audio data.

The external interface 909 is an interface that connects the television device 900 with an external device or a network. For example, the decoder 904 may decode a video stream or an audio stream received through the external interface 909. This means that the external interface 909 also has a role as the transmission means receiving the encoded stream in which an image is encoded, in the television device 900.

The control unit 910 includes a processor such as a CPU and a memory such as a RAM and a ROM. The memory stores a program executed by the CPU, program data, EPG data, and data acquired through the network. The program stored in the memory is read by the CPU at the start-up of the television device 900 and executed, for example. By executing the program, the CPU controls the operation of the television device 900 in accordance with an operation signal that is input from the user interface 911, for example.

The user interface 911 is connected to the control unit 910. The user interface 911 includes a button and a switch for a user to operate the television device 900 as well as a reception part which receives a remote control signal, for example. The user interface 911 detects a user operation through these components, generates the operation signal, and outputs the generated operation signal to the control unit 910.

The bus 912 mutually connects the tuner 902, the demultiplexer 903, the decoder 904, the video signal processing unit 905. the audio signal processing unit 907, the external interface 909, and the control unit 910.

The decoder 904 in the television device 900 configured in the aforementioned manner has a function of the image decoding device 60 according to the aforementioned embodiment. As a result, the mechanism of predicting an HDR image from an SDR image at an appropriate image quality can be incorporated into the television device 900 without requiring a complicated implementation.

(2) Second Application Example

Figure 34:
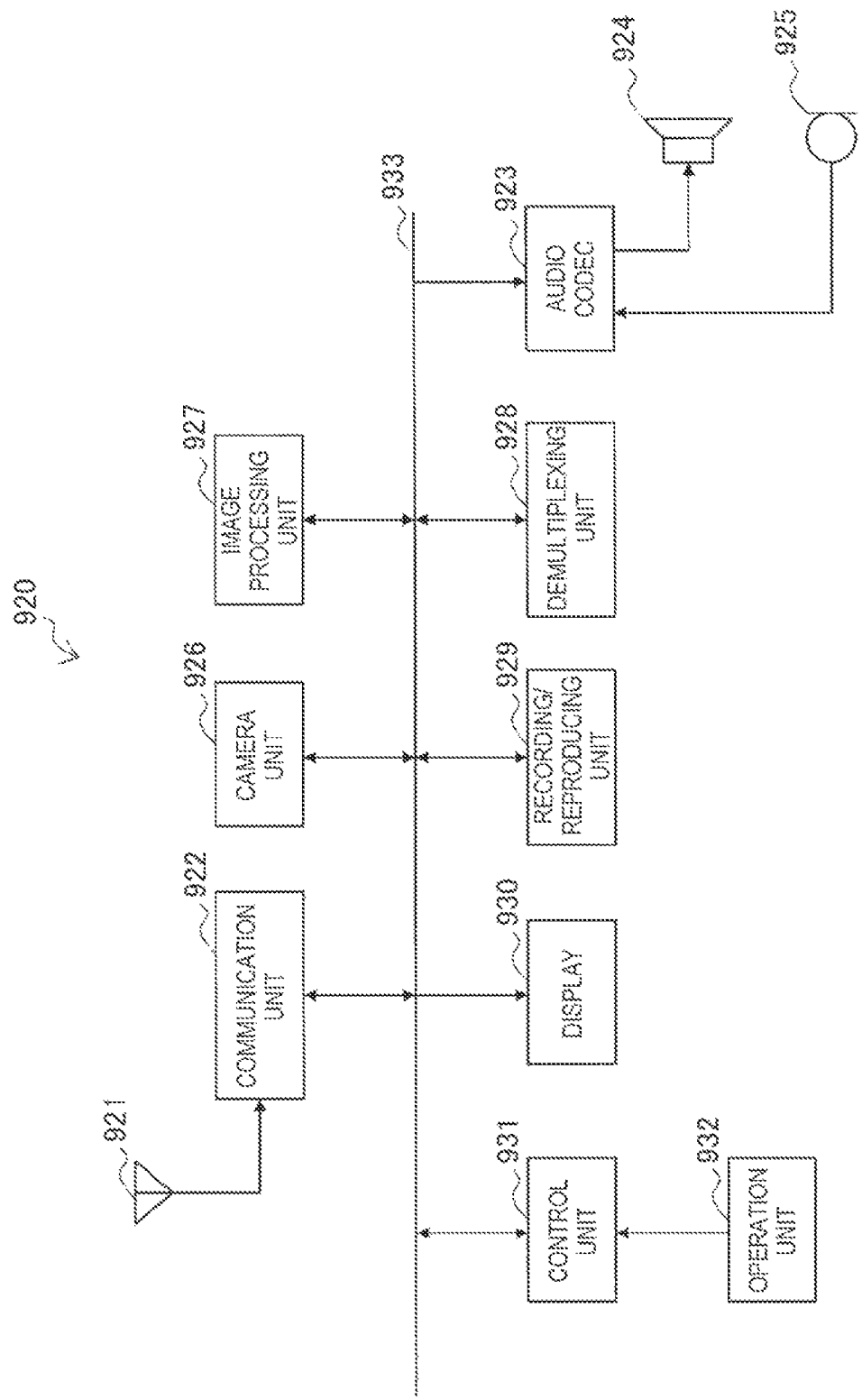
FIG. 34 is a block diagram showing an example of a schematic configuration of a mobile phone.

FIG. 34 is a diagram illustrating an example of a schematic configuration of a mobile telephone applying the aforementioned embodiment. A mobile telephone 920 includes an antenna 921, a communication unit 922, an audio codec 923, a speaker 924, a microphone 925, a camera unit 926, an image processing unit 927, a demultiplexing unit 928, a recording/reproducing unit 929, a display 930, a control unit 931, an operation unit 932, and a bus 933.

The antenna 921 is connected to the communication unit 922. The speaker 924 and the microphone 925 are connected to the audio codec 923. The operation unit 932 is connected to the control unit 931. The bus 933 mutually connects the communication unit 922, the audio codec 923. the camera unit 926, the image processing unit 927, the demultiplexing unit 928, the recording/reproducing unit 929, the display 930, and the control unit 931.

The mobile telephone 920 performs an operation such as transmitting/receiving an audio signal, transmitting/receiving an electronic mail or image data. imaging an image, or recording data in various operation modes including an audio call mode, a data communication mode. a photography mode, and a videophone mode.

In the audio call mode. an analog audio signal generated by the microphone 925 is supplied to the audio codec 923. The audio codec 923 then converts the analog audio signal into audio data, perform A/D conversion on the converted audio data, and compresses the data. The audio codec 923 thereafter outputs the compressed audio data to the communication unit 922. The communication unit 922 encodes and modulates the audio data to generate a transmission signal. The communication unit 922 then transmits the generated transmission signal to a base station (not shown) through the antenna 921. Furthermore, the communication unit 922 amplifies a radio signal received through the antenna 921, converts a frequency of the signal, and acquires a reception signal. The communication unit 922 thereafter demodulates and decodes the reception signal to generate the audio data and output the generated audio data to the audio codec 923. The audio codec 923 expands the audio data, performs D/A conversion on the data, and generates the analog audio signal. The audio codec 923 then outputs the audio by supplying the generated audio signal to the speaker 924.

In the data communication mode, for example, the control unit 931 generates character data configuring an electronic mail, in accordance with a user operation through the operation unit 932. The control unit 931 further displays a character on the display 930. Moreover, the control unit 931 generates electronic mail data in accordance with a transmission instruction from a user through the operation unit 932 and outputs the generated electronic mail data to the communication unit 922. The communication unit 922 encodes and modulates the electronic mail data to generate a transmission signal. Then, the communication unit 922 transmits the generated transmission signal to the base station (not shown) through the antenna 921. The communication unit 922 further amplifies a radio signal received through the antenna 921, converts a frequency of the signal, and acquires a reception signal. The communication unit 922 thereafter demodulates and decodes the reception signal, restores the electronic mail data. and outputs the restored electronic mail data to the control unit 931. The control unit 931 displays the content of the electronic mail on the display 930 as well as stores the electronic mail data in a storage medium of the recording/reproducing unit 929.

The recording/reproducing unit 929 includes an arbitrary storage medium that is readable and writable. For example, the storage medium may be a built-in storage medium such as a RAM or a flash memory, or may be an externally-mounted storage medium such as a hard disk, a magnetic disk, a magneto-optical disk, an optical disk, a USB (Unallocated Space Bitmap) memory, or a memory card.

In the photography mode, for example, the camera unit 926 images an object, generates image data, and outputs the generated image data to the image processing unit 927. The image processing unit 927 encodes the image data input from the camera unit 926 and stores an encoded stream in the storage medium of the recording/reproducing unit 929.

In the videophone mode, for example, the demultiplexing unit 928 multiplexes a video stream encoded by the image processing unit 927 and an audio stream input from the audio codec 923, and outputs the multiplexed stream to the communication unit 922. The communication unit 922 encodes and modulates the stream to generate a transmission signal. The communication unit 922 subsequently transmits the generated transmission signal to the base station (not shown) through the antenna 921. Moreover. the communication unit 922 amplifies a radio signal received through the antenna 921. converts a frequency of the signal. and acquires a reception signal. The transmission signal and the reception signal can include an encoded bit stream. Then, the communication unit 922 demodulates and decodes the reception signal to restore the stream, and outputs the restored stream to the demultiplexing unit 928. The demultiplexing unit 928 isolates the video stream and the audio stream from the input stream and outputs the video stream and the audio stream to the image processing unit 927 and the audio codec 923, respectively. The image processing unit 927 decodes the video stream to generate video data. The video data is then supplied to the display 930. which displays a series of images. The audio codec 923 expands and performs D/A conversion on the audio stream to generate an analog audio signal. The audio codec 923 then supplies the generated audio signal to the speaker 924 to output the audio.

The image processing unit 927 in the mobile telephone 920 configured in the aforementioned manner has a function of the image encoding device 10 and the image decoding device 60 according to the aforementioned embodiment. As a result. the mechanism of predicting an HDR image from an SDR image at an appropriate image quality can be incorporated into the mobile telephone 920 without requiring a complicated implementation.

(3) Third Application Example

Figure 35:
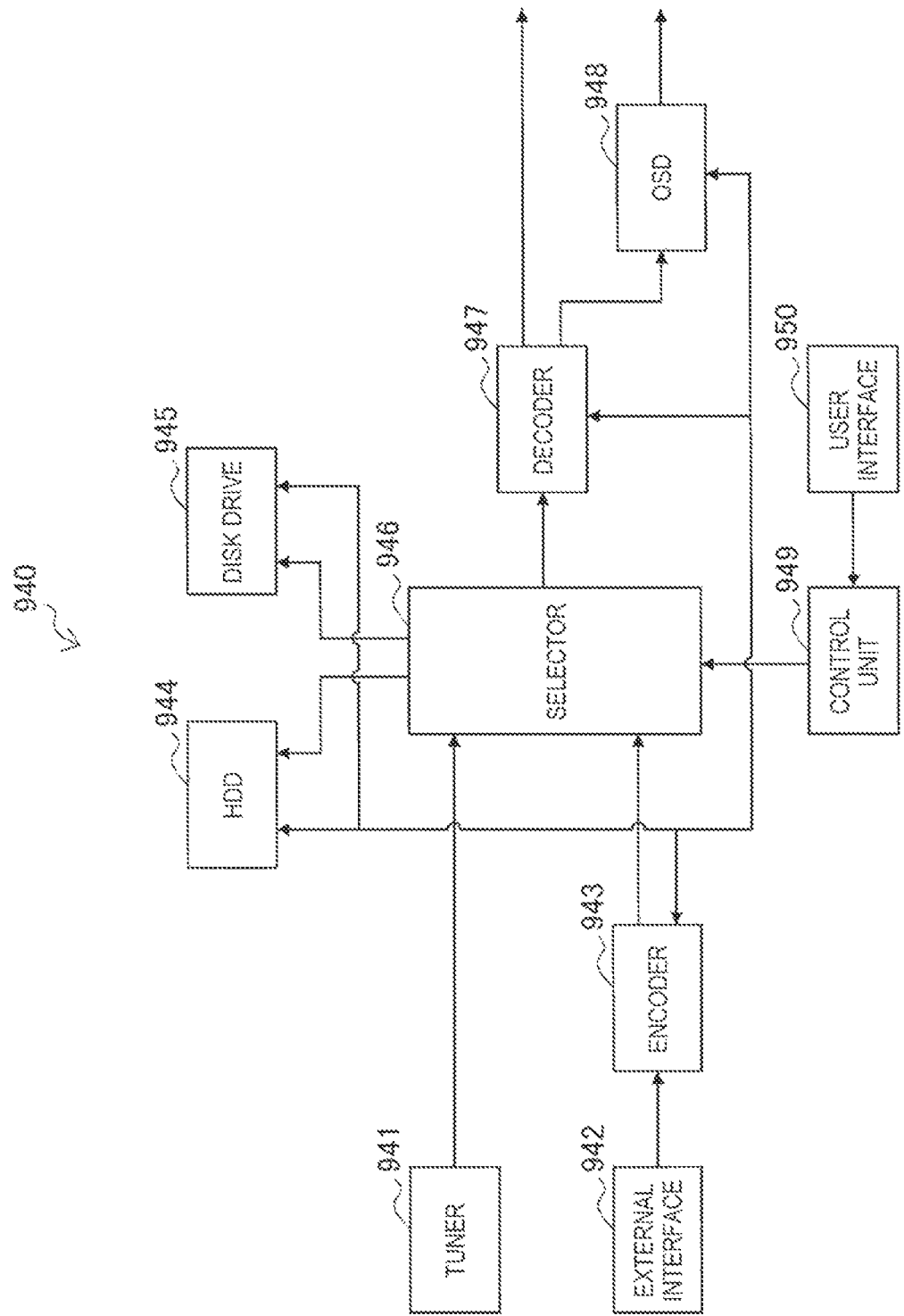
FIG. 35 is a block diagram showing an example of a schematic configuration of recording/reproduction device.

FIG. 35 is a diagram illustrating an example of a schematic configuration of a recording/reproducing device applying the aforementioned embodiment. A recording/reproducing device 940 encodes audio data and video data of a broadcast program received and records the data into a recording medium, for example. The recording/reproducing device 940 may also encode audio data and video data acquired from another device and record the data into the recording medium, for example. In response to a user instruction, for example, the recording/reproducing device 940 reproduces the data recorded in the recording medium on a monitor and a speaker. The recording/reproducing device 940 at this time decodes the audio data and the video data.

The recording/reproducing device 940 includes a tuner 941, an external interface 942, an encoder 943, an HDD (Hard Disk Drive) 944, a disk drive 945, a selector 946, a decoder 947, an OSD (On-Screen Display) 948, a control unit 949. and a user interface 950.

The tuner 941 extracts a signal of a desired channel from a broadcast signal received through an antenna (not shown) and demodulates the extracted signal. The tuner 941 then outputs an encoded bit stream obtained by the demodulation to the selector 946. That is, the tuner 941 has a role as transmission means in the recording/reproducing device 940.

The external interface 942 is an interface which connects the recording/reproducing device 940 with an external device or a network. The external interface 942 may be, for example, an IEEE 1394 interface, a network interface, a USB interface, or a flash memory interface. The video data and the audio data received through the external interface 942 are input to the encoder 943. for example. That is, the external interface 942 has a role as transmission means in the recording/reproducing device 940.

The encoder 943 encodes the video data and the audio data when the video data and the audio data input from the external interface 942 are not encoded. The encoder 943 thereafter outputs an encoded bit stream to the selector 946.

The HDD 944 records, into an internal hard disk, the encoded bit stream in which content data such as video and audio is compressed, various programs, and other data. The HDD 944 reads these data from the hard disk when reproducing the video and the audio.

The disk drive 945 records and reads data into/from a recording medium which is mounted to the disk drive. The recording medium mounted to the disk drive 945 may be, for example, a DVD disk (such as DVD-Video, DVD-RAM. DVD-R, DVD-RW, DVD+R, or DVD+RW) or a Blu-rny (Registered Trademark) disk.

The selector 946 selects the encoded bit stream input from the tuner 941 or the encoder 943 when recording the video and audio, and outputs the selected encoded bit stream to the HDD 944 or the disk drive 945. When reproducing the video and audio, on the other hand, the selector 946 outputs the encoded bit stream input from the HDD 944 or the disk drive 945 to the decoder 947.

The decoder 947 decodes the encoded bit stream to generate the video data and the audio data. The decoder 904 then outputs the generated video data to the OSD 948 and the generated audio data to an external speaker.

The OSD 948 reproduces the video data input from the decoder 947 and displays the video. The OSD 948 may also superpose an image of a GUI such as a menu, a button, or a cursor onto the video displayed.

The control unit 949 includes a processor such as a CPU and a memory such as a RAM and a ROM. The memory stores a program executed by the CPU as well as program data. The program stored in the memory is read by the CPU at the start-up of the recording/reproducing device 940 and executed, for example. By executing the program, the CPU controls the operation of the recording/reproducing device 940 in accordance with an operation signal that is input from the user interface 950, for example.

The user interface 950 is connected to the control unit 949. The user interface 950 includes a button and a switch for a user to operate the recording/reproducing device 940 as well as a reception part which receives a remote control signal, for example. The user interface 950 detects a user operation through these components, generates the operation signal, and outputs the generated operation signal to the control unit 949.

The encoder 943 in the recording/reproducing device 940 configured in the aforementioned manner has a function of the image encoding device 10 according to the aforementioned embodiment. On the other hand, the decoder 947 has a function of the image decoding device 60 according to the aforementioned embodiment. As a result, the mechanism of predicting an HDR image from an SDR image at an appropriate image quality can be incorporated into the recording/reproducing device 940 without requiring a complicated implementation.

(4) Fourth Application Example

Figure 36:
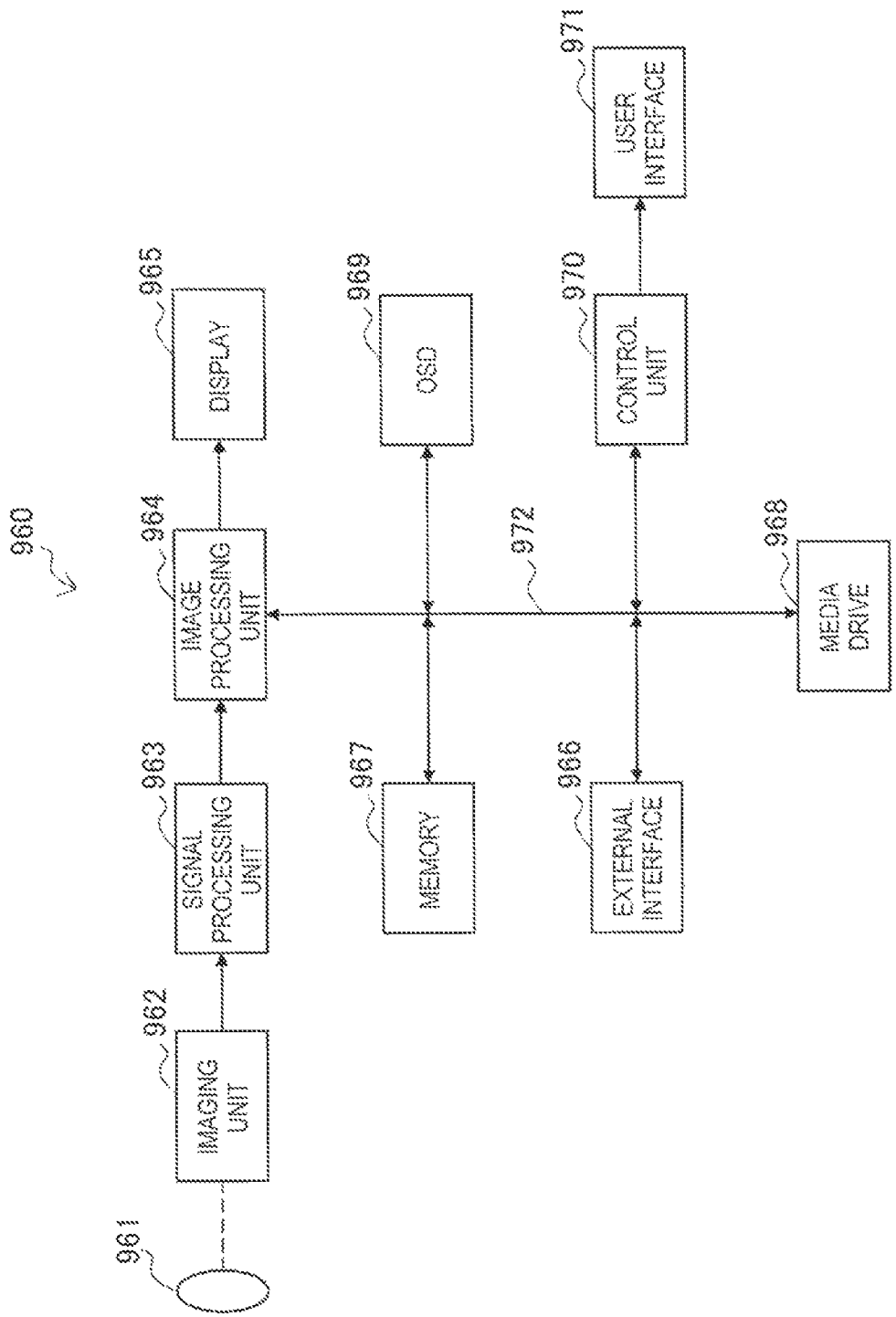
FIG. 36 is a block diagram showing an example of a schematic configuration of an image capturing device.

FIG. 36 shows an example of a schematic configuration of an image capturing device applying the aforementioned embodiment. An imaging device 960 images an object, generates an image, encodes image data, and records the data into a recording medium.

The imaging device 960 includes an optical block 961, an imaging unit 962. a signal processing unit 963, an image processing unit 964, a display 965. an external interface 966, a memory 967, a media drive 968, an OSD 969, a control unit 970, a user interface 971, and a bus 972.

The optical block 961 is connected to the imaging unit 962. The imaging unit 962 is connected to the signal processing unit 963. The display 965 is connected to the image processing unit 964. The user interface 971 is connected to the control unit 970. The bus 972 mutually connects the image processing unit 964, the external interface 966, the memory 967, the media drive 968, the OSD 969, and the control unit 970.

The optical block 961 includes a focus lens and a diaphragm mechanism. The optical block 961 forms an optical image of the object on an imaging surface of the imaging unit 962. The imaging unit 962 includes an image sensor such as a CCD (Charge Coupled Device) or a CMOS (Complementary Metal Oxide Semiconductor) and performs photoelectric conversion to convert the optical image formed on the imaging surface into an image signal as an electric signal. Subsequently, the imaging unit 962 outputs the image signal to the signal processing unit 963.

The signal processing unit 963 performs various camera signal processes such as a knee correction. a gamma correction and a color correction on the image signal input from the imaging unit 962. The signal processing unit 963 outputs the image data, on which the camera signal process has been performed, to the image processing unit 964.

The image processing unit 964 encodes the image data input from the signal processing unit 963 and generates the encoded data. The image processing unit 964 then outputs the generated encoded data to the external interface 966 or the media drive 968. The image processing unit 964 also decodes the encoded data input from the external interface 966 or the media drive 968 to generate image data. The image processing unit 964 then outputs the generated image data to the display 965. Moreover, the image processing unit 964 may output to the display 965 the image data input from the signal processing unit 963 to display the image. Furthermore, the image processing unit 964 may superpose display data acquired from the OSD 969 onto the image that is output on the display 965.

The OSD 969 generates an image of a GUI such as a menu, a button, or a cursor and outputs the generated image to the image processing unit 964.

The external interface 966 is configured as a USB input/output terminal, for example. The external interface 966 connects the imaging device 960 with a printer when printing an image, for example. Moreover, a drive is connected to the external interface 966 as needed. A removable medium such as a magnetic disk or an optical disk is mounted to the drive, for example, so that a program read from the removable medium can be installed to the imaging device 960. The external interface 966 may also be configured as a network interface that is connected to a network such as a LAN or the Internet. That is, the external interface 966 has a role as transmission means in the imaging device 960.

The recording medium mounted to the media drive 968 may be an arbitrary removable medium that is readable and writable such as a magnetic disk, a magneto-optical disk, an optical disk. or a semiconductor memory. Furthermore, the recording medium may be fixedly mounted to the media drive 968 so that a non-transportable storage unit such as a built-in hard disk drive or an SSD (Solid State Drive) is configured, for example.

The control unit 970 includes a processor such as a CPU and a memory such as a RAM and a ROM. The memory stores a program executed by the CPU as well as program data. The program stored in the memory is read by the CPU at the start-up of the imaging device 960 and then executed. By executing the program, the CPU controls the operation of the imaging device 960 in accordance with an operation signal that is input from the user interface 971, for example.

The user interface 971 is connected to the control unit 970. The user interface 971 includes a button and a switch for a user to operate the imaging device 960. for example. The user interface 971 detects a user operation through these components, generates the operation signal, and outputs the generated operation signal to the control unit 970.

The image processing unit 964 in the imaging device 960 configured in the aforementioned manner has a function of the image encoding device 10 and the image decoding device 60 according to the aforementioned embodiment. As a result, the mechanism of predicting an HDR image from an SDR image at an appropriate image quality can be incorporated into the imaging device 960 without requiring a complicated implementation.

[6-2. Various Uses of Scalable Video Coding]

Advantages of scalable video coding described above can be enjoyed in various uses. Three examples of use will be described below.

(1) First Example

Figure 37:
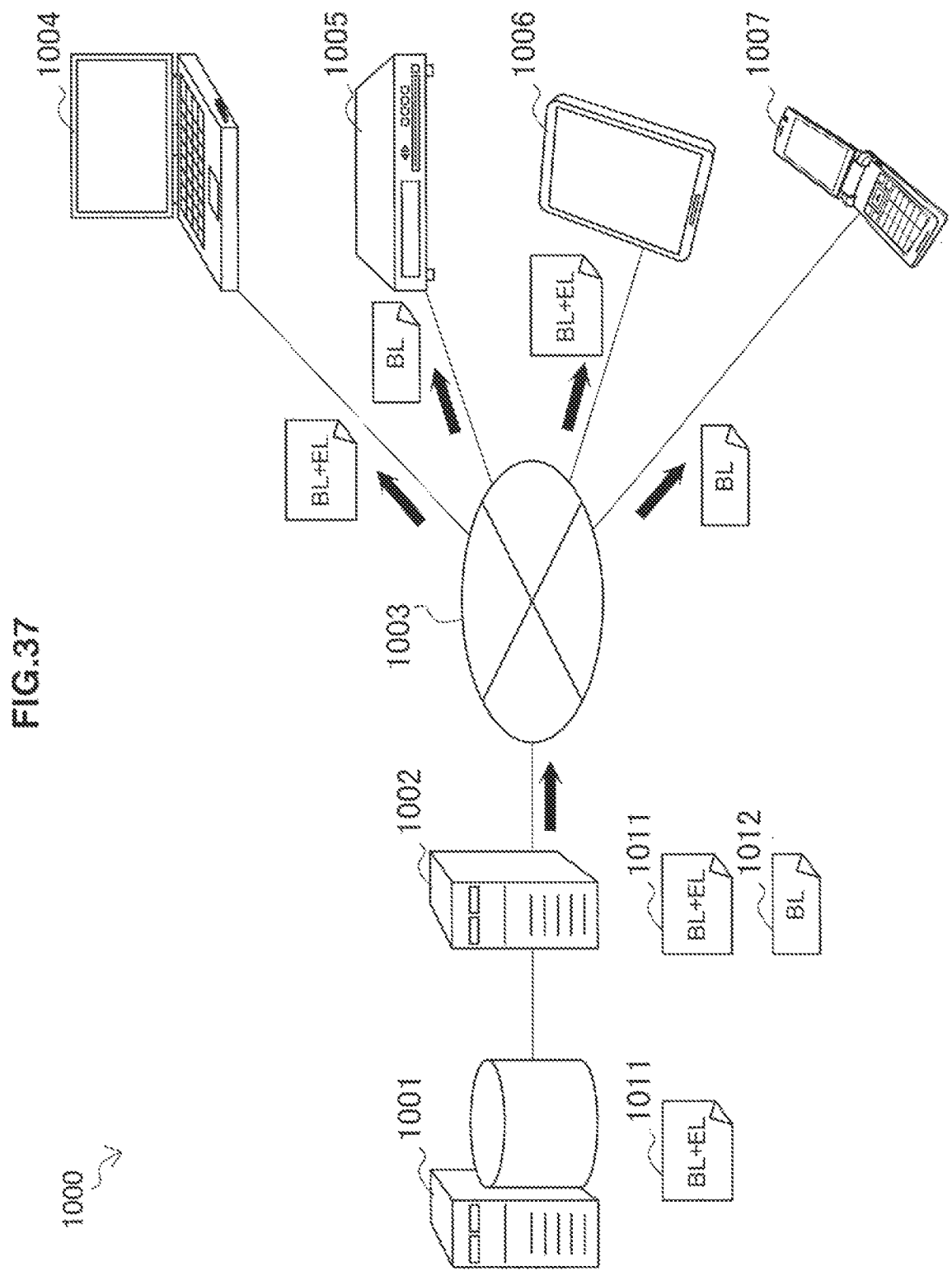
FIG. 37 is an explanatory view illustrating a first example of use of the scalable video coding.

In the first example, scalable video coding is used for selective transmission of data. Referring to FIG. 37, a data transmission system 1000 includes a stream storage device 1001 and a delivery server 1002. The delivery server 1002 is connected to some terminal devices via a network 1003. The network 1003 may be a wire network or a wireless network or a combination thereof. FIG. 37 shows a PC (Personal Computer) 1004, an AV device 1005, a tablet device 1006, and a mobile phone 1007 as examples of the terminal devices.

The stream storage device 1001 storm, for example, stream data 1011 including a multiplexed stream generated by the image encoding device 10. The multiplexed stream includes an encoded stream of the base layer (BL) and an encoded stream of an enhancement layer (EL). The delivery server 1002 reads the stream data 1011 stored in the stream storage device 1001 and delivers at least a portion of the read stream data 1011 to the PC 1004, the AV device 1005, the tablet device 1006, and the mobile phone 1007 via the network 1003.

When a stream is delivered to a terminal device, the delivery server 1002 selects the stream to be delivered based on some condition such as capabilities of a terminal device or the communication environment. For example, the delivery server 1002 may avoid a delay in a terminal device or an occurrence of overflow or overload of a processor by not delivering an encoded stream having high image quality exceeding image quality that can be handled by the terminal device. The delivery server 1002 may also avoid occupation of communication bands of the network 1003 by not delivering an encoded stream having high image quality. On the other hand, when there is no risk to be avoided or it is considered to be appropriate based on a user's contract or some condition, the delivery server 1002 may deliver an entire multiplexed stream to a terminal device.

In the example of FIG. 37, the delivery server 1002 reads the stream data 1011 from the stream storage device 1001. Then, the delivery server 1002 delivers the stream data 1011 directly to the PC 1004 having high processing capabilities. Because the AV device 1005 has low processing capabilities, the delivery server 1002 generates stream data 1012 containing only an encoded stream of the base layer extracted from the stream data 1011 and delivers the stream data 1012 to the AV device 1005. The delivery server 1002 delivers the stream data 1011 directly to the tablet device 1006 capable of communication at a high communication rate. Because the mobile phone 1007 can communicate at a low communication rate. the delivery server 1002 delivers the stream data 1012 containing only an encoded stream of the base layer to the mobile phone 1007.

By using the multiplexed stream in this manner, the amount of traffic to be transmitted can adaptively be adjusted. The code amount of the stream data 1011 is reduced when compared with a case when each layer is individually encoded and thus, even if the whole stream data 1011 is delivered, the load on the network 1003 can be lessened. Further, memory resources of the stream storage device 1001 are saved.

Hardware performance of the terminal devices is different from device to device. In addition, capabilities of applications run on the terminal devices are diverse. Further, communication capacities of the network 1003 are varied. Capacities available for data transmission may change every moment due to other traffic. Thus, before starting delivery of stream data, the delivery server 1002 may acquire terminal information about hardware performance and application capabilities of terminal devices and network information about communication capacities of the network 1003 through signaling with the delivery destination terminal device. Then, the delivery server 1002 can select the stream to be delivered based on the acquired information.

Incidentally, the layer to be decoded may be extracted by the terminal device. For example. the PC 1004 may display a base layer image extracted and decoded from a received multiplexed stream on the screen thereof. After generating the stream data 1012 by extracting an encoded stream of the base layer from a received multiplexed stream, the PC 1004 may cause a storage medium to store the stream data 1012 or transfer the stream data to another device.

The configuration of the data transmission system 1000 shown in FIG. 37 is only an example. The data transmission system 1000 may include any numbers of the stream storage device 1001, the delivery server 1002, the network 1003. and terminal devices.

(2) Second Example

Figure 38:
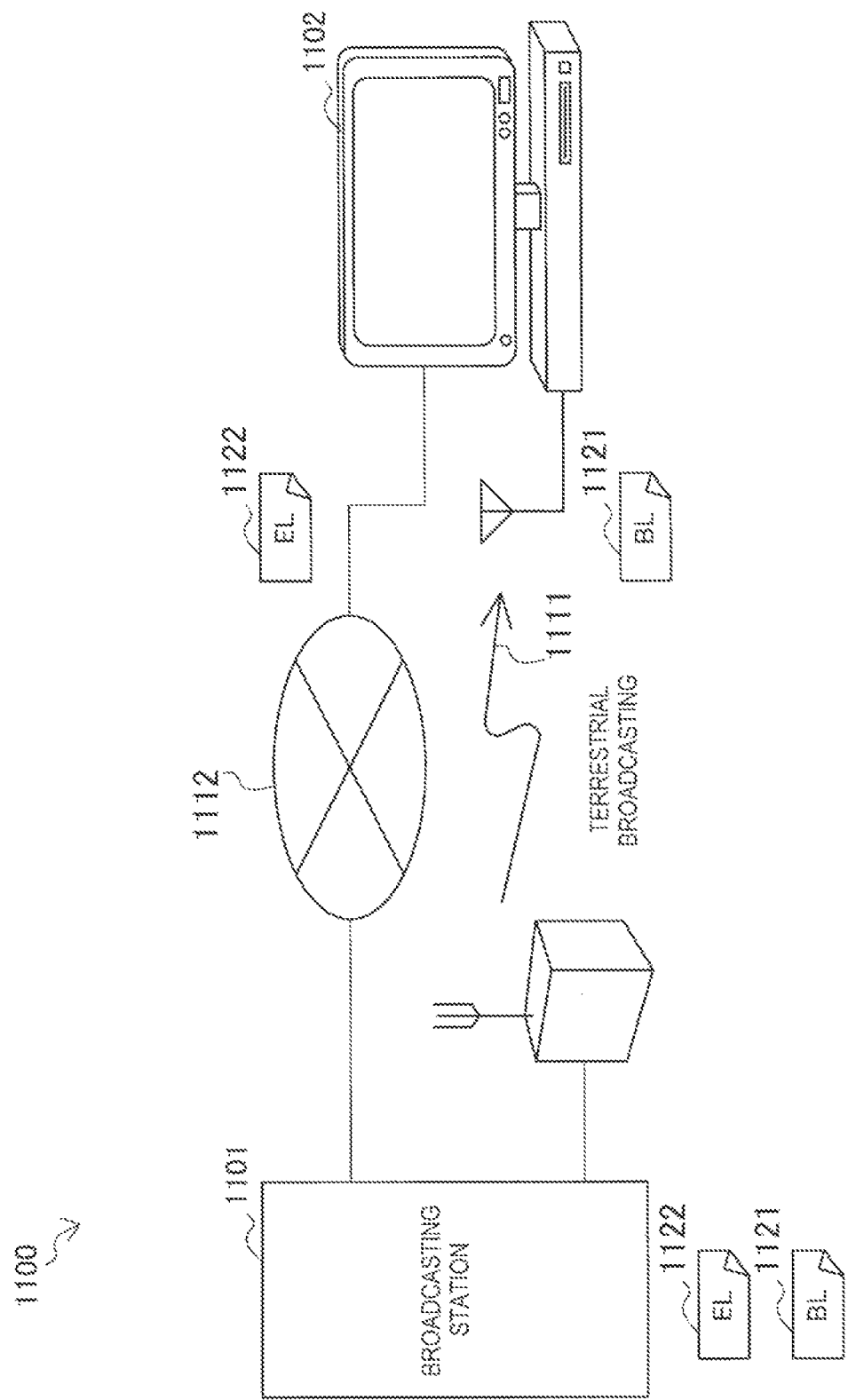
FIG. 38 is an explanatory view illustrating a second example of use of the scalable video coding.

In the second example, scalable video coding is used for transmission of data via a plurality of communication channels. Referring to FIG. 38, a data transmission system 1100 includes a broadcasting station 1101 and a terminal device 1102. The broadcasting station 1101 broadcasts an encoded stream 1121 of the base layer on a terrestrial channel 1111. The broadcasting station 1101 also broadcasts an encoded stream 1122 of an enhancement layer to the terminal device 1102 via a network 1112.

The terminal device 1102 has a receiving function to receive terrestrial broadcasting broadcast by the broadcasting station 1101 and receives the encoded stream 1121 of the base layer via the terrestrial channel 1111. The terminal device 1102 also has a communication function to communicate with the broadcasting station 1101 and receives the encoded stream 1122 of an enhancement layer via the network 1112.

After receiving the encoded stream 1121 of the base layer, for example. in response to users instructions, the terminal device 1102 may decode a base layer image from the received encoded stream 1121 and display the base layer image on the screen. Alternatively, the terminal device 1102 may cause a storage medium to store the decoded base layer image or transfer the base layer image to another device.

After receiving the encoded stream 1122 of an enhancement layer via the network 1112, for example, in response to use's instructions, the terminal device 1102 may generate a multiplexed stream by multiplexing the encoded stream 1121 of the base layer and the encoded stream 1122 of an enhancement layer. The terminal device 1102 may also decode an enhancement image from the encoded stream 1122 of an enhancement layer to display the enhancement image on the screen. Alternatively, the terminal device 1102 may cause a storage medium to store the decoded enhancement layer image or transfer the enhancement layer image to another device.

As described above, an encoded stream of each layer contained in a multiplexed stream can be transmitted via a different communication channel for each layer. Accordingly, a communication delay or an occurrence of overflow can be reduced by distributing leads on individual channels.

The communication channel to be used for transmission may dynamically be selected in accordance with some condition. For example, the encoded stream 1121 of the base layer whose data amount is relatively large may be transmitted via a communication channel having a wider bandwidth and the encoded stream 1122 of an enhancement layer whose data amount is relatively small may be transmitted via a communication channel having a narrower bandwidth. The communication channel on which the encoded stream 1122 of a specific layer is transmitted may be switched in accordance with the bandwidth of the communication channel. Accordingly, the load on individual channels can be lessened more effectively.

The configuration of the data transmission system 1100 shown in FIG. 38 is only an example. The data transmission system 1100 may include any numbers of communication channels and terminal devices. The configuration of the system described here may also be applied to other uses than broadcasting.

(3) Third Example

Figure 39:
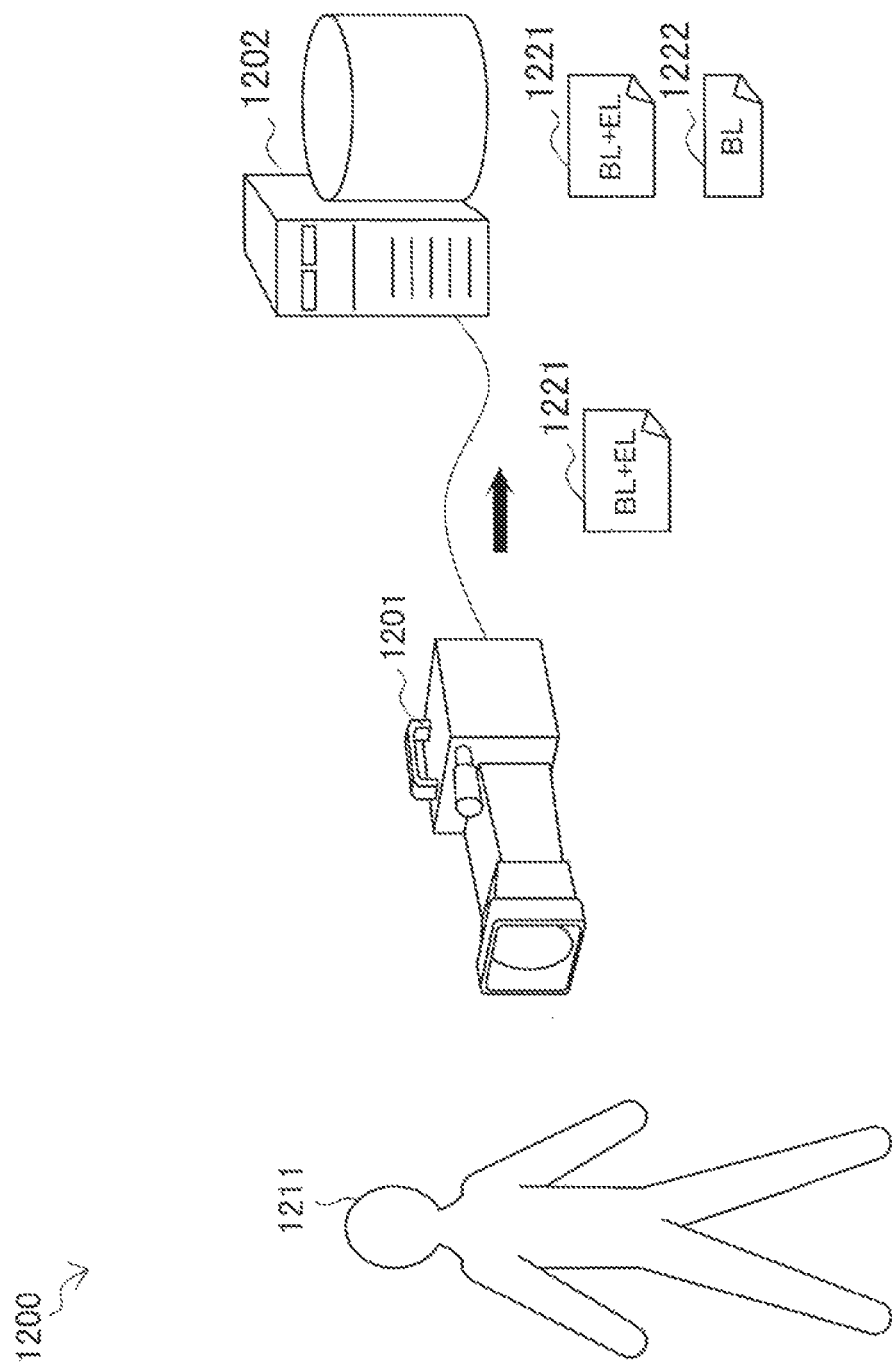
FIG. 39 is an explanatory view illustrating a third example of use of the scalable video coding.

In the third example, scalable video coding is used for storage of video. Referring to FIG. 39, a data transmission system 1200 includes an imaging device 1201 and a stream storage device 1202. The imaging device 1201 scalable-encodes image data generated by a subject 1211 being imaged to generate a multiplexed stream 1221. The multiplexed stream 1221 includes an encoded stream of the base layer and an encoded stream of an enhancement layer. Then, the imaging device 1201 supplies the multiplexed stream 1221 to the stream storage device 1202.

The stream storage device 1202 stores the multiplexed stream 1221 supplied 6 from the imaging device 1201 in different image quality for each mode. For example, the stream storage device 1202 extracts the encoded stream 1222 of the base layer from the multiplexed stream 1221 in normal mode and stores the extracted encoded stream 1222 of the base layer. In high quality mode, by contrast, the stream storage device 1202 stores the multiplexed stream 1221 as it is. Accordingly, the stream storage device 1202 can store a high-quality stream with a large amount of data only when recording of video in high quality is desired. Therefore, memory resources can be saved while the influence of image degradation on users is curbed.

For example, the imaging device 1201 is assumed to be a surveillance camera. When no surveillance object (for example, no intruder) appears in a captured image, the normal mode is selected. In this case, the captured image is likely to be unimportant and priority is given to the reduction of the amount of data so that the video is recorded in low image quality (that is, only the encoded stream 1222 of the base layer is stored). In contract, when a surveillance object (for example, the subject 1211 as an intruder) appears in a captured image, the high-quality mode is selected. In this case, the captured image is likely to be important and priority is given to high image quality so that the video is recorded in high image quality (that is, the multiplexed stream 1221 is stored).

In the example of FIG. 39, the mode is selected by the stream storage device 1202 based on, for example, an image analysis result. However, the present embodiment is not limited to such an example and the imaging device 1201 may select the mode. In the latter case, imaging device 1201 may supply the encoded stream 1222 of the base layer to the stream storage device 1202 in normal mode and the multiplexed stream 1221 to the stream storage device 1202 in high-quality mode.

Selection criteria for selecting the mode may be any criteria. For example, the mode may be switched in accordance with the loudness of voice acquired through a microphone or the waveform of voice. The mode may also be switched periodically. Also, the mode may be switched in response to users instructions. Further, the number of selectable modes may be any number as long as the number of hierarchized layers is not exceeded.

The configuration of the data transmission system 1200 shown in FIG. 39 is only an example. The data transmission system 1200 may include any number of the imaging device 1201. The configuration of the system described here may also be applied to other uses than the surveillance camera.

[6-3. Others]

(1) Application to the Multi-View Codec

Figure 40:
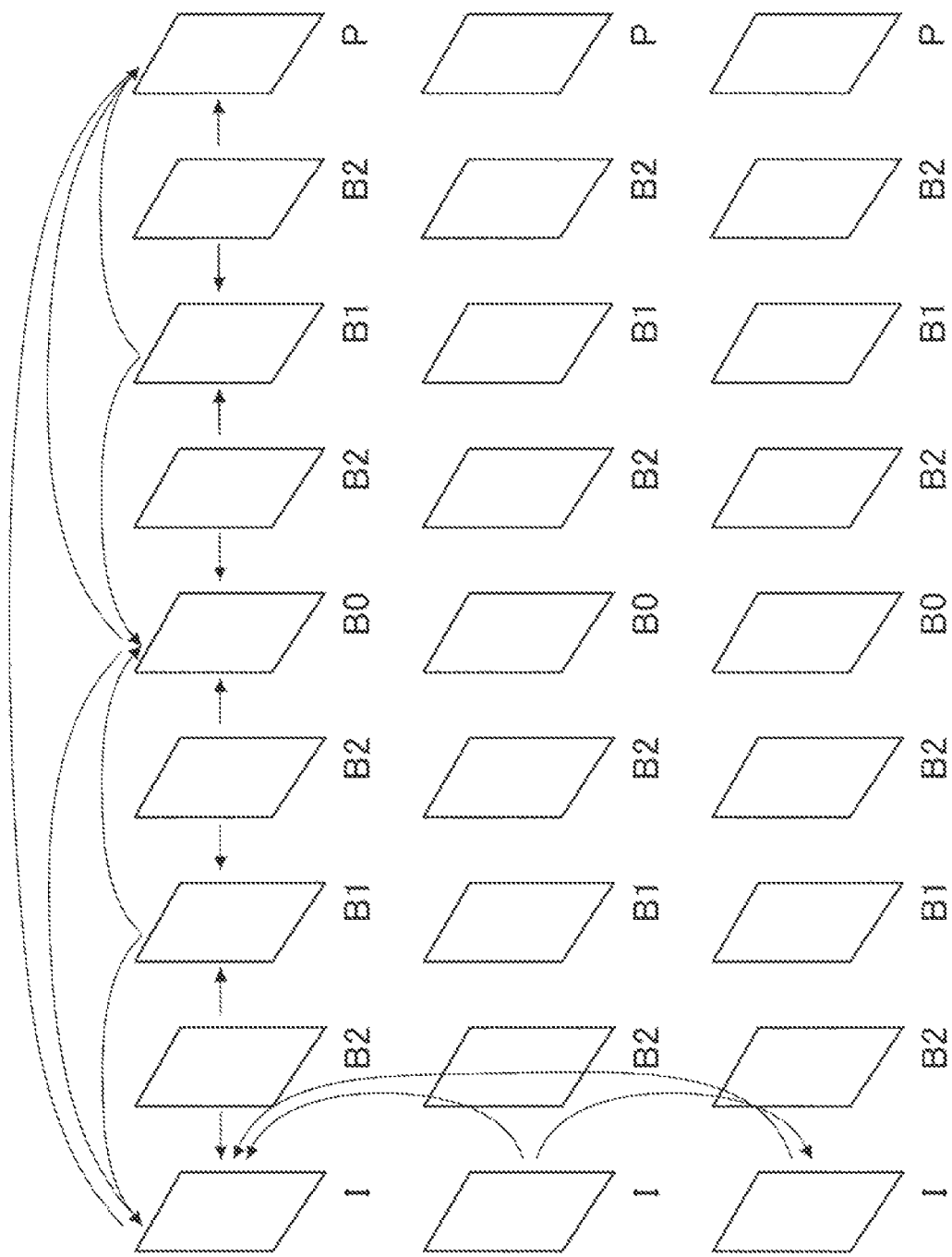
FIG. 40 is an explanatory view illustrating a multi-view codec.

The multi-view codec is a kind of multi-layer codec and is an image encoding system to encode and decode so-called multi-view video. FIG. 40 is an explanatory view illustrating a multi-view codec. Referring to FIG. 40, sequences of three view frames captured from three viewpoints are shown. A view ID (view_id) is attached to each view. Among a plurality of these views, one view is specified as the base view. Views other than the base view are called non-base views. In the example of FIG. 21. the view whose view ID is "0" is the base view and two views whose view ID is "1" or "2" are non-base views. When these views are hierarchically encoded, each view may correspond to a layer. As indicated by arrows in FIG. 40, an image of a non-base view is encoded and decoded by referring to an image of the base view (an image of the other non-base view may also be referred to).

Figure 41:
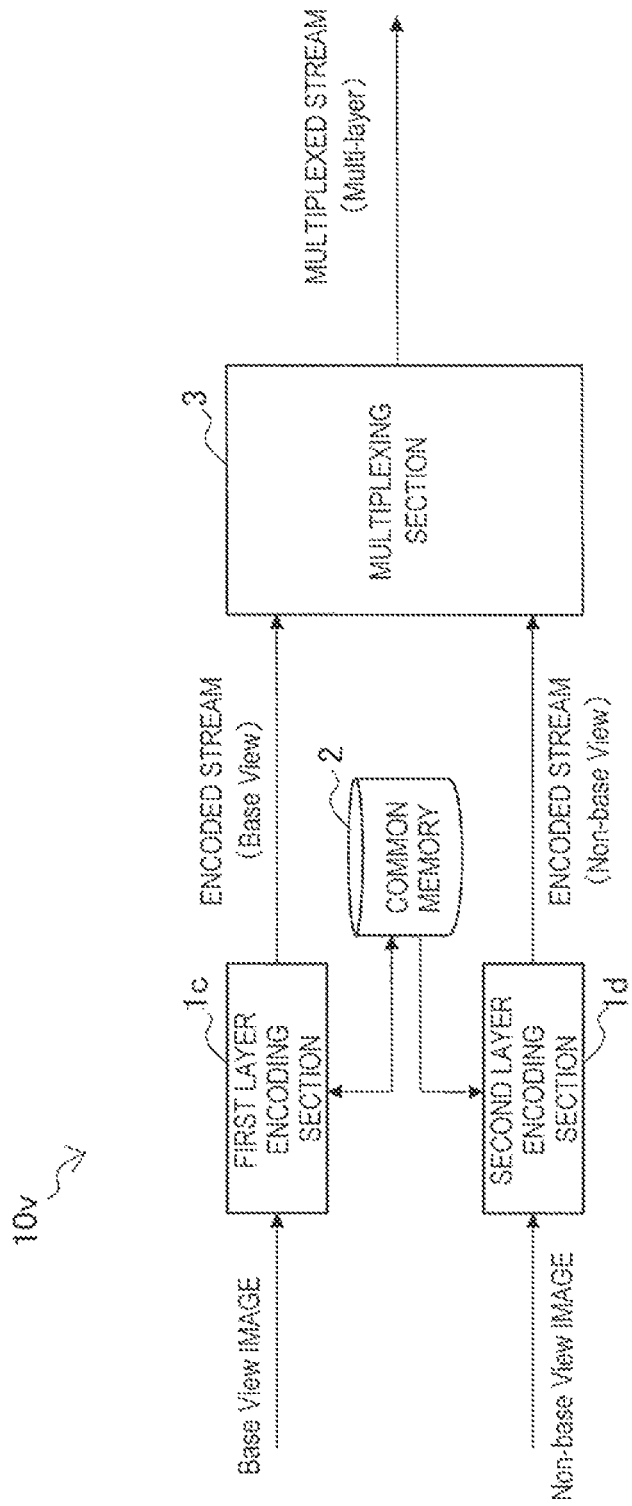
FIG. 41 is a block diagram showing a schematic configuration of the image encoding device for multi-view codec.

FIG. 41 is a block diagram showing a schematic configuration of an image encoding device $10v$ supporting the multi-view codec. Referring to FIG. 41. the image encoding device $10v$ includes a first layer encoding section $1c$, a second layer encoding section $1d$, the common memory 2, and the multiplexing section 3.

The function of the first layer encoding section $1c$ is the same as that of the BL encoding section $1a$ described using FIG. 3 except that, instead of a base layer image, a base view image is received as input. The first layer encoding section $1c$ encodes the base view image to generate an encoded stream of a first layer. The function of the second layer encoding section $1d$ is the same as that of the EL encoding section $1b$ described using FIG. 3 except that, instead of an enhancement layer image, a non-base view image is received as input. The second layer encoding section $1d$ encodes the non-base view image to generate an encoded stream of a second layer. The common memory 2 stores information commonly used between layers. The multiplexing section 3 multiplexes an encoded stream of the first layer generated by the first layer encoding section $1c$ and an encoded stream of the second layer generated by the second layer encoding section $1d$ to generate a multilayer multiplexed stream.

Figure 42:
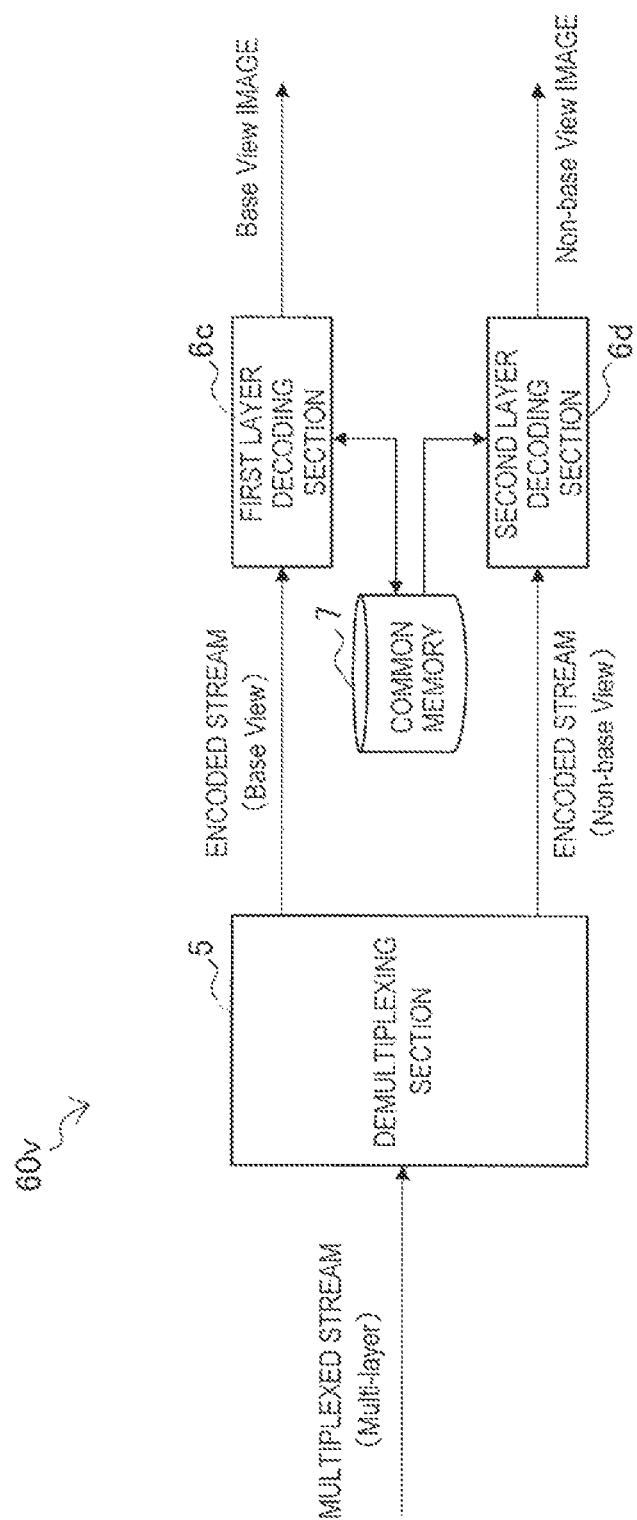
FIG. 42 is a block diagram showing a schematic configuration of the image decoding device for multi-view codec.

FIG. 42 is a block diagram showing a schematic configuration of an image decoding device $60v$ supporting the multi-view codec. Referring to FIG. 42, the image decoding device $60v$ includes the demultiplexing section 5, a first layer decoding section $6c$, a second layer decoding section $6d$, and the common memory 7.

The demultiplexing section 5 demultiplexes a multilayer multiplexed stream into an encoded stream of the first layer and an encoded stream of the second layer. The function of the first layer decoding section $6c$ is the same as that of the BL decoding section 6. described using FIG. 4 except that an encoded stream in which, instead of a base layer image, a base view image is encoded is received as input. The first layer decoding section $6c$ decodes a base view image from an encoded stream of the first layer. The function of the second layer decoding section $6d$ is the same as that of the EL decoding section $6b$ described using FIG. 4 except that an encoded stream in which, instead of an enhancement layer image, a non-base view image is encoded is received as input. The second layer decoding section $6d$ decodes a non-base view image from an encoded stream of the second layer. The common memory 7 stores information commonly used between layers.

When multi-view image data is encoded or decoded and the luminance dynamic range is different between views, conversion of the dynamic range between the views may be controlled according to the technology in the present disclosure. As a result, similarly to the case of the scalable video coding. a mechanism of converting the dynamic range can be implemented even in a multi-view codec by a simple implementation.

(2) Application to Streaming Technology

Technology in the present disclosure may also be applied to a streaming protocol. In MPEG-DASH (Dynamic Adaptive Streaming over HTTP). for example, a plurality of encoded streams having mutually different parameters such as the resolution is prepared by a stream server in advance. Then, the streaming server dynamically selects appropriate data for streaming from the plurality of encoded streams and delivers the selected data. In such a streaming protocol, the conversion of the dynamic range between the encoded streams may be controlled according to the technology in the present disclosure.

<7. Conclusion>

The embodiments of the technology according to the present disclosure have been described so far with reference to FIGS. 1 to 42. According to the above embodiments, the gain and the offset by which each color component of the first layer (for example, the base layer) is multiplied are defined as the prediction parameters used when the image of the second layer (for example, the enhancement layer) having the larger luminance dynamic range than the first layer is predicted as the image of the first layer. Then, the image of the second layer is predicted from the image of the first layer using the gain and the offset. This means that a relation between images having different luminance dynamic ranges approximates an independent linear relation of each color component. Using this prediction model. it is possible to predict an HDR image from an SDR image at an appropriate accuracy without requiring a complicated algorithm such as a color region conversion or a filtering process over a plurality of frames. Further, by employing this mechanism in a video format, versatility and scalability of a format is guaranteed, and it is easy to use the video format in various encoders and decoders. Furthermore. since it is relatively easy to implement based on the prediction model, an increase in power consumption caused by an increase in a circuit size and an increasing operation amount is prevented.

Further, according to the embodiments, the prediction mode parameter indicating whether or not the gain and the offset are adaptively set may be encoded and decoded. Thus, it is possible to achieve an optimum balance between the prediction accuracy of the DR prediction and the encoding/decoding overhead according to various conditions such as the performance of the encoder and the decoder, the transmission band, or the required image quality.

According to an embodiment, instead of the gain and the offset, the difference from the previous value of the prediction parameter may be encoded and decoded. In this case, it is possible to suppress an increase in the code amount while achieving the high prediction accuracy in the dynamic range scalability.

According to an embodiment, the prediction parameter is decoded from the header having the syntax shared with the weighted prediction-related parameter. In this case, the redundancy of the syntax is reduced, and it is easy to implement the encoder and the decoder and secure compatibility at the time of version upgrade. Further, according to an embodiment, the two versions of prediction parameters for the DR prediction may be encoded and decoded using both the L0 reference frame part and the L1 reference frame part of the syntax of the weighted prediction-related parameter. In this case, it is possible to use the prediction model having the high prediction accuracy more flexibly, and thus it is possible to improve the coding efficiency of the dynamic range scalability.

Further, according to an embodiment, the control parameter indicating whether or not the bit shift at the time of the inter-layer processing is to be executed at the same time as the DR conversion may be encoded and decoded. In this case. it is possible to suppress the processing cost of the inter-layer processing by adaptively switching the bit shift execution timing (for example, at the same time as the up-sampling or at the same time as the DR conversion). Further, according to a modified example, the DR conversion may be executed before the up-sampling is executed. In this case, since the number of pixels of the conversion target of the DR conversion is reduced, the processing cost of the DR conversion can be further reduced.

The terms "CU," "PU." and "TU" described in the present specification refer to logical units including a syntax associated with an individual block in HEVC. When only individual blocks which are parts of an image are focused on, the blocks may be referred to with the terms "coding block (CB)," "prediction block (PB)," and "transform block (TB)." A CB is formed by hierarchically dividing a coding tree block (CTB) in a quad-tree shape. The one entire quad-tree corresponds to the CTB and a logical unit corresponding to the CTB is referred to as a coding tree unit (CTU). The CTB and the CB in HEVC have a similar role to a macro block in H.264/AVC in that the CTB and the CB are processing units of an encoding process. However, the CTB and the CB are different from the macro block in that the sizes of the CTB and the CB are not fixed (the size of the macro block is normally 16×16 pixels). The size of the CTB is selected from a size of 16×16 pixels. a size of 32×32 pixels, and a size of 64×64 pixels and is designated by a parameter in an encoded stream. The size of the CB can be changed according to a division depth of the CTB.

Mainly described herein is the example where the various pieces of information such as the information related to control of the DR prediction are multiplexed to the header of the encoded stream and transmitted from the encoding side to the decoding side. The method of transmitting these pieces of information however is not limited to such example. For example, these pieces of information may be transmitted or recorded as separate data associated with the encoded bit stream without being multiplexed to the encoded bit stream. Here, the term "association" means to allow the image included in the bit stream (may be a part of the image such as a slice or a block) and the information corresponding to the current image to establish a link when decoding. Namely, the information may be transmitted on a different transmission path from the image (or the bit stream). The information may also be recorded in a different recording medium (or a different recording area in the same recording medium) from the image (or the bit stream). Furthermore, the information and the image (or the bit stream) may be associated with each other by an arbitrary unit such as a plurality of frames, one frame, or a portion within a frame.

The preferred embodiments of the present disclosure have been described above with reference to the accompanying drawings, whilst the present disclosure is not limited to the above examples, of course. A person skilled in the art may find various alternations and modifications within the scope of the appended claims, and it should be understood that they will naturally come under the technical scope of the present disclosure.

Additionally, the technology according to the present disclosure may also be configured as below.

(1)
An image processing apparatus including:
a decoding section configured to decode a prediction parameter including a gain and an offset by which each color component of a first layer is multiplied, the prediction parameter being used when an image of a second layer having a larger luminance dynamic range than the first layer is predicted from an image of the first layer; and
a prediction section configured to predict the image of the second layer from the image of the first layer using the prediction parameter decoded by the decoding section.
(2)
The image processing apparatus according to (1),
wherein the decoding section decodes a difference from a previous value of the prediction parameter, and
wherein the prediction section sets the prediction parameter using the difference decoded by the decoding section.
(3)
The image processing apparatus according to (1) or (2),
wherein the decoding section further decodes a prediction mode parameter indicating a prediction mode, and
wherein the prediction section predicts the image of the second layer using the prediction parameter when the prediction mode parameter indicates an adaptive parameter mode.
(4)
The image processing apparatus according to any one of (1) to (3),
wherein the decoding section decodes the prediction parameter from a header having a syntax shared with a weighted prediction-related parameter.
(5)
The image processing apparatus according to (4),
wherein the decoding section does not decode the weighted prediction-related parameter in the second layer, and
wherein the weighted prediction-related parameter of the first layer is reused in the second layer.
(6)
The image processing apparatus according to (4) or (5),
wherein a first set of the prediction parameters is decoded from an L0 reference frame part of the syntax shared with the weighted prediction-related parameter,
wherein a second set of the prediction parameters is decoded from an L1 reference frame part of the syntax shared with the weighted prediction-related parameter, and
wherein the prediction section selectively uses the first set of the prediction parameters and the second set of the prediction parameters in order to predict the image of the second layer.
(7)
The image processing apparatus according to (6).
wherein the prediction section selects a set to be used from the first set of the prediction parameters and the second set of the prediction parameters according to a band to which a pixel value belongs.
(8)
The image processing apparatus according to (6),
wherein the prediction section selects a set to be used from the first set of the prediction parameters and the second set of the prediction parameters according to an image region to which a pixel value belongs.
(9)
The image processing apparatus according to any one of (1) to (8),
wherein, when a bit depth of the second layer is larger than a bit depth of the first layer, the decoding section further decodes a control parameter indicating whether or not a bit shift is to be executed at the same time as dynamic range conversion when the image of the second layer is predicted, and wherein, when the control parameter indicates that the bit shift is to be executed at the same time as the dynamic range conversion when the image of the second layer is predicted, the prediction section executes the bit shift at the same time as the dynamic range conversion rather than up-sampling.

(10)

The image processing apparatus according to (9), wherein the decoding section decodes the control parameter separately for a luma component and a chroma component.

(11)

The image processing apparatus according to any one of (1) to (10), wherein, when a space resolution of the second layer is higher than a space resolution of the first layer, the prediction section predicts the image of the second layer by converting a dynamic range of the image of the first layer using the prediction parameter and then up-sampling the converted image.

(12)

An image processing method including:

decoding a prediction parameter including a gain and an offset by which each color component of a first layer is multiplied, the prediction parameter being used when an image of a second layer having a larger luminance dynamic range than the first layer is predicted from an image of the first layer; and predicting the image of the second layer from the image of the tint layer using the decoded prediction parameter.

(13)

An image processing apparatus including:

a prediction section configured to predict an image of a second layer from an image of a first layer when the image of the second layer having a larger luminance dynamic range than the first layer is encoded; and an encoding section configured to encode a prediction parameter including a gain and an offset by which each color component of the first layer is multiplied, the prediction parameter being used by the prediction section.

(14)

The image processing apparatus according to (13), wherein the encoding section encodes a difference from a previous value of the prediction parameter.

(15)

The image processing apparatus according to (13) or (14), wherein, when the image of the second layer is predicted using the prediction parameter, the encoding section further encodes a prediction mode parameter indicating an adaptive parameter mode as a prediction mode.

(16)

The image processing apparatus according to any one of (13) to (15), wherein the encoding section encodes the prediction parameter in a header having a syntax shared with a weighted prediction-related parameter.

(17)

The image processing apparatus according to (16), wherein the encoding section does not encode the weighted prediction-related parameter in the second layer, and wherein the weighted prediction-related parameter of the first layer is reused in the second layer.

(18)

The image processing apparatus according to (16) or (17), wherein the prediction section selectively uses a first set of the prediction parameters and a second set of the prediction parameters in order to predict the image of the second layer, and wherein the encoding section encodes the first set of the prediction parameters as an L0 reference frame part of the syntax shared with the weighted prediction-related parameter, and encodes the second set of the prediction parameters as an L1 reference frame part of the syntax shared with the weighted prediction-related parameter.

(19)

The image processing apparatus according to (18), wherein the prediction section selects a set to be used from the first set of the prediction parameters and the second set of the prediction parameters according to a band to which a pixel value belongs.

(20)

The image processing apparatus according to (18), wherein the prediction section selects a set to be used from the first set of the prediction parameters and the second set of the prediction parameters according to an image region to which a pixel value belongs.

(21)

The image processing apparatus according to any one of (13) to (20), wherein, when a bit depth of the second layer is larger than a bit depth of the first layer, the encoding section further encodes a control parameter indicating whether or not a bit shift is to be executed at the same time as dynamic range conversion when the image of the second layer is predicted.

(22)

The image processing apparatus according to (21).

wherein the encoding section encodes the control parameter separately for a luma component and a chroma component.

(23)

The image processing apparatus according to any one of (13) to (22), wherein, when a space resolution of the second layer is higher than a space resolution of the first layer, the prediction section predicts the image of the second 10 layer by converting a dynamic range of the image of the first layer using the prediction parameter and then up-sampling the converted image.

(24)

An image processing method including:

predicting an image of a second layer from an image of a first layer when the image of the second layer having a larger luminance dynamic range than the first layer is encoded: and encoding a prediction parameter including a gain and an offset by which each color component of the first layer is multiplied, the prediction parameter being used in the predicting.

REFERENCE SIGNS LIST

10, 10v image encoding device (image processing apparatus)
16 lossless encoding section
26 40 DR prediction section
60, 60v image decoding device (image processing apparatus)
62 lossless decoding section
90 DR prediction section

The invention claimed is:

1. An image processing apparatus comprising:
a decoding section configured to decode, from a header having a syntax shared with a weighted prediction-related parameter, a prediction parameter including a gain and an offset by which each color component of a first layer is multiplied, the prediction parameter being used when an image of a second layer having a larger luminance dynamic range than the first layer is predicted from an image of the first layer; and
a prediction section configured to predict the image of the second layer from the image of the first layer using the prediction parameter decoded by the decoding section,
wherein a first set of the prediction parameters is decoded from an L0 reference frame part of the syntax shared with the weighted prediction-related parameter,
wherein a second set of the prediction parameters is decoded from an L1 reference frame part of the syntax shared with the weighted prediction-related parameter,
wherein the prediction section selectively uses the first set of the prediction parameters and the second set of the prediction parameters in order to predict the image of the second layer, and
wherein the decoding section and the prediction section are each implemented via at least one processor.

2. The image processing apparatus according to claim 1, wherein the decoding section decodes a difference from a previous value of the prediction parameter, and
wherein the prediction section sets the prediction parameter using the difference decoded by the decoding section.

3. The image processing apparatus according to claim 1, wherein the decoding section does not decode the weighted prediction-related parameter in the second layer, and
wherein the weighted prediction-related parameter of the first layer is reused in the second layer.

4. The image processing apparatus according to claim 1, wherein the prediction section selects a set to be used from the first set of the prediction parameters and the second set of the prediction parameters according to a band to which a pixel value belongs.

5. The image processing apparatus according to claim 1, wherein the prediction section selects a set to be used from the first set of the prediction parameters and the second set of the prediction parameters according to an image region to which a pixel value belongs.

6. The image processing apparatus according to claim 1, wherein, when a bit depth of the second layer is larger than a bit depth of the first layer, the decoding section further decodes a control parameter indicating whether or not a bit shift is to be executed at the same time as dynamic range conversion when the image of the second layer is predicted, and
wherein, when the control parameter indicates that the bit shift is to be executed at the same time as the dynamic range conversion when the image of the second layer is predicted, the prediction section executes the bit shift at the same time as the dynamic range conversion rather than up-sampling.

7. The image processing apparatus according to claim 1, wherein, when a space resolution of the second layer is higher than a space resolution of the first layer, the prediction section predicts the image of the second layer by converting a dynamic range of the image of the first layer using the prediction parameter and then up-sampling the converted image.

8. An image processing method comprising:
decoding, from a header having a syntax shared with a weighted prediction-related parameter, a prediction parameter including a gain and an offset by which each color component of a first layer is multiplied, the prediction parameter being used when an image of a second layer having a larger luminance dynamic range than the first layer is predicted from an image of the first layer; and
predicting the image of the second layer from the image of the first layer using the decoded prediction parameter,
wherein a first set of the prediction parameters is decoded from an L0 reference frame part of the syntax shared with the weighted prediction-related parameter,
wherein a second set of the prediction parameters is decoded from an L1 reference frame part of the syntax shared with the weighted prediction-related parameter, and
wherein the first set of the prediction parameters and the second set of the prediction parameters are selectively used in order to predict the image of the second layer.

9. An image processing apparatus comprising:
a prediction section configured to predict an image of a second layer from an image of a first layer when the image of the second layer having a larger luminance dynamic range than the first layer is encoded; and
an encoding section configured to encode, in a header having a syntax shared with a weighted prediction-related parameter, a prediction parameter including a gain and an offset by which each color component of the first layer is multiplied, the prediction parameter being used by the prediction section,
wherein the prediction section selectively uses a first set of the prediction parameters and a second set of the prediction parameters in order to predict the image of the second layer,
wherein the encoding section encodes the first set of the prediction parameters as an L0 reference frame part of the syntax shared with the weighted prediction-related parameter, and encodes the second set of the prediction parameters as an L1 reference frame part of the syntax shared with the weighted prediction-related parameter, and
wherein the prediction section and the encoding section are each implemented via at least one processor.

10. The image processing apparatus according to claim 9, wherein the encoding section encodes a difference from a previous value of the prediction parameter.

11. The image processing apparatus according to claim 9, wherein the encoding section does not encode the weighted prediction-related parameter in the second layer, and
wherein the weighted prediction-related parameter of the first layer is reused in the second layer.

12. The image processing apparatus according to claim 9, wherein the prediction section selects a set to be used from the first set of the prediction parameters and the second set of the prediction parameters according to a band to which a pixel value belongs.

13. The image processing apparatus according to claim 9, wherein the prediction section selects a set to be used from the first set of the prediction parameters and the second set of the prediction parameters according to an image region to which a pixel value belongs.

14. The image processing apparatus according to claim 9, wherein, when a bit depth of the second layer is larger than a bit depth of the first layer, the encoding section further encodes a control parameter indicating whether or not a bit shift is to be executed at the same time as dynamic range conversion when the image of the second layer is predicted.

15. The image processing apparatus according to claim 9, wherein, when a space resolution of the second layer is higher than a space resolution of the first layer, the prediction section predicts the image of the second layer by converting a dynamic range of the image of the first layer using the prediction parameter and then up-sampling the converted image.

16. An image processing method comprising:
predicting an image of a second layer from an image of a first layer when the image of the second layer having a larger luminance dynamic range than the first layer is encoded; and encoding, in a header having a syntax shared with a weighted prediction-related parameter, a prediction parameter including a gain and an offset by which each color component of the first layer is multiplied, the prediction parameter being used in the predicting, wherein a first set of the prediction parameters and a second set of the prediction parameters are selectively used in order to predict the image of the second layer, and wherein the first set of the prediction parameters is encoded as an L0 reference frame part of the syntax shared with the weighted prediction-related parameter, and the second set of the prediction parameters is encoded as an L1 reference frame part of the syntax shared with the weighted prediction-related parameter.

* * * * *